US010916065B2

(12) United States Patent
Furtwangler et al.

(10) Patent No.: US 10,916,065 B2
(45) Date of Patent: Feb. 9, 2021

(54) PREVENTION OF USER INTERFACE OCCLUSION IN A VIRTUAL REALITY ENVIRONMENT

(71) Applicant: Facebook Technologies, LLC, Menlo Park, CA (US)

(72) Inventors: Brandon Furtwangler, Issaquah, WA (US); Justin Rogers, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 161 days.

(21) Appl. No.: 15/971,899

(22) Filed: May 4, 2018

(65) Prior Publication Data

US 2019/0340833 A1    Nov. 7, 2019

(51) Int. Cl.

| | |
|---|---|
| *G06F 3/0482* | (2013.01) |
| *G06T 19/20* | (2011.01) |
| *G06F 3/01* | (2006.01) |
| *G06F 3/0488* | (2013.01) |
| *G06F 9/451* | (2018.01) |
| *G06F 3/0484* | (2013.01) |
| *G06F 16/245* | (2019.01) |

(52) U.S. Cl.
CPC .............. *G06T 19/20* (2013.01); *G06F 3/011* (2013.01); *G06F 3/0482* (2013.01); *G06F 3/04845* (2013.01); *G06F 3/04883* (2013.01); *G06F 9/451* (2018.02); *G06F 16/245* (2019.01); *G06T 2200/24* (2013.01); *G06T 2219/2004* (2013.01)

(58) Field of Classification Search
CPC ............. G06F 3/04845; G06F 3/04883; G06F 3/0482; G06F 3/011; G06T 2219/2004
See application file for complete search history.

(56) References Cited

U.S. PATENT DOCUMENTS

| | | | | |
|---|---|---|---|---|
| 8,356,254 B2* | 1/2013 | Dennard | ................. | G03B 21/26 |
| | | | | 345/156 |
| 8,549,418 B2* | 10/2013 | Lamarca | ............. | G06F 3/04883 |
| | | | | 353/28 |
| 10,403,050 B1* | 9/2019 | Beall | ....................... | G06F 3/011 |
| 2009/0210486 A1* | 8/2009 | Lim | ...................... | A63F 13/792 |
| | | | | 709/203 |

(Continued)

*Primary Examiner* — Phenuel S Salomon
(74) *Attorney, Agent, or Firm* — Baker Botts L.L.P.

(57) ABSTRACT

In one embodiment, a client system receives a request to access a user interface element in a virtual reality environment for an application and generates the user interface element in the virtual reality environment. The user interface element at the generated position occludes a portion of the application. The client system detects an input to move the user interface element from one position in the virtual reality environment to another position in the virtual reality environment relative to a display region of the application and stores position data associated with the other position of the virtual reality environment in a position database. The position data is associated with the application. The client system receives another request to access the user interface element in the virtual reality environment for the application and generates the user interface element in the virtual reality environment based on the position data associated with the application.

19 Claims, 38 Drawing Sheets

(56) References Cited

U.S. PATENT DOCUMENTS

| | | | | |
|---|---|---|---|---|
| 2012/0206452 | A1* | 8/2012 | Geisner | H04S 7/304 |
| | | | | 345/419 |
| 2014/0104320 | A1* | 4/2014 | Davidson | G09G 5/32 |
| | | | | 345/681 |
| 2014/0204002 | A1* | 7/2014 | Bennet | G06F 3/011 |
| | | | | 345/8 |
| 2014/0267228 | A1* | 9/2014 | Ofek | G06T 19/20 |
| | | | | 345/419 |
| 2014/0333666 | A1* | 11/2014 | Poulos | G06F 3/147 |
| | | | | 345/633 |
| 2015/0234477 | A1* | 8/2015 | Abovitz | G06F 3/04845 |
| | | | | 382/103 |
| 2016/0179336 | A1* | 6/2016 | Ambrus | G06F 3/013 |
| | | | | 715/768 |
| 2016/0316081 | A1* | 10/2016 | Matsuki | G06F 3/12 |
| 2017/0038830 | A1* | 2/2017 | Clement | G06T 19/006 |
| 2017/0178356 | A1* | 6/2017 | Bhuruth | G06T 19/006 |
| 2018/0004481 | A1* | 1/2018 | Fallon | G06F 3/04815 |
| 2018/0045963 | A1* | 2/2018 | Hoover | H04N 13/156 |
| 2018/0095616 | A1* | 4/2018 | Valdivia | H04L 51/16 |
| 2018/0307303 | A1* | 10/2018 | Powderly | G02B 27/0172 |
| 2019/0004683 | A1* | 1/2019 | Pahud | G06F 3/04842 |
| 2019/0011703 | A1* | 1/2019 | Robaina | A61B 90/36 |
| 2019/0018498 | A1* | 1/2019 | West | G06T 19/006 |
| 2019/0114051 | A1* | 4/2019 | McBeth | G06F 3/011 |
| 2019/0114061 | A1* | 4/2019 | Daniels | G06F 15/16 |
| 2019/0235729 | A1* | 8/2019 | Day | G09G 5/08 |
| 2019/0295327 | A1* | 9/2019 | An | H04L 67/38 |
| 2019/0303090 | A1* | 10/2019 | Milne | H04S 3/008 |
| 2019/0304406 | A1* | 10/2019 | Griswold | G06F 3/012 |

* cited by examiner

PREVENTION OF USER INTERFACE OCCLUSION IN A VIRTUAL REALITY ENVIRONMENT

TECHNICAL FIELD

This disclosure generally relates to controls and interfaces for user interactions and experiences in a virtual reality environment.

BACKGROUND

Virtual reality is a computer-generated simulation of an environment (e.g., a 3D environment) that users can interact with in a seemingly real or physical way. A virtual reality system, which may be a single device or a group of devices, may generate this simulation for display to a user, for example, on a virtual reality headset or some other display device. The simulation may include images, sounds, haptic feedback, and/or other sensations to imitate a real or imaginary environment. As virtual reality becomes more and more prominent, its range of useful applications is rapidly broadening. The most common applications of virtual reality involve games or other interactive content, but other applications such as the viewing of visual media items (e.g., photos, videos) for entertainment or training purposes are close behind. The feasibility of using virtual reality to simulate real-life conversations and other user interactions is also being explored.

SUMMARY OF PARTICULAR EMBODIMENTS

Disclosed herein are a variety of different ways of rendering and interactive with a virtual (or augmented) reality environment. A virtual reality system may render a virtual environment, which may include a virtual space that is rendered for display to one or more users. The users may view and interact within this virtual space and the broader virtual environment through any suitable means. One goal of the disclosed methods is to improve upon the security of the virtual environment. In particular embodiments, the virtual reality system may provide for a method of differentiating generated operating system (OS) content from generated third-party content within the virtual reality environment and selectively displaying the content in different display planes accordingly. As an example and not by way of limitation, OS content may include various processes such as system updates or other processes that are run by the OS. As another example and not by way of limitation, third-party content may relate to content that is generated by applications running on the virtual reality system, such as games and interactive content. As another example and not by way of limitation, OS user interfaces (e.g., keyboard, a menu, a pop-up window, or any other user interface generated by the operating system) may be differentiated from third-party user interfaces (e.g., keyboard, a menu, a pop-up window, or any other user interface generated by a third-party). Within a virtual reality environment, a user should be able to trust elements generated within the virtual reality environment, such as a third-party application the user is currently interfacing. However, there may be third-party entities with malicious intent that would try to compromise the security of the user and obtain the user's confidential information without approval. As an example and not by way of limitation, a malicious third-party entity may generate user interface elements, such as a keyboard masquerading as a part of the system software in hopes that the user would use it to enter confidential information (e.g., passwords, social security number, etc.). Despite the existence of malicious third-party entities, the user 101 may rely on the system generated content and maintain use of the system generated content, such as a user interface element (e.g., keyboard).

To combat a third-party with a malicious intent, in particular embodiments, the virtual reality system may take any request to access a user interface element (e.g., a keyboard) and determine whether the requested user interface element is a system user interface element generated by the OS or a third-party user interface element that is generated by a third-party application or based on third-party content. As an example and not by way of limitation, a request may be received from a user interacting with a third-party application to generate a user interface element (e.g., a keyboard) to input his or her credentials into an input field. In particular embodiments, the virtual reality system may take the request and determine whether the user interface element that is to be invoked is the system's user interface. In particular embodiments, to differentiate a user interface element that is generated by a third-party application from a user interface element that is generated by the OS, the virtual reality system may generate these two different user interface elements in two separate planes. As an example and not by way of limitation, the virtual reality system may determine the user is requesting to put in his or her credentials to approve a software update of the OS and display a system keyboard in a plane a certain distance away from the user in the virtual reality environment. As another example and not by way of limitation, the virtual reality system may receive a request to display a third-party keyboard for inputting the user's credentials for a service and display a keyboard in a plane a certain distance away from the user in the virtual reality environment, wherein this second plane generated for the third-party keyboard may be further away from the user than the first plane generated for the OS content. Other differences between a user interface element generated by the OS and a third-party application may include the orientation of the user interface element (e.g., which direction the keyboard is facing). In particular embodiments, a first plane may be solely dedicated for user interface elements generated for the OS and a second plane may be solely dedicated for user interface elements generated by third-party applications to further differentiate user interface elements generated by either the OS or a third-party application.

In particular embodiments, the virtual reality system may further improve system security by limiting data-access to applications that have been specifically authorized. Many users may perform some degree of multitasking and have several applications open and running at any given time. As an example and not by way of limitation, a user may check and respond to an urgent email in the middle of watching a movie or playing a game. In particular embodiments, these applications may utilize sensor data (e.g., accelerometer data, gyroscope data, magnetometer data, eye tracking data, etc.) received from the VR headset to perform functions related to the application (e.g., changing field of view from user moving his or her head). As a result, if a user switches between applications, the previous application may still be receiving sensor data. This may compromise the security of the user in the event that the user is inputting confidential information in the current application because an entity may take the sensor data (e.g., where the user is viewing) to determine with some degree of accuracy what characters are inputted into a keyboard in the VR environment. In particular embodiments, sensor data that may be available for access by an application may include sensor data generated from gyroscopes, accelerometers, magnetometers, eye trackers, and any other sensors located within a virtual reality system. As an example and not by way of limitation, the sensors may be located on the virtual reality headset and the virtual reality controllers. In particular embodiments, the virtual reality system may receive a request to access sensor data by a third-party application. The virtual reality system may process the request and determine whether the third-party application that is requesting the sensor data is currently being interfaced by the user. As an example and not by way of limitation, the virtual reality system may determine whether the user is actively interacting with the application, such as interacting with a keyboard of the application, scrolling through a webpage of a browser application, or hovering over elements of the application (e.g. a pointer over the application). In particular embodiments, the virtual reality system may authorize the third-party application that the user is currently interfacing to receive sensor data. Conversely, in particular embodiments, the virtual reality system may prevent a third-party application from receiving sensor data if the user is not currently interfacing the application (e.g., an application running in the background). After making the determinations, the virtual reality system may send the sensor data to the authorized applications to receive the sensor data. In particular embodiments, the user may authorize specific third-party applications to receive sensor data.

Another goal of the disclosed methods is to improve upon the generation of user interface elements (e.g., keyboards, radial menus, etc.) within a virtual reality environment. In particular embodiments, the virtual reality system may provide for a method of using position data to generate a user interface element within the virtual reality environment for an application. Within a virtual reality environment, there may be all sorts of content for a user to view. The generation of a user interface element may occlude a portion of an application that may be important for the user to view. As an example and not by way of limitation, the occluded portion may contain content, such as a question that the user is answering with the generated user interface element. As another example and not by way of limitation, the occluded content may include predicted inputs to a search field box.

To avoid occluding a portion of the application within the virtual reality environment, the user may be allowed to manually move the user interface element to a different position. As an example and not by way of limitation, the user may be able to click on a keyboard and drag-and-drop the keyboard at another position. As another example and not by way of limitation, the user may use a gesture to move the keyboard from one position to another position. The virtual reality system may store the position data associated with the user interface element to identify positions within the virtual reality environment that may not occlude the portion of the application the user wants to view. An assumption is made that the user may move the user interface element out of the way to view whatever content the user needs to see to interface the user interface element. The virtual reality system may use the stored data to generate and display the user interface element at a position that does not occlude any portion of the application the user wants to view. In particular embodiments, the virtual reality system may store and compile position data from multiple users to accurately identify areas of the display region of the application that may contain content.

Another goal of the disclosed methods is to provide a copy and paste functionality within a virtual reality environment. There are plenty of features that users may take for granted while using their devices (e.g., smart phone, tablet, laptop, etc.) to browse on the internet, social media, and the like. One of these features may include the copy and paste functionality. However, current virtual reality environments may not support the copy and paste functionality like what users expect due to the differences between a virtual reality environment and a two-dimensional (2D) screen such as a phone screen. In addition, whereas most devices may have a cursor, virtual reality environments differ because a user has one or two virtual reality input devices (e.g., hand remotes) that interacts with three-dimensional (3D) space. This may cause an issue because the movement of the remote in the 3D VR environment does not translate to the same degree of motion precision as a cursor on a 2D plane. For example using a smartphone with a 2D screen to perform a copy and paste function is relatively straight forward by tapping and holding to highlight text. The user may have fine control as to what is selected by moving his or her finger along the screen to select text. This process is even more simplified for desktops and laptops with cursors to indicate where the highlighting of text begins and ends. However, in a virtual reality environment, the user is given a virtual reality input devices (e.g., hand remotes) that project a pointer onto surfaces of the virtual reality environment. These surfaces may be located far away from the user within the virtual reality environment. As such, when the user projects the pointer in an to attempt to select the desired text to copy and paste in a similar manner as a system with a 2D screen, the process is made difficult for the user especially if the text is small and far away (since any deviation in movement, when projected, is amplified proportionally with distance). Furthermore, gravity and hand jitters may add to the difficulty and imperfect manner of highlighting text because the level of motor control needed to handle the pointer is much higher compared to a cursor on a 2D screen.

To correct this issue, in particular embodiments, the virtual reality system may receive positional data of the pointer of the virtual reality input device that is projected on a surface (e.g., panel displaying an application) within a virtual reality environment. The virtual reality system may determine a path from the positional data of the projection onto the surface in the virtual reality environment. In particular embodiments, the virtual reality system may determine a path of the pointer within a predetermined time period. For example, the virtual reality system may determine the path of the pointer within the past 3 seconds. After determining the path, the client system may identify one or more words, which are displayed on the surface in the virtual reality environment, that are enclosed by the path. The virtual reality system may receive an instruction from the user to copy the one or more words enclosed by the path. In particular embodiments, the one or more words may be stored in a temporary storage. The virtual reality system may receive an input from the user indicating a location in the virtual reality environment. As an example and not by way of limitation, the user may click on a message box of an application. After receiving an input indicative of the location in the virtual reality environment, the virtual reality system may receive another instruction from the user to paste the one or more words. In particular embodiments, the user may select a paste option to perform the paste function. The virtual reality system may execute the paste function and display the one or more words at the location indicated by the user.

In particular embodiments, the user may wish to resize a text box associated with the one or more words enclosed by the path. For example, the user may have performed a big sweeping gesture and enclosed a larger portion of content than desired. The virtual reality system may receive an instruction to resize the text box. After initiating the resizing process, the user may use one or two virtual reality input devices (e.g., hand remotes) to resize the text box. As an example and not by way of limitation, the user may use the pointers of both virtual reality input devices to point at the corners of the text box and position the corners around the desired content. As another example and not by way of limitation, the user may use the pointers of both virtual reality input devices and select a left side and a right side of the text box. In particular embodiments, the resizing process may end after releasing buttons of the virtual reality input devices. In particular embodiments, the resizing process may end after the virtual reality system receives an input to end the resizing process.

Another goal of the disclosed methods is to implement a reorientation mode within the virtual reality environment. Usually users utilize their devices in a wide array of orientations. For example, users may use their smartphones and other devices sitting down at the kitchen table, walking down the street, in the car, laying down in bed, and even in the shower. However, current implementations of a virtual reality system are locked to either one orientation (e.g., a virtual movie theater appearing to be fixed in space as the user moves in it) or a headlock mode (e.g., the entire movie theater, including the screen and the seats, would always appear as if the user is facing forward in the theater, even if the user is physically facing up). Thus, if a virtual reality movie theater is fixed in space, the user would have to face forward in order to view the screen. If the virtual reality movie theater is fixed relative to the user's head, the user would have the unrealistic experience of seeing seats in front of him as if he is sitting down, even though he may be laying down. The disconnect between the visual scene and the user's body position may cause the user to experience disorientation and nausea. To add a more flexible environment, particular elements in the virtual reality environment may be reoriented to better accommodate the user. For example, the virtual movie screen may be decoupled from the virtual movie theater and be allowed to be custom anchored to a different position/orientation that is more convenient for the user (e.g., the user may wish to lay down and put the virtual movie screen on the ceiling of the virtual theater). In addition, user interfaces surrounding the user in the virtual reality environment (e.g., panels containing webpages and other opened applications) may be anchored in particular orientations in the virtual reality environment.

To implement the reorientation mode, particular embodiments of the virtual reality system may first generate virtual reality panel(s) to be reoriented (e.g., panels containing webpages and the like). The virtual reality panel may be fixed relative to a location in the virtual reality environment. As an example and not by way of limitation, the virtual reality panel (e.g., webpage) may be coupled to the center of a virtual reality movie theater. The virtual reality system may receive an input to enable a reorientation mode of the virtual reality panel within the virtual reality environment. As an example and not by way of limitation, the virtual reality system may receive a click of a button on a virtual reality input device (e.g., hand remote) to enable the reorientation mode. In another example and not by way of limitation, the virtual reality system may receive a click of a virtual reality button within the virtual reality environment. The enablement of the reorientation mode may allow the virtual reality panel to be reoriented relative to a viewpoint of the user. The virtual reality system may receive sensor data indicative of a change in the viewpoint of the user. As an example and not by way of limitation, the sensor data may be from one or more sensors (e.g., accelerometer, gyroscope, magnetometer, eye tracking sensors) located on the virtual reality system. The virtual reality system may reorient the virtual reality panel based on the received sensor data. After the user is done reorienting him or herself, such as lying down in a bed, the virtual reality system may receive an input to disable the reorientation mode. As an example and not by way of limitation, the user may click a button on the hand remote or click a virtual reality button to disable the reorientation mode. The disablement of the reorientation mode may fix the virtual reality panel relative to the new location in the virtual reality environment.

Another goal of the disclosed methods is to implement a reorientation mode within the virtual reality environment while traveling. For instance, users may want to use a virtual reality system in a traveling vehicle. The sensors (e.g., accelerometer, magnetometer, gyroscope, etc.) of the headset may detect movement of the vehicle and erroneously adjust the user interface (e.g., virtual reality panel) and/or virtual reality environment because of any movements, such as a car turning around a corner. To address this issue, a reorientation mode or "travel mode" may be used that dynamically alters the orientation of the user interface based on the detected movement related to external forces (e.g., a car moving, a plane moving, etc.). The travel mode may be the reorientation mode with the virtual reality panel with dampening to adjust for the slight movements in the vehicle. To implement a reorientation mode within the virtual reality environment while traveling, the virtual reality system may receive an input to enable a traveling reorientation mode of the virtual reality environment. Similarly to how the reorientation mode of the virtual reality panel is enabled, the traveling reorientation mode may be enabled through a click of a button on a virtual reality input device (e.g., hand remote) or click of a virtual button. The enablement of the traveling reorientation mode may set an initial orientation of the viewpoint of the user relative to the virtual reality environment. As an example and not by way of limitation, if the user is facing virtual reality movie theater with a display in the center, the initial orientation may be set with the display in the center of the virtual reality movie theater. The virtual reality system may receive sensor data indicative of a change in orientation. From the sensor data, the virtual reality system may adjust the viewpoint of the user relative to the virtual reality environment based on the sensor data. The virtual reality system may readjust the viewpoint of the user back to the initial orientation relative to the virtual reality environment. As an example and not by way of limitation, the virtual reality system may adjust the viewpoint so the display is in the center of the virtual reality movie theater. In particular embodiments, the virtual reality system may determine that the sensor data is indicative of a change in orientation due to a motion of the vehicle the user is occupying and readjust the viewpoint of the user back to the initial orientation relative to the virtual reality environment in response to determining the change in orientation is due to vehicular motion. As an example and not by way of limitation, if the virtual reality system determines that the viewpoint changed because of the vehicle turned around a corner, the viewpoint will return to the initial orientation.

Disclosed herein are a variety of different ways of rendering and interactive with a virtual (or augmented) reality environment. A virtual reality system may render a virtual environment, which may include a virtual space that is rendered for display to one or more users. The users may view and interact within this virtual space and the broader virtual environment through any suitable means. One goal of the disclosed methods is to provide an intuitive experience for users—one that gives the users a sense of "presence," or the feeling that they are actually in the virtual environment.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
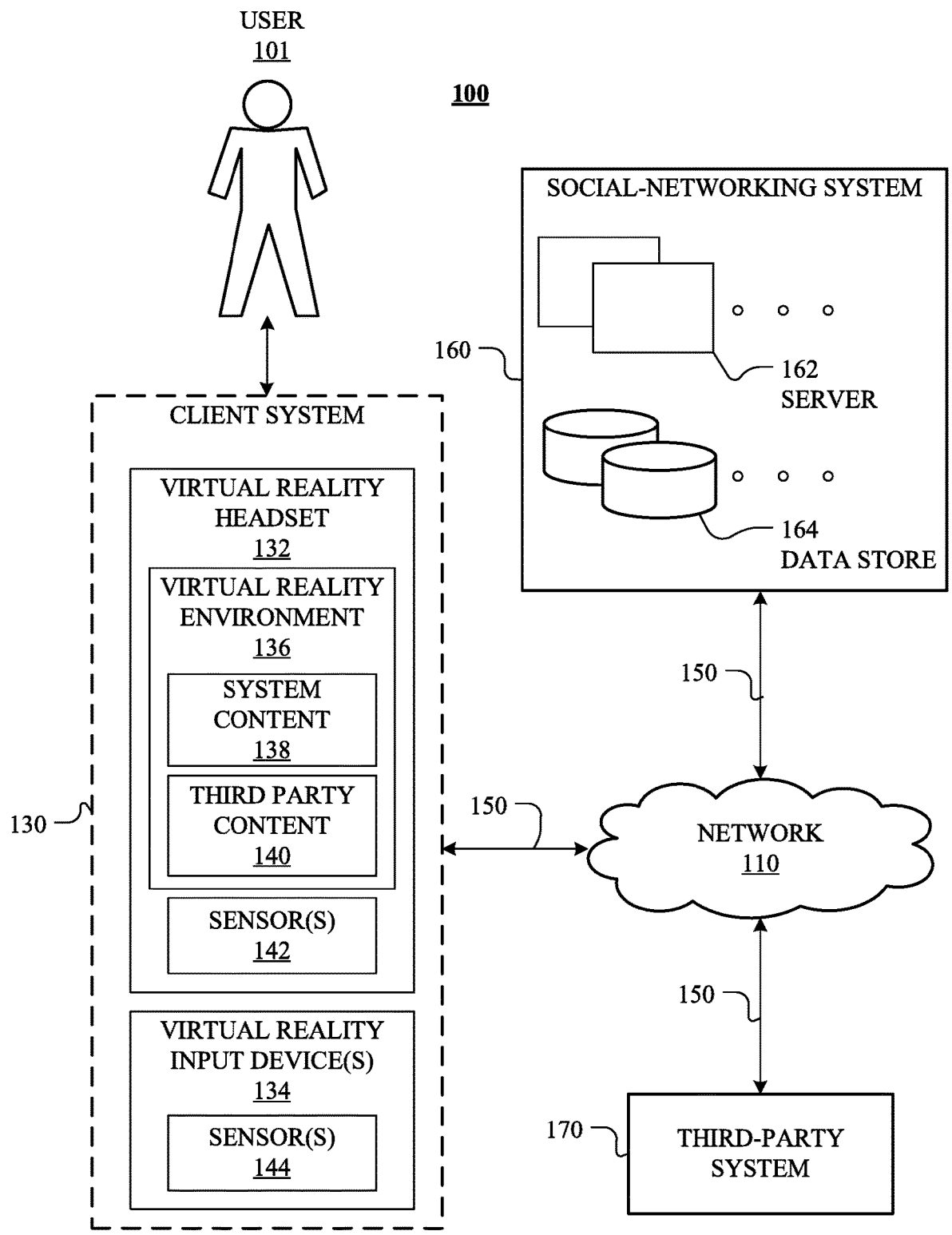
FIG. 1 illustrates an example network environment associated with a virtual reality system.

FIG. 1 illustrates an example network environment 100 associated with a virtual reality system. Network environment 100 includes a user 101 interacting with a client system 130, a social-networking system 160, and a third-party system 170 connected to each other by a network 110. Although FIG. 1 illustrates a particular arrangement of a user 101, a client system 130, a social-networking system 160, a third-party system 170, and a network 110, this disclosure contemplates any suitable arrangement of a user 101, a client system 130, a social-networking system 160, a third-party system 170, and a network 110. As an example and not by way of limitation, two or more of a user 101, a client system 130, a social-networking system 160, and a third-party system 170 may be connected to each other directly, bypassing a network 110. As another example, two or more of a client system 130, a social-networking system 160, and a third-party system 170 may be physically or logically co-located with each other in whole or in part. Moreover, although FIG. 1 illustrates a particular number of users 101, client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple users 101, client systems 130, social-networking systems 160, third-party systems 170, and networks 110.

This disclosure contemplates any suitable network 110. As an example and not by way of limitation, one or more portions of a network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 110 may include one or more networks 110.

Links 150 may connect a client system 130, a social-networking system 160, and a third-party system 170 to a communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout a network environment 100. One or more first links 150 may differ in one or more respects from one or more second links 150.

In particular embodiments, a client system 130 may be an electronic device including hardware, software, or embedded logic components or a combination of two or more such components and capable of carrying out the appropriate functionalities implemented or supported by a client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, virtual reality headset and controllers, other suitable electronic device, or any suitable combination thereof. This disclosure contemplates any suitable client systems 130. A client system 130 may enable a network user at a client system 130 to access a network 110. A client system 130 may enable its user to communicate with other users at other client systems 130. A client system 130 may generate a virtual reality environment for a user to interact with content.

In particular embodiments, a client system 130 may include a virtual reality (or augmented reality) headset 132, such as OCULUS RIFT and the like, and virtual reality input device(s) 134, such as a virtual reality controller. A user at a client system 130 may wear the virtual reality headset 132 and use the virtual reality input device(s) to interact with a virtual reality environment 136 generated by the virtual reality headset 132. Although not shown, a client system 130 may also include a separate processing computer and/or any other component of a virtual reality system. A virtual reality headset 132 may generate a virtual reality environment 136, which may include system content 138 (including but not limited to the operating system), such as software or firmware updates and also include third-party content 140, such as content from applications or dynamically downloaded from the Internet (e.g., web page content). A virtual reality headset 132 may include sensor(s) 142, such as accelerometers, gyroscopes, magnetometers to generate sensor data that tracks the location of the headset device 132. The headset 132 may also include eye trackers for tracking the position of the user's eyes or their viewing directions. The client system may use data from the sensor(s) 142 to determine velocity, orientation, and gravitation forces with respect to the headset. Virtual reality input device(s) 134 may include sensor(s) 144, such as accelerometers, gyroscopes, magnetometers, and touch sensors to generate sensor data that tracks the location of the input device 134 and the positions of the user's fingers. The client system 130 may make use of outside-in tracking, in which a tracking camera (not shown) is placed external to the virtual reality headset 132 and within the line of sight of the virtual reality headset 132. In outside-in tracking, the tracking camera may track the location of the virtual reality headset 132 (e.g., by tracking one or more infrared LED markers on the virtual reality headset 132). Alternatively or additionally, the client system 130 may make use of inside-out tracking, in which a tracking camera (not shown) may be placed on or within the virtual reality headset 132 itself. In inside-out tracking, the tracking camera may capture images around it in the real world and may use the changing perspectives of the real world to determine its own position in space.

Third-party content 140 may include a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at a client system 130 may enter a Uniform Resource Locator (URL) or other address directing a web browser to a particular server (such as server 162, or a server associated with a third-party system 170), and the web browser may generate a Hyper Text Transfer Protocol (HTTP) request and communicate the HTTP request to server. The server may accept the HTTP request and communicate to a client system 130 one or more Hyper Text Markup Language (HTML) files responsive to the HTTP request. The client system 130 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web interface encompasses one or more corresponding source files (which a browser may use to render the web interface) and vice versa, where appropriate.

In particular embodiments, the social-networking system 160 may be a network-addressable computing system that can host an online social network. The social-networking system 160 may generate, store, receive, and send social-networking data, such as, for example, user-profile data, concept-profile data, social-graph information, or other suitable data related to the online social network. The social-networking system 160 may be accessed by the other components of network environment 100 either directly or via a network 110. As an example and not by way of limitation, a client system 130 may access the social-networking system 160 using a web browser of a third-party content 140, or a native application associated with the social-networking system 160 (e.g., a mobile social-networking application, a messaging application, another suitable application, or any combination thereof) either directly or via a network 110. In particular embodiments, the social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, the social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, the social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. The social-networking system 160 may provide users of the online social network the ability to communicate and interact with other users. In particular embodiments, users may join the online social network via the social-networking system 160 and then add connections (e.g., relationships) to a number of other users of the social-networking system 160 whom they want to be connected to. Herein, the term "friend" may refer to any other user of the social-networking system 160 with whom a user has formed a connection, association, or relationship via the social-networking system 160.

In particular embodiments, the social-networking system 160 may provide users with the ability to take actions on various types of items or objects, supported by the social-networking system 160. As an example and not by way of limitation, the items and objects may include groups or social networks to which users of the social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 160 or by an external system of a third-party system 170, which is separate from the social-networking system 160 and coupled to the social-networking system 160 via a network 110.

In particular embodiments, the social-networking system 160 may be capable of linking a variety of entities. As an example and not by way of limitation, the social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating the social-networking system 160. In particular embodiments, however, the social-networking system 160 and third-party systems 170 may operate in conjunction with each other to provide social-networking services to users of the social-networking system 160 or third-party systems 170. In this sense, the social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 160 also includes user-generated content objects, which may enhance a user's interactions with the social-networking system 160. User-generated content may include anything a user can add, upload, send, or "post" to the social-networking system 160. As an example and not by way of limitation, a user communicates posts to the social-networking system 160 from a client system 130. Posts may include data such as status updates or other textual data, location information, photos, videos, links, music or other similar data or media. Content may also be added to the social-networking system 160 by a third-party through a "communication channel," such as a newsfeed or stream.

In particular embodiments, the social-networking system 160 may include a variety of servers, sub-systems, programs, modules, logs, and data stores. In particular embodiments, the social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 160 may also include suitable components such as network interfaces, security mechanisms, load balancers, failover servers, management-and-network-operations consoles, other suitable components, or any suitable combination thereof. In particular embodiments, the social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 160 to one or more client systems 130 or one or more third-party systems 170 via a network 110. The web server may include a mail server or other messaging functionality for receiving and routing messages between the social-networking system 160 and one or more client systems 130. An API-request server may allow a third-party system 170 to access information from the social-networking system 160 by calling one or more APIs. An action logger may be used to receive communications from a web server about a user's actions on or off the social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from a client system 130 responsive to a request received from a client system 130. Authorization servers may be used to enforce one or more privacy settings of the users of the social-networking system 160. A privacy setting of a user determines how particular information associated with a user can be shared. The authorization server may allow users to opt in to or opt out of having their actions logged by the social-networking system 160 or shared with other systems (e.g., a third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

FIGS. 2A-2G illustrate an example process for maintaining the security of the user when using user interface elements in a virtual reality environment 200. In particular embodiments, a client system 130 or a virtual reality system may render a virtual space for display to a user on a display device. In particular embodiments, the virtual reality system may be a local system that includes devices present locally with respect to a user of the virtual reality system. In particular embodiments, the virtual reality system may be a remote device (e.g., a remote server computing machine) or may at least include a remote device. As an example and not by way of limitation, the virtual reality system may be defined to include a server of the social-networking system 160. As another example and not by way of limitation, the virtual reality system may be defined to include a server of the social-networking system 160 as well as a local computing device. In particular embodiments, the virtual space may be an augmented reality space in which virtual elements are overlaid on the real world. As an example and not by way of limitation, the virtual reality system may continuously capture images of the real world (e.g., using a camera on the headset of the user) and overlay virtual objects or avatars of other users on these images, such that a user may interact simultaneously with the real world and the virtual world. In particular embodiments, the user may view the virtual space using a headset device. As an example and not by way of limitation, referencing FIG. 2A, the user may mount a virtual reality headset 132 on the user's head. In particular embodiments, the headset device may be a device that may be mounted, placed, or otherwise connected to the user's head. In particular embodiments, the headset device may include a display mechanism that displays a region of the virtual space to the user. As an example and not by way of limitation, the display mechanism may include a screen that displays the region of the virtual space. As another example and not by way of limitation, the display mechanism may be a projector that directly projects a display of the region of the virtual space to an optimal point in the user's eyes (e.g., to the fovea of each of the user's eyes).

Figure 2A:
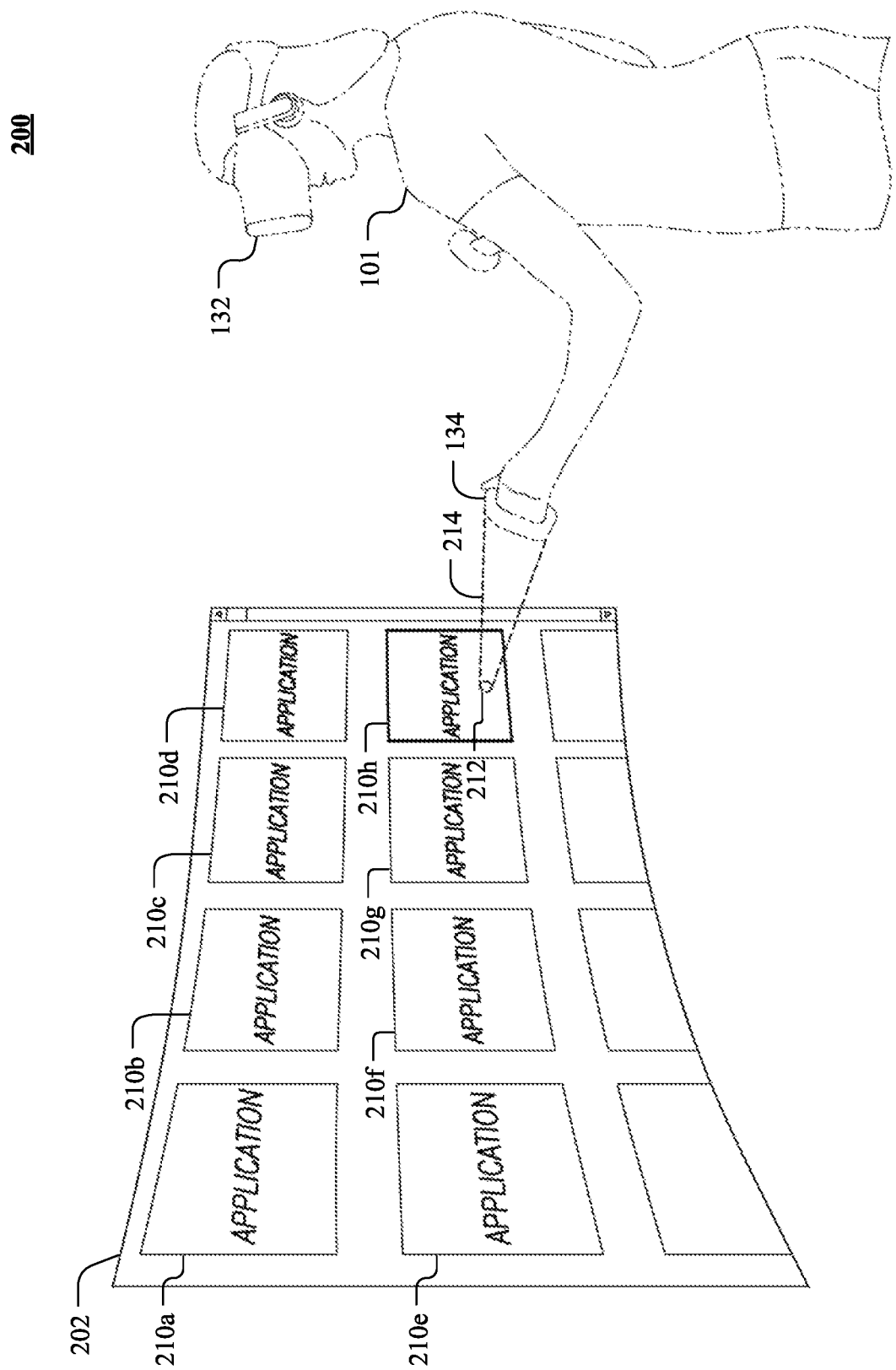
FIGS. 2A-2G illustrates an example of a user interacting with multiple user interface elements in a virtual reality environment.

In particular embodiments, the client system 130 may use the virtual reality headset 132 to render, in a virtual space, a panel 202 that includes one or more applications 210a-210h, such as third-party applications that include games, a web browser, and any other kind of applications that may be supported by a virtual reality system. FIG. 2A illustrates a user 101 wearing a virtual reality headset 132 and using virtual reality input devices 134 to interact with a virtual reality environment 200. In particular embodiments, the user 101 may open the panel 202 by interacting with the virtual reality environment 200 (e.g., touching a virtual reality element within the virtual reality environment 200) or by inputting an input into the virtual reality input device(s) 134 (e.g., clicking a button). As illustrated in FIG. 2A, the user 101 may see a pointer 212 and a pointer path 214 within the virtual reality environment 200 to visualize where the user 101 is pointing with the virtual reality input devices 134. The user 101 may be able to select any of the applications 210a-210h (e.g., application 210h, which may be a web browser) as shown in FIG. 2A by pointing the pointer 212 at a desired location and inputting an input into the virtual reality input device(s) 134 (e.g., clicking a button).

Figure 2B:
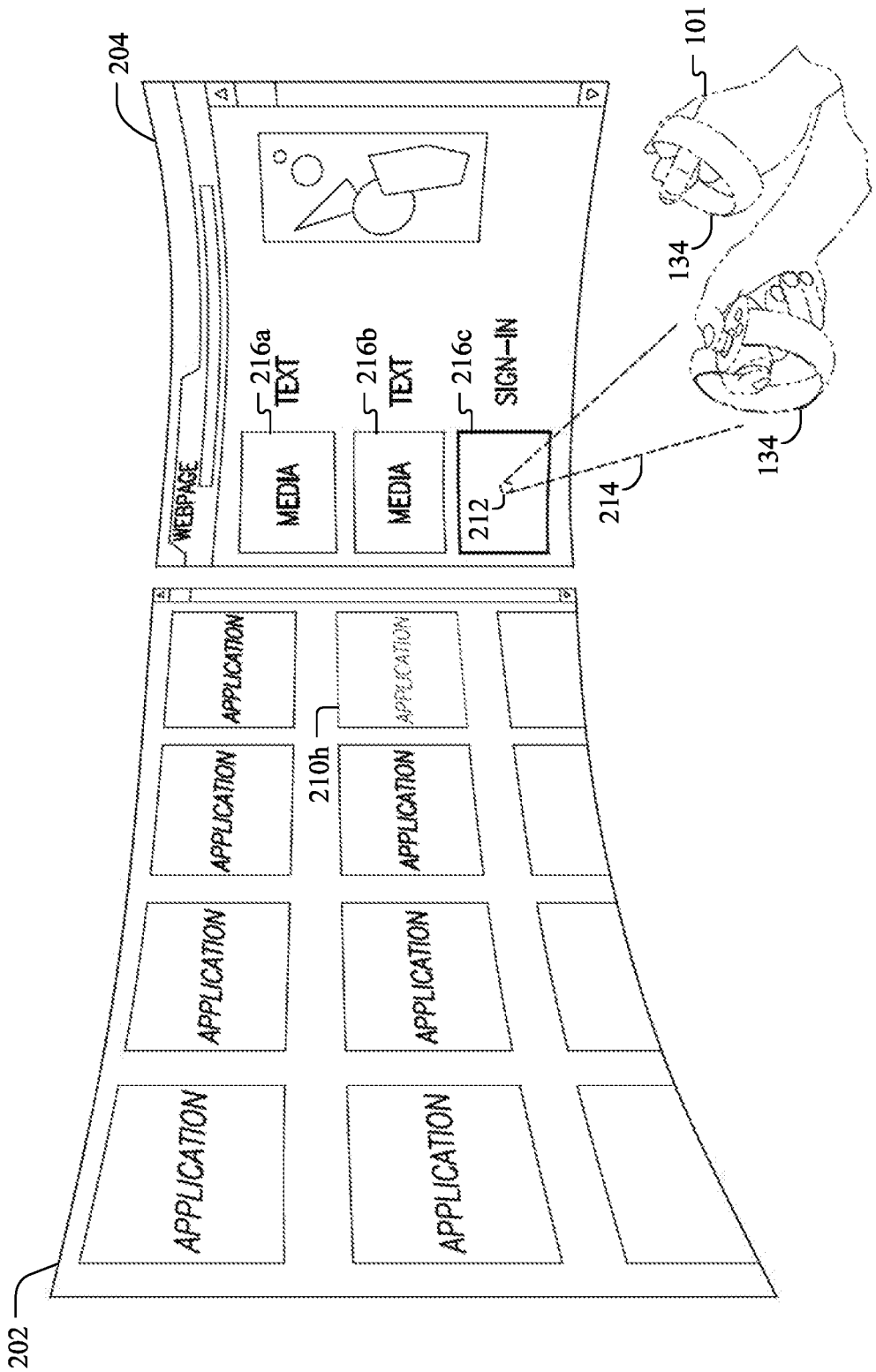
Figure 2C:
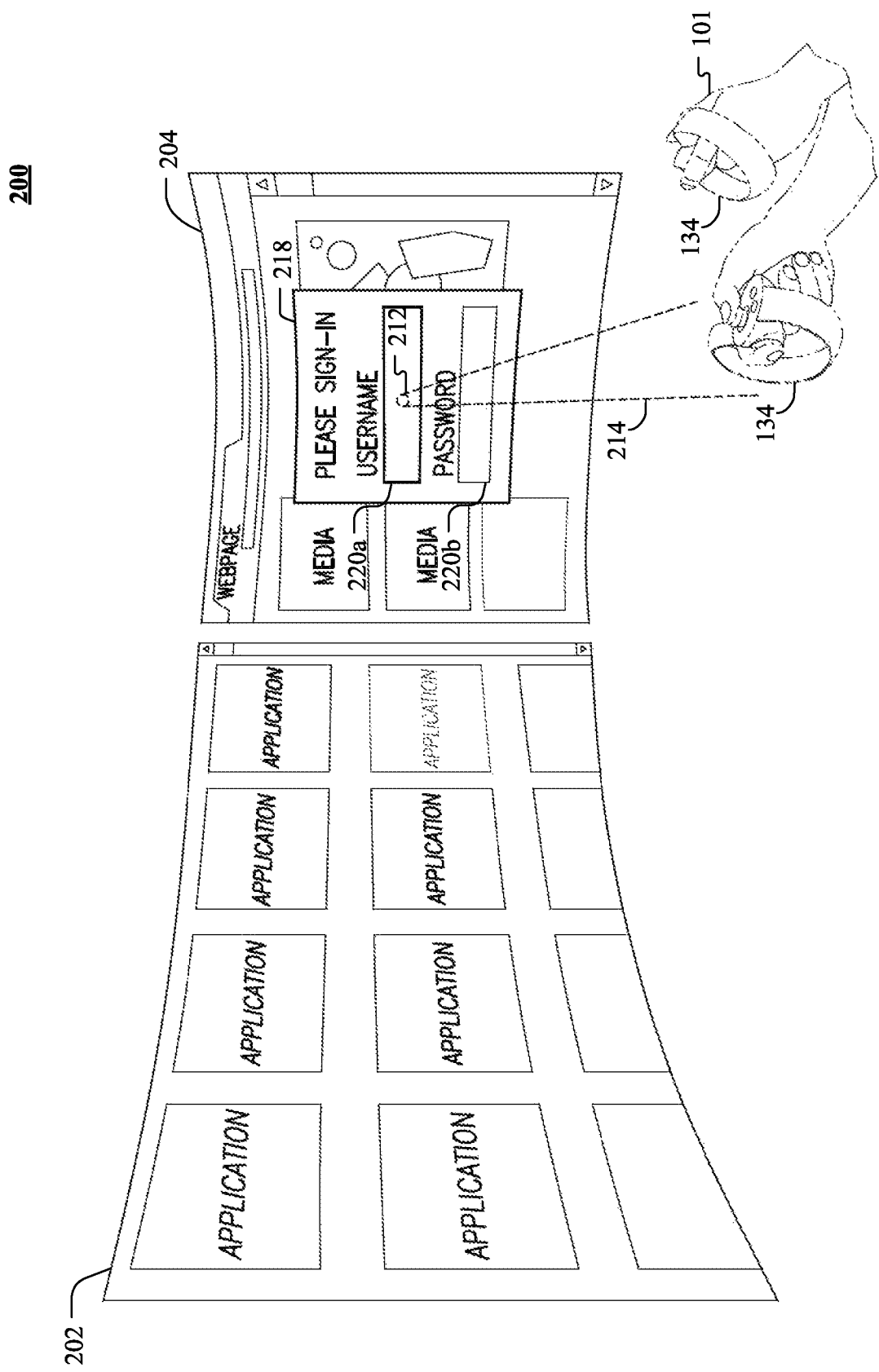
Figure 2D:
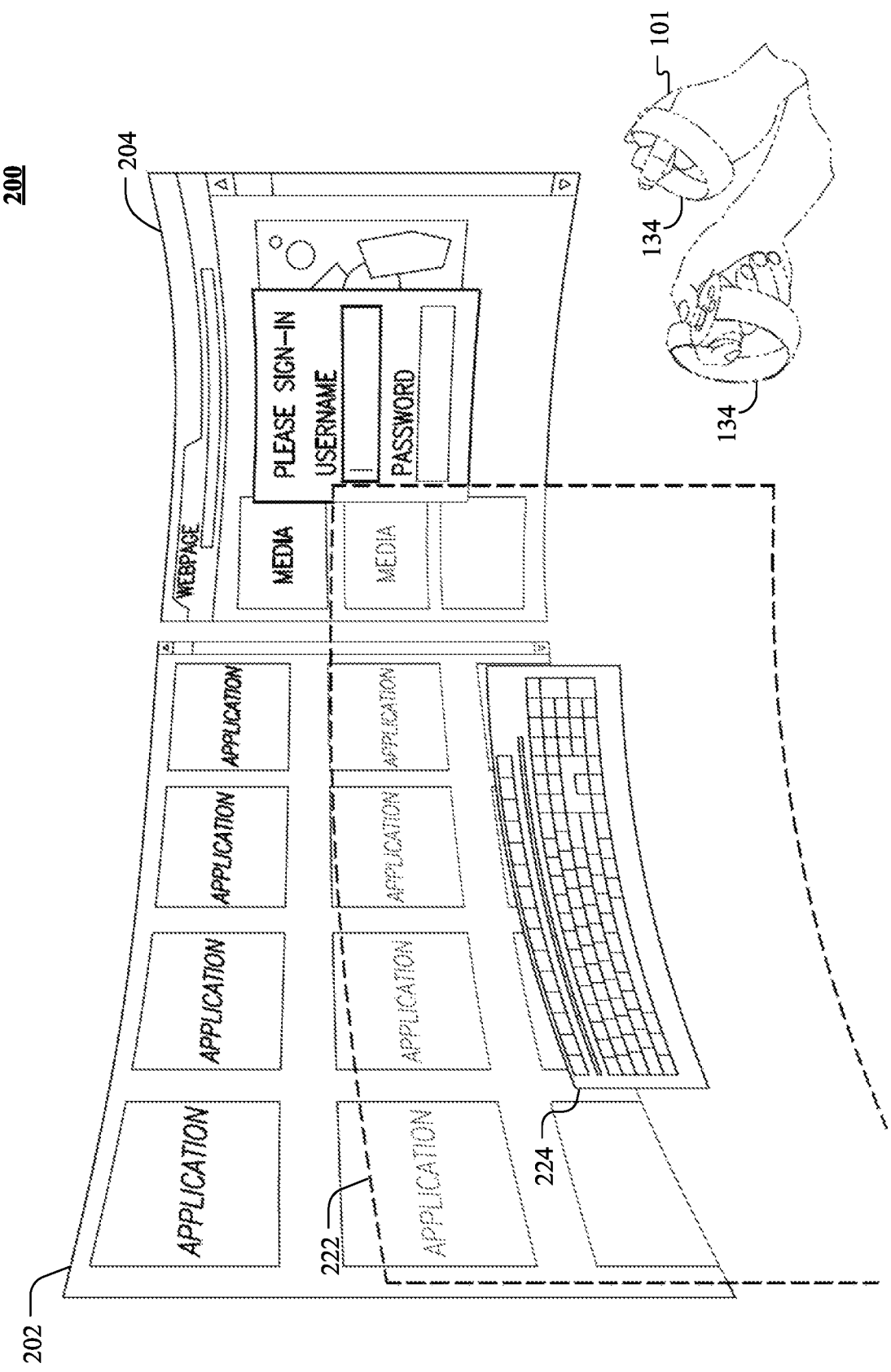

FIG. 2B illustrates the result of selecting the application 210h (e.g., a web browser), which may cause the display of a panel 204 for the application 210h. In particular embodiments, the application 210h may include a plurality of selectable media 216a-216c and a media 216c to sign-in. As illustrated in FIG. 2B, the user 101 may select the media 216c by pointing the pointer 212 at a desired location and inputting an input into the virtual reality input device(s) 134. In particular embodiments, the application 210h may be grayed out to highlight that it is an opened application. FIG. 2C illustrates after selecting the media 216c a sign-in box 218 related to third-party content may appear, which may include input fields 220a-220b. As illustrated in FIG. 2C, the user 101 may "click" on an input field 220a to proceed with inputting the information to sign-in to use third-party content associated with the media 216c. Although the sign-in box 218 is associated with the media 216c, the sign-in box 218 may be associated with other third-party content, such as other applications or other media 216a-216b. FIG. 2D illustrates that a dedicated plane 222 is generated to display a user interface element 224 (e.g., a keyboard) to receive the input from the user 101. In particular embodiments, the dedicated plane 222 may be a dedicated space for third-party content that is generated. As an example and not by way of limitation, the dedicated plane 222 may be for a third-party keyboard which may be differentiated from a system keyboard to caution users to be wary whether to use that keyboard and/or whether a user should discontinue interacting with the third-party application that generated the keyboard. In particular embodiments, the dedicated plane 222 is transparent and is only shown for reference to where third-party user interface elements, such as user interface element 224, are displayed after being generated by the client system 130. The dedicated plane 222 may represent a plane that may revolve 360 degrees around the user 101. In particular embodiments, the user interface element 224 may be embodied as any other suitable user interface element to receive user input. In particular embodiments, the client system 130 may also generate a warning (e.g., a pop-up box with a warning) in the dedicated plane 222 to indicate the user interface element 224 is not a system keyboard and may also caution users from using the keyboard. To do so, the client system 130 may determine the user interface element 224 is a third-party keyboard and issue the warning in response to the determination.

Figure 2E:
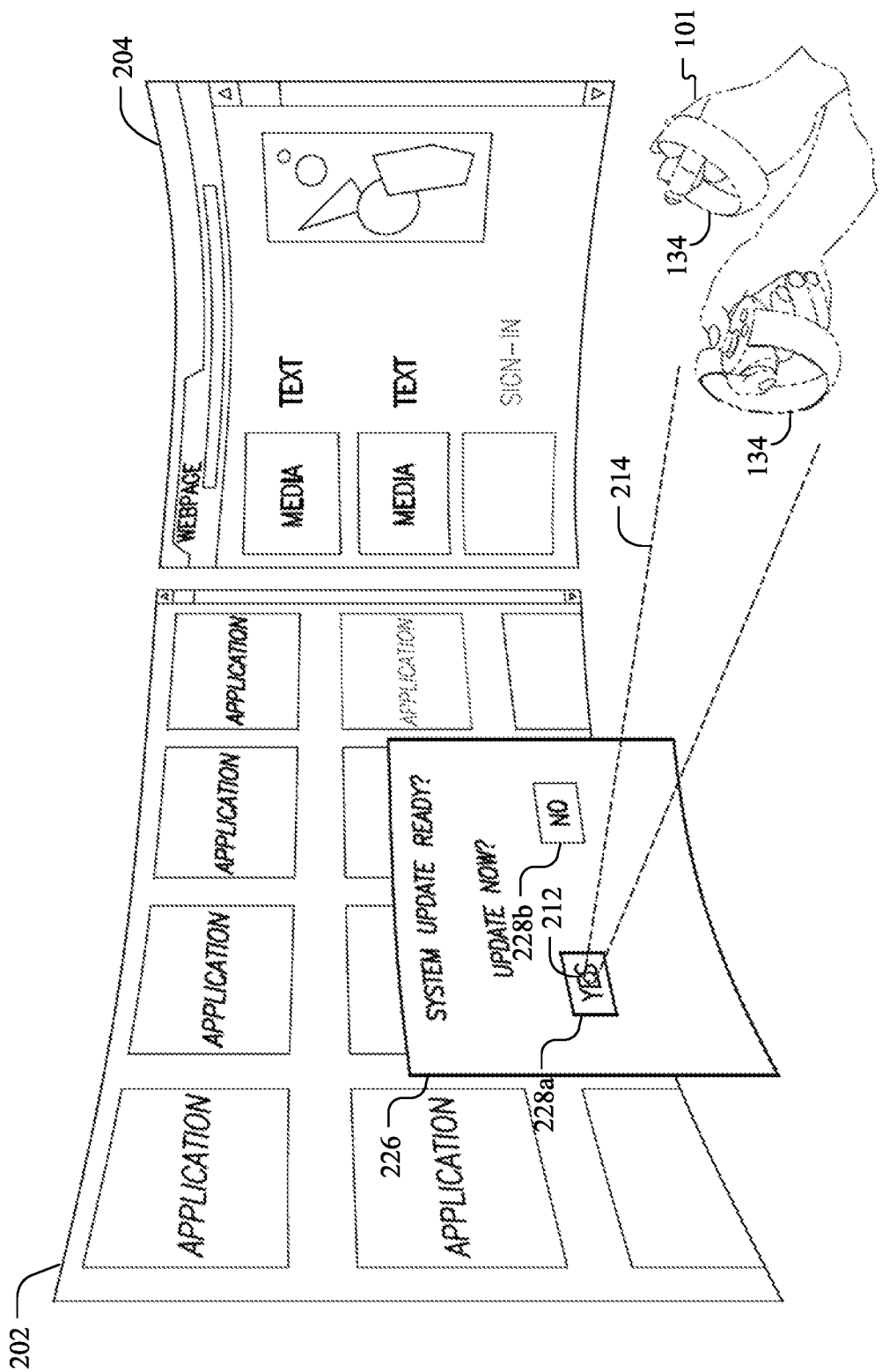
Figure 2F:
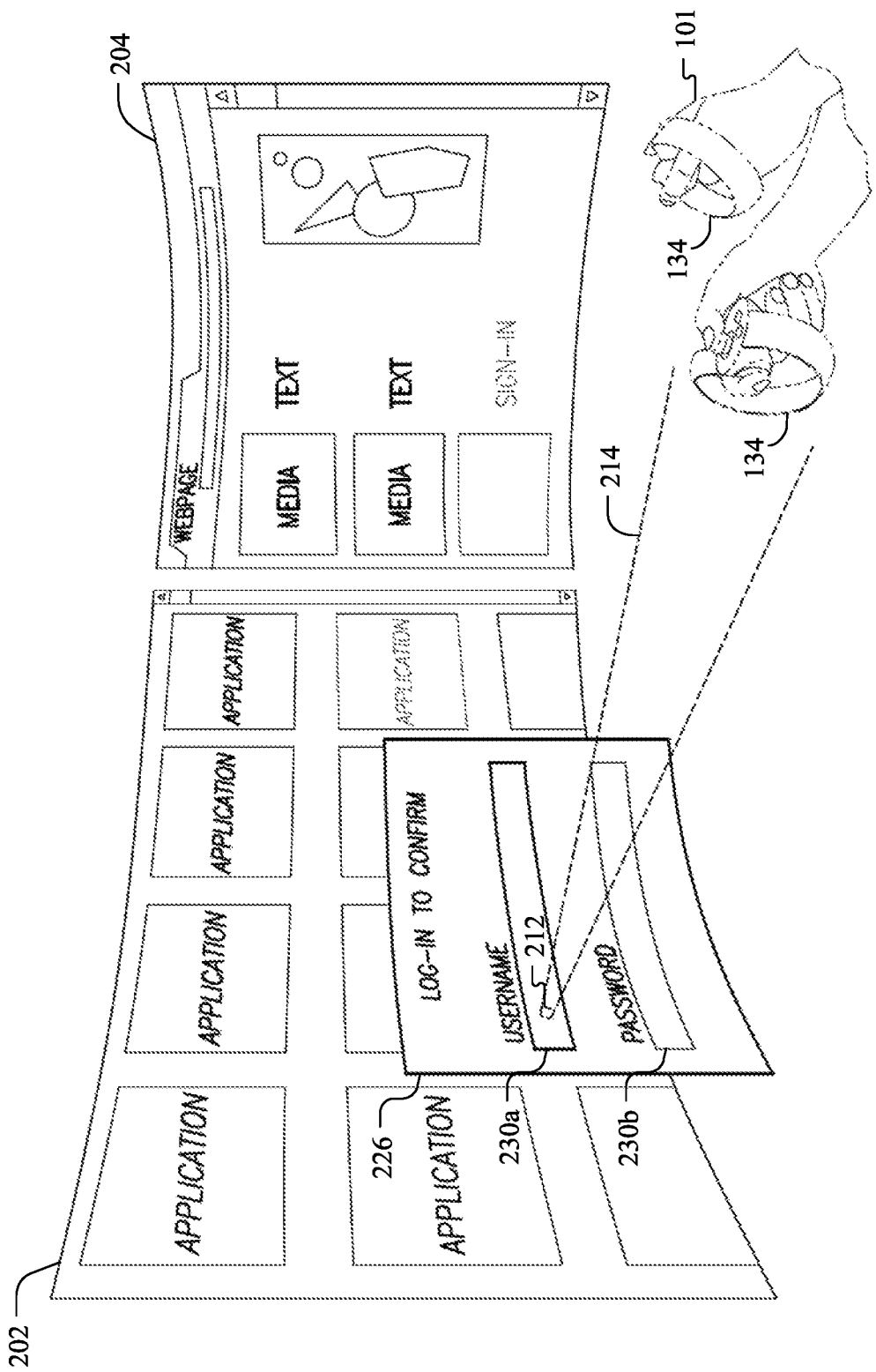
Figure 2G:
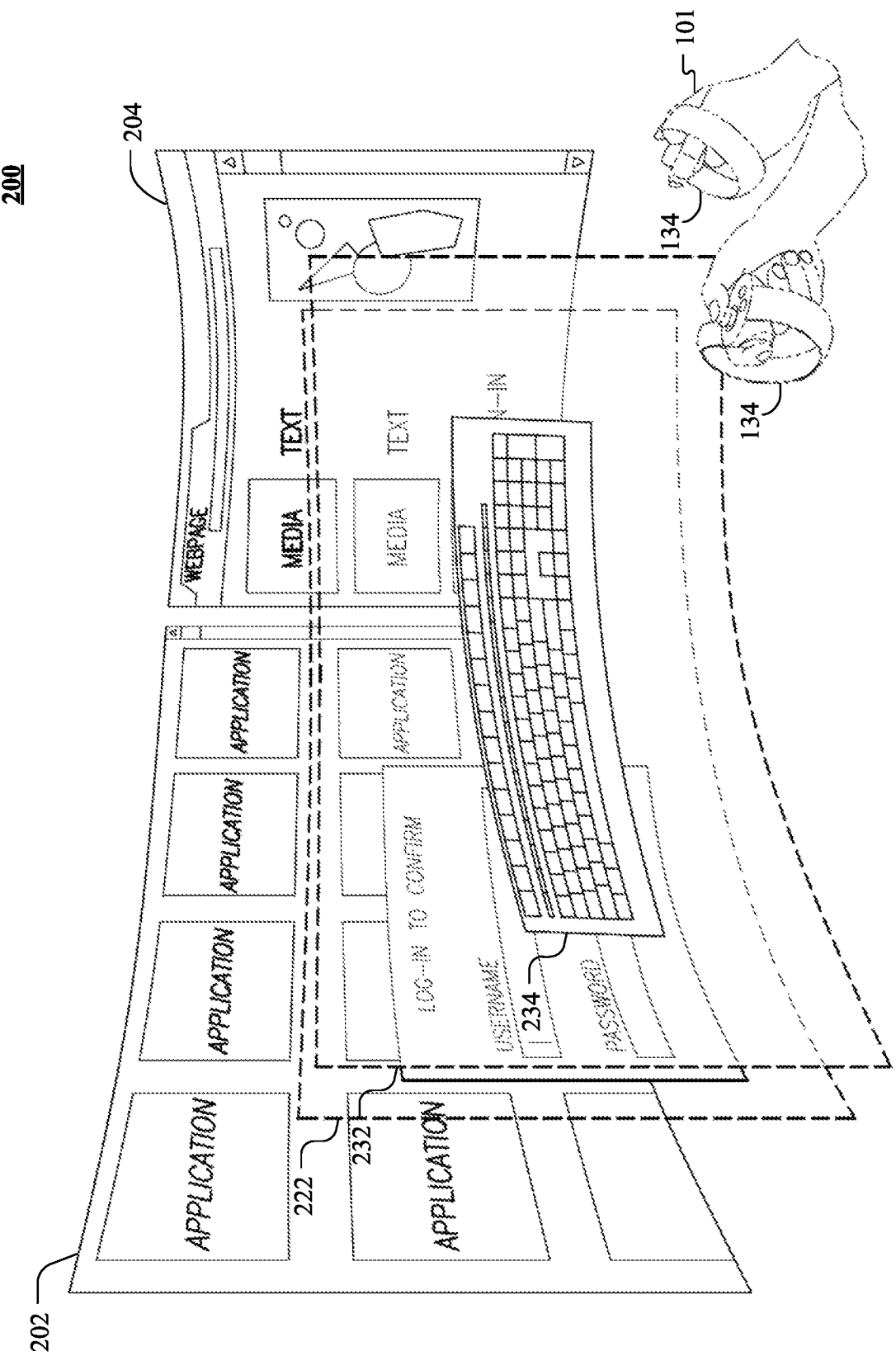

FIG. 2E illustrates a system content (e.g., user interface generated by the operating system) appearing within the virtual reality environment 200 in the form of a system update box 226 that includes a plurality of confirmation buttons 228a-228b. As further illustrated by FIG. 2E, the user 101 may be able to select the "Yes" confirmation button 228a to confirm an update to the system by inputting an input into a virtual reality input device 134. In particular embodiments, OS content may be differentiated from third-party content by including additional elements (e.g., a border around OS content), have a different style or layout (e.g., a black keyboard vs. a light keyboard), or any combination thereof. In particular embodiments, the client system 130 may determine whether the request for a keyboard is for a system keyboard or a third-party keyboard. As an example and not by way of limitation, the client system 130 may determine whether the system generated a keyboard to be displayed for user input or a third-party application generated a keyboard for user input. FIG. 2F illustrates the result of selecting the "Yes" confirmation button 228a, which may cause the display of input fields 230a-230b which the user 101 may select by pointing the pointer 212 at a desired location and inputting an input into a virtual reality input device 134 (e.g., clicking a button). FIG. 2G shows that after selecting the input field 230a, another dedicated plane 232 is generated with a user interface element 234 (e.g., a keyboard) for the user 101 to input their information into the input field 230a. In particular embodiments, the dedicated plane 222 and the dedicated plane 232 are separate planes that reference a space that generated user interface elements may be displayed for the user 101 to interact. In particular embodiments, the dedicated plane 222 may be a plane dedicated to third-party content (e.g., pop-up windows, content, tools, user interfaces, etc.), such as from applications and the like. In particular embodiments, the dedicated plane 232 may be a plane dedicated to OS content, such as user interfaces generated by the system and the like. In particular embodiments, when a third-party application requests the OS to provide a user interface or content that is generated by the OS (e.g., a third-party application may call an OS API to invoke the system's virtual keyboard), the resulting interface or content may be displayed in the dedicated plane 232 for the OS. In contrast, if the third-party application generates its own content or user interface, the generated content or user interface may be presented in the dedicated plane 222. In particular embodiments, the dedicated plane 222 may be distinct from the dedicated plane 232 based on a variety of factors, such as depth, layout, style, etc. In particular embodiments, the dedicated plane 232 may be closer to the user 101 within the virtual reality environment 200 than the dedicated plane 222 to differentiate the dedicated plane 232 from the dedicated plane 222. By having the dedicated plane 232 closer, a user 101 may be able to identify that the user interface element 234 in the dedicated plane 232 is an OS content. In particular embodiments, by differentiating the plane 222 dedicated to third-party content and the plane 232 dedicated to OS content, security of the user 101 may be improved by preventing third-party entities to generate third-party content that may be used to attempt to obtain the user's 101 confidential information.

Figure 3A:
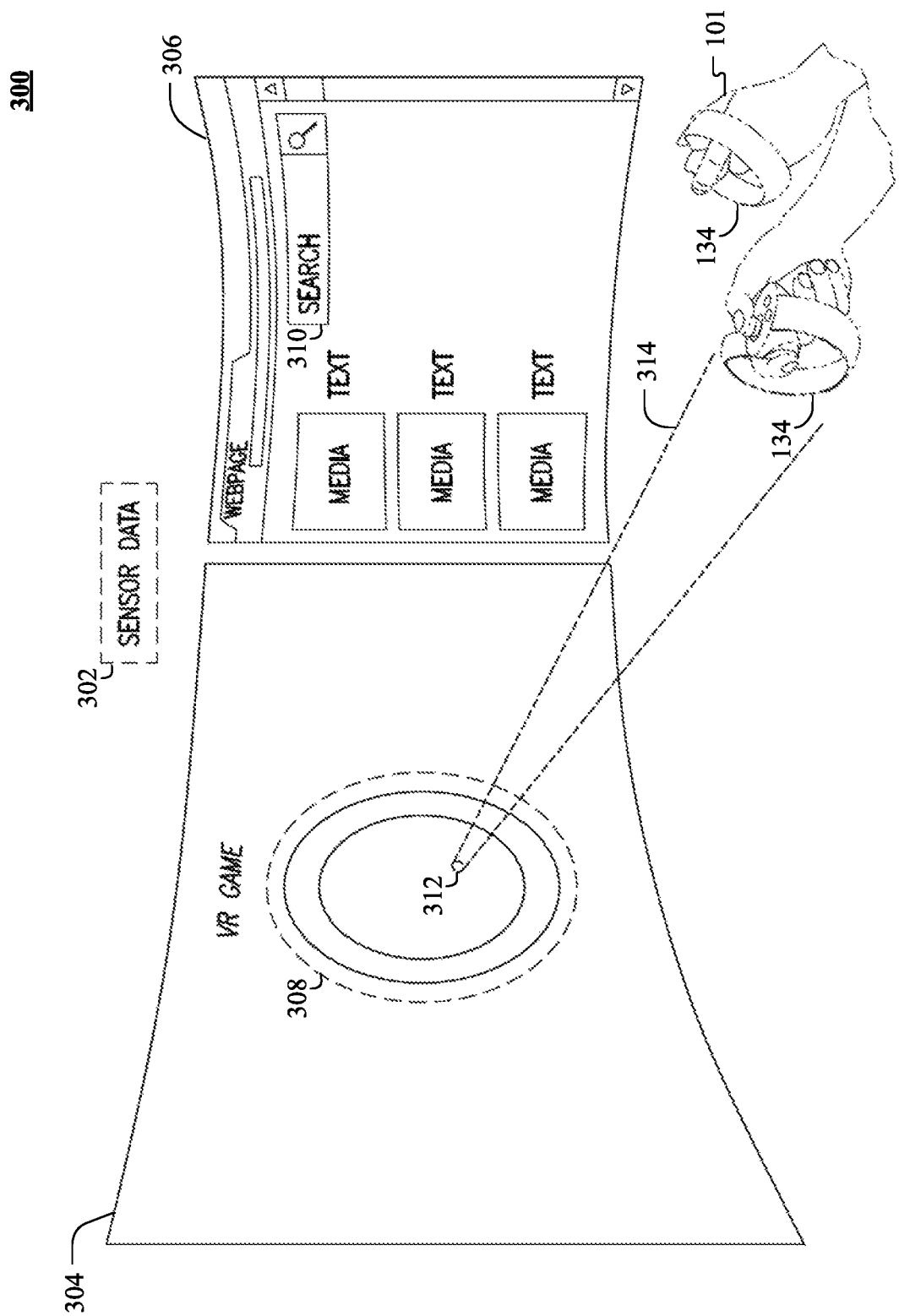
FIGS. 3A-3C illustrates an example of the user interacting with multiple applications in the virtual reality environment.
Figure 3B:
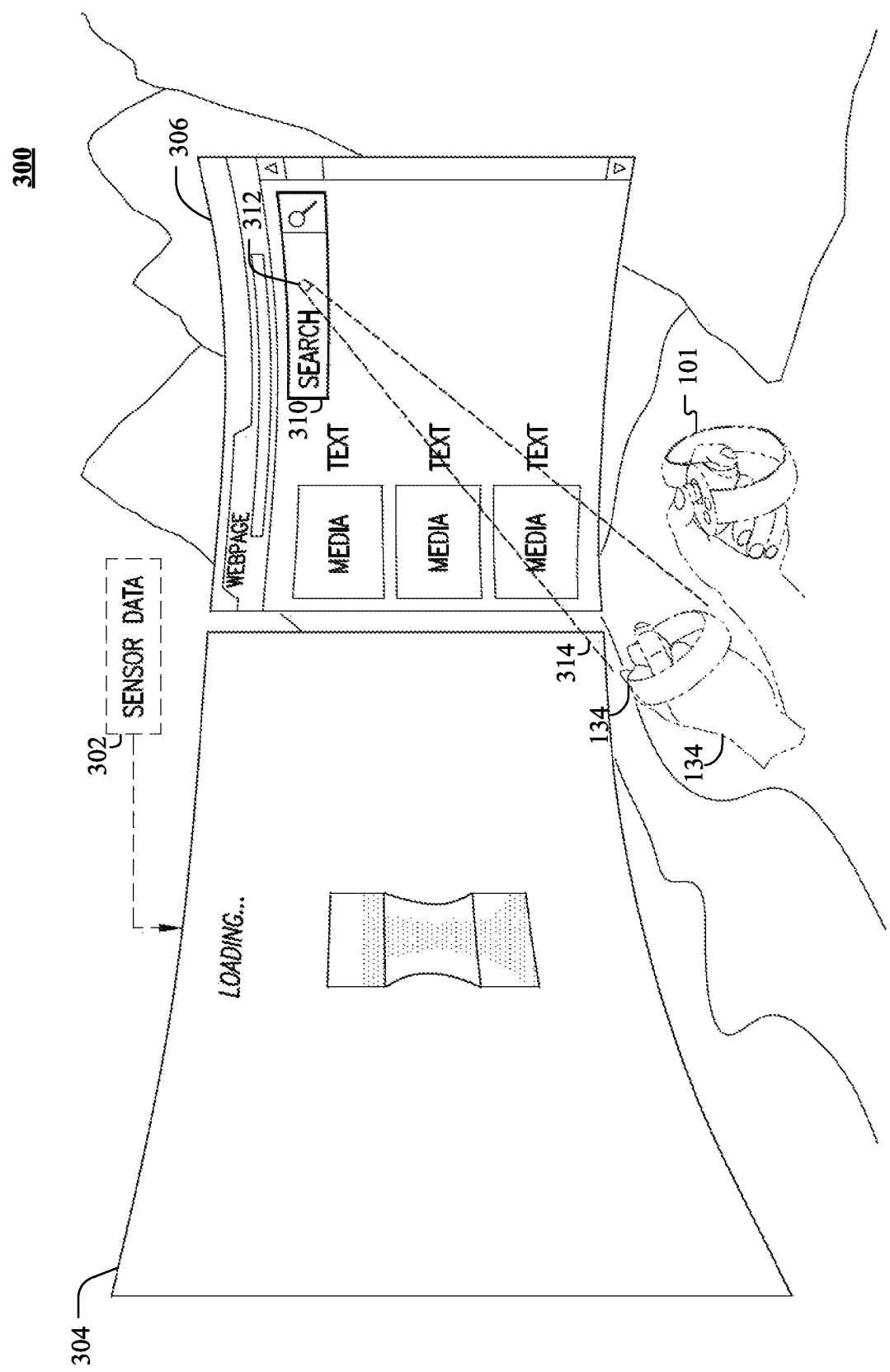
Figure 3C:
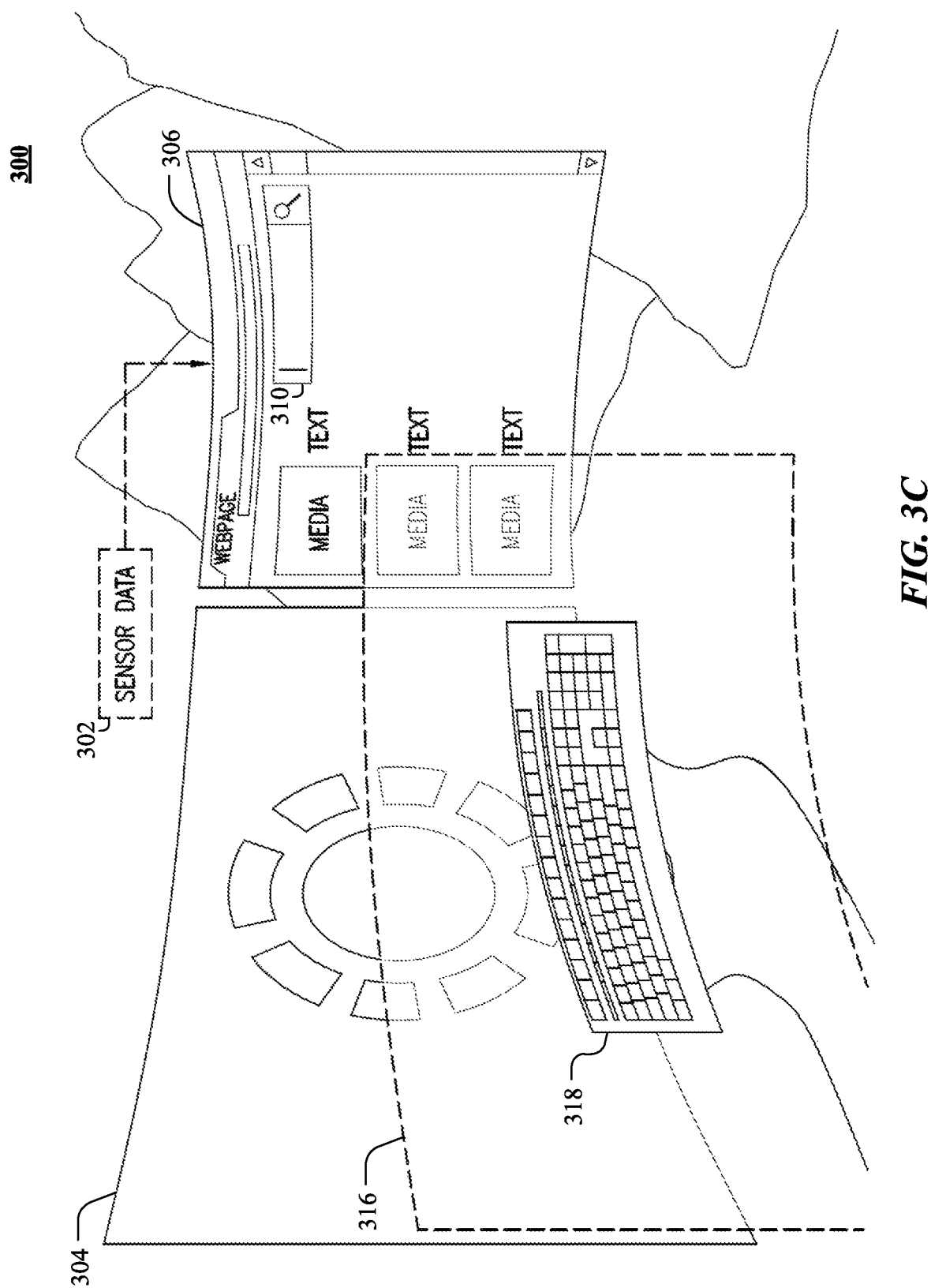

FIGS. 3A-3C illustrate an example multitasking situation a user 101 may engage within a virtual reality environment 300. Similarly as in FIGS. 2A-2G, the client system 130 may use the virtual reality headset 132 to render the virtual reality environment including the virtual reality elements discussed. FIG. 3A illustrates a virtual reality environment 300 that includes sensor data 302 collected in the background by sensors 142, 144 and panels 304, 306 that include applications that have been selected by the user 101. FIG. 3A illustrates the user 101 directing the virtual reality input device 134 towards an initiation button 308 of an application (e.g., VR Game) with a pointer 312 and pointer path 314. In particular embodiments, panel 304 and panel 306 may display any kind of selected application as described above. In particular embodiments panel 306 may include an interactive field 310 (e.g., search box). As illustrated in FIG. 3A, the user 101 may be able to "click" on the initiation button 308 of the application by pointing the pointer 312 at a desired location and inputting an input into the virtual reality input device 134 (e.g. clicking a button).

FIG. 3B illustrates the result of pressing the initiation button 308, which may cause the virtual reality environment 300 to change according to content related to the application loaded in the panel 304 (e.g., VR Game). In particular embodiments, the virtual reality environment 300 does not necessarily have to change, it may remain the same. In particular embodiments, the selection of the application of panel 304 may authorize the application of panel 304 to receive sensor data 302 from the sensors 142, 144. In particular embodiments, the application of panel 304 may request sensor data 302 to be sent to the application of panel 304 and the client system 130 may identify the application is authorized to receive sensor data 302 based on the user 101 recently interfacing the application (e.g., selecting the application to initiate the application). In particular embodiments, the sensor data 302 may be used for interacting with the virtual reality environment 300 in the context of the application, such as moving within the virtual reality environment 300 and viewing content of the virtual reality environment 300. In particular embodiments, the sensor data 302 may be associated with particular applications, and such information may be used by the system to determine whether particular sensor data 302 is accessible to a particular application (e.g., the application of panel 304). As illustrated in FIG. 3B, the user 101 may select the interactive box 310 of the application displayed in the panel 306 while interacting with the virtual reality environment 300 generated by the application of panel 304 by pointing the pointer 312 at a desired location and inputting an input into the virtual reality input device(s) 134 (e.g., clicking a button). While the user's interactions are directed towards the virtual reality environment 300 generated by the application of panel 304, the measured sensor data 302 (e.g., eye tracking data, position and orientation data associated with the head-mounted device, movement of the controllers, etc.) may be made available to the application of the panel 304. However, while the user 101 is interacting (e.g., including looking at the panel 306, pointing at it, or clicking within it) with the application displayed in the panel 306, the corresponding sensor data may be restricted from being accessed by the application of panel 304.

FIG. 3C illustrates the result of selecting the interactive box 310, which may cause a dedicated plane 316 to be generated and display a user interface element 318 to receive an input to the interactive box 310. In particular embodiments, the interaction with the application of the panel 306 may revoke the authorization of the application of panel 304 to receive sensor data 302 and authorize the application of panel 306 to receive sensor data 302. In particular embodiments, the user's interaction or interfacing activity with an application may be active, such as clicking on a button to send a command to the target application, and/or passive, such as looking or gesturing at the target application. In particular embodiments, the interaction with the application of the panel 306 may only authorize the application of panel 306 to receive data while maintaining the authorization of the application of panel 304 to receive sensor data 302. In particular embodiments, the client system 130 may identify the purpose of the user interface element 318 and may revoke access to sensor data 302 for applications that did not request the user interface element 318. As an example and not by way of limitation, if the user interface element 318 (e.g., keyboard) is for inputting a search query then other applications may retain their authorization to access sensor data 302, but if it is for inputting the user's 101 credentials then other applications may have their authorization to access sensor data 302 revoked. In particular embodiments, the client system 130 may bind the sensor data 302 to a presently active application, which may be defined as the application a user 101 is currently interfacing. In particular embodiments, the client system 130 may determine a user interface element 318 has been generated and allow sensor data 302 to be sent to the application associated with the user interface element 318. By discontinuing the sending of sensor data 302 to the application of the panel 304, the client system 130 may improve the security of the user 101 by unnecessarily sending sensor data 302 to applications that the user 101 is not currently interfacing. For example, if sensor data 302 were to continue to be sent to any opened application, an application with malicious intent may determine the client system 130 has activated a user interface element 318 that requires confidential information from the user 101 and monitor the sensor data 302 and fairly accurately deduce the input of the user 101 from the sensor data 302. Continuing the example, the malicious application may access eye tracking data and motion data (e.g., from the controller and headset) to narrow the possibility of what the user could be inputting into the user interface element 318 and easily guess the confidential information (e.g., usernames, passwords, birthdates, social security numbers, etc.) inputted into the user interface element 318. In particular embodiments, the client system 130 may stop sending only a subset of sensor data 302 to any opened application. As an example and not by way of limitation, the client system 130 may keep sending location data and revoke authorization of an application to receive eye tracking/headgear orientation/hand movement data, which may be used to potentially compromise the security of the user 101. In particular embodiments, the user 101 may expressly grant permission for an application to continue to receive sensor data 302 from the client system 130, even when the user is interacting with another application or another application has become the active application. A list of authorized applications to receive sensor data 302 may be generated for the user 101 to maintain an inventory of which applications are granted permission. In particular embodiments, a list of applications may be added to a whitelist or a blacklist to automatically determine whether a particular application is authorized to receive sensor data 302.

Figure 4:
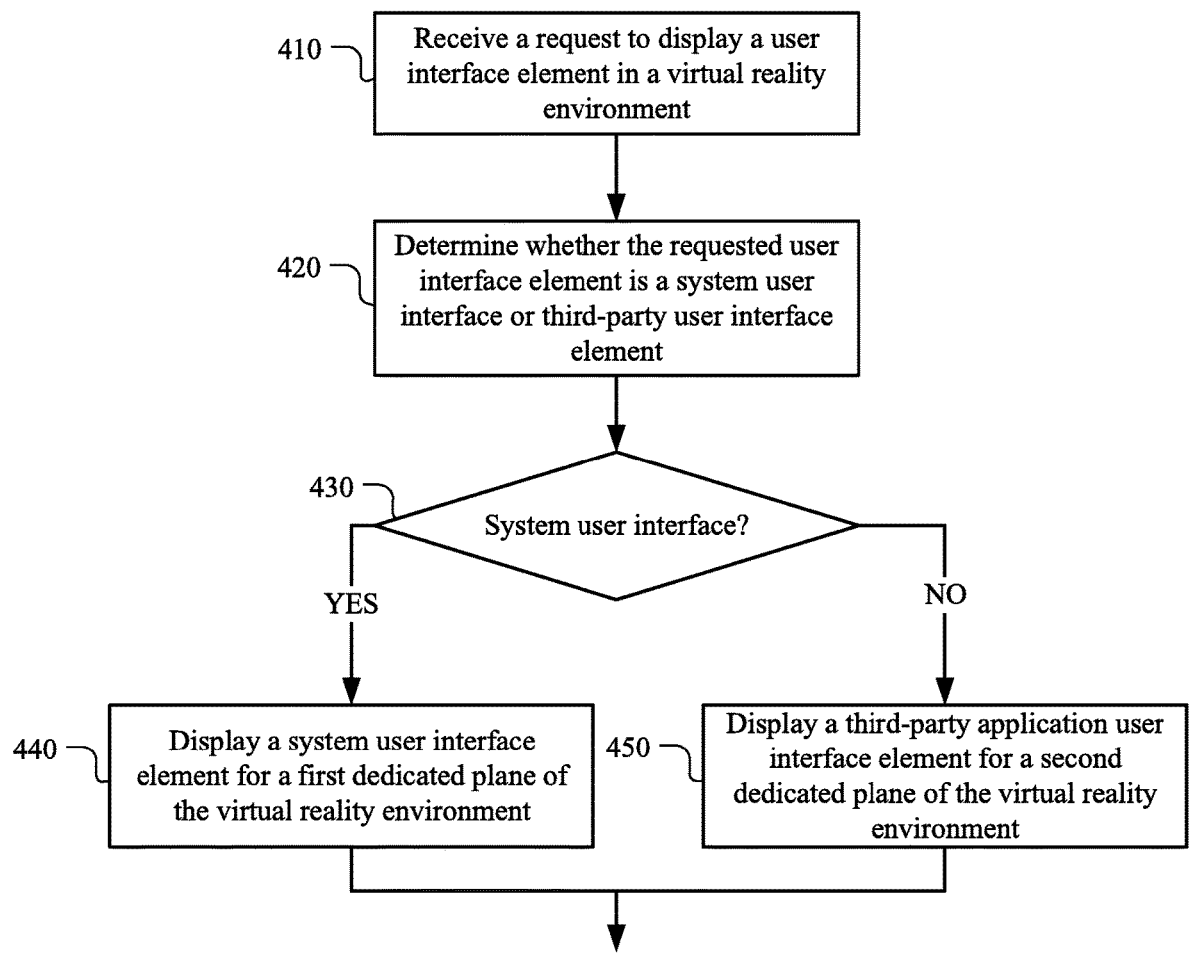
FIG. 4 illustrates an example method for differentiating generated OS content from generated third-party content.

FIG. 4 illustrates an example method 400 for differentiating generated OS content from generated third-party content and selectively displaying the content in different display planes accordingly. The method may begin at step 410, where a client system (e.g., a virtual reality system) may receive a request to display a user interface element in a virtual reality environment. For example, the request may be from an application (e.g., including web pages being interpreted by an application, such as a web browser). At step 420, the client system may determine whether the requested user interface element is a system user interface (e.g., a keyboard generated by the OS) or a third-party user interface (e.g., a keyboard generated by a third-party application, rather than a keyboard generated by the OS in response to a request/invocation by the third-party application). In particular embodiments, the OS may typically generate a user interface element for use by third-party application and only certain situations (e.g., a third-party application with malicious intent) would there be a third-party user interface element generated to receive a user's input. At step 430, the client system may perform the determination. If the client system determines the requested user interface is a system user interface, the method may proceed to step 440, where the client system may generate a system OS user interface element for a first dedicated plane of the virtual reality environment. If the client system determines the requested user interface element is not a system user interface element, the method may proceed to step 450, where the client system may generate a third-party application user interface element for a second dedicated plane of the virtual reality environment. In particular embodiments, the first dedicated plane may be distinct from the second dedicated plane. Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for differentiating generated OS content from generated third-party content, including the particular steps of the method of FIG. 4, this disclosure contemplates any suitable method of differentiating generated OS content from generated third-party content, including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
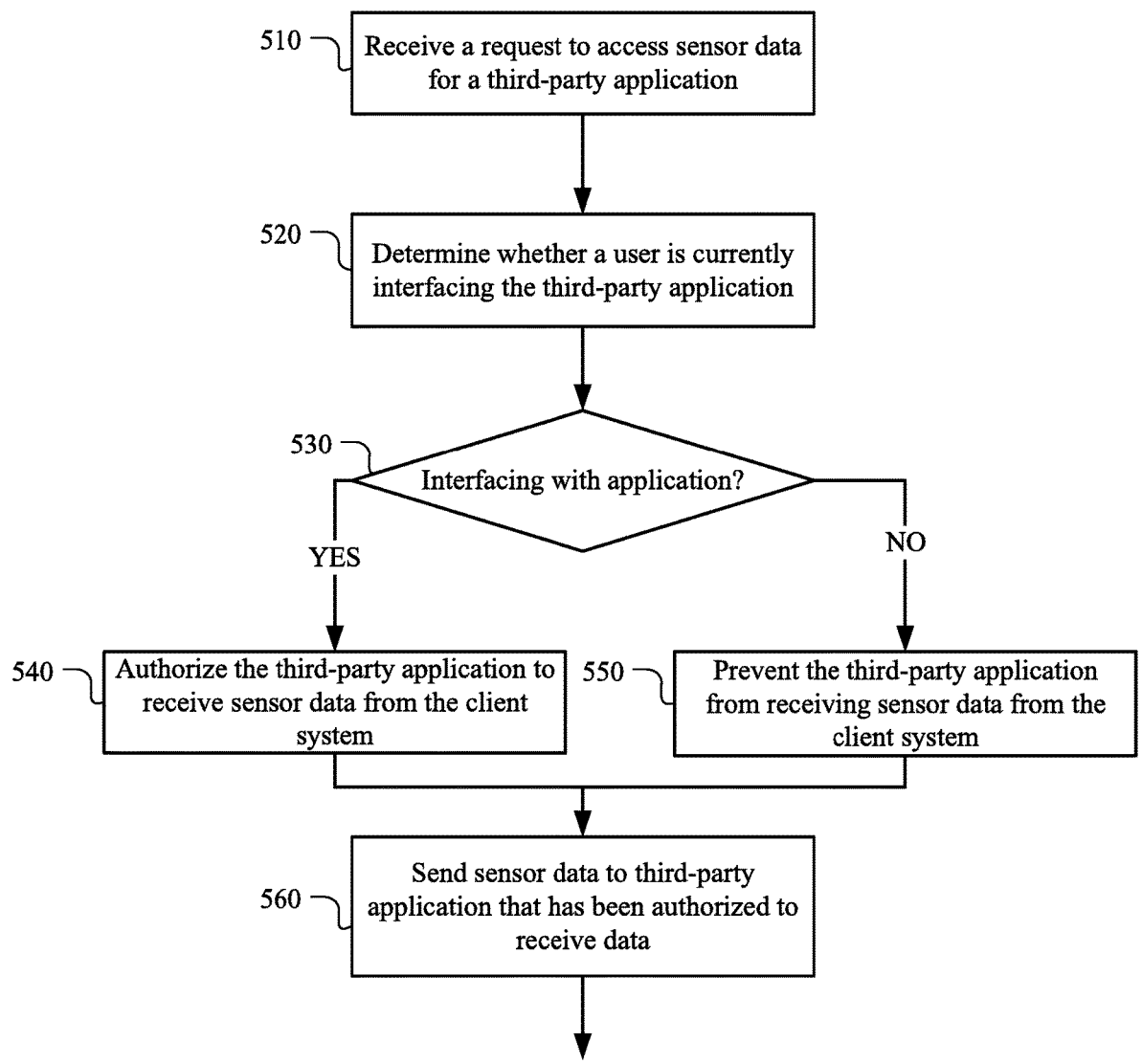
FIG. 5 illustrates an example method for sending sensor data to an authorized application.

FIG. 5 illustrates an example method 500 for sending sensor data to an authorized application. The method may begin at step 510, where a client system (e.g., virtual reality system) may receive a request to access sensor data from a third-party application. For example, a VR game may request to access sensor data from the client system in order for the user to maneuver within a generated virtual reality environment of the VR game. At step 520, the client system may determine whether the third-party application is a presently active application. In particular embodiments, a presently active application may be an application with which a user associated with the client system is currently interfacing. As an example and not by way of limitation, the client system may identify an application that the user last interacted with, such as selecting the application, hovering a pointer over the application, or the like. At step 530, the client system may determine whether the user is currently interacting with the third-party application. If it is determined that the user is currently interfacing with the application that requested the sensor data, then at step 540, the client system may authorize the third-party application to receive sensor data from the client system. If it is determined that the user is not interfacing the application that requested the sensor data, then at step 550, the client system may prevent the third-party application from receiving sensor data from the client system. At step 560, the client system may send sensor data to third-party applications that have been authorized to receive data. Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for sending sensor data to an authorized application, including the particular steps of the method of FIG. 5, this disclosure contemplates any suitable method of sending sensor data to an authorized application, including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6A:
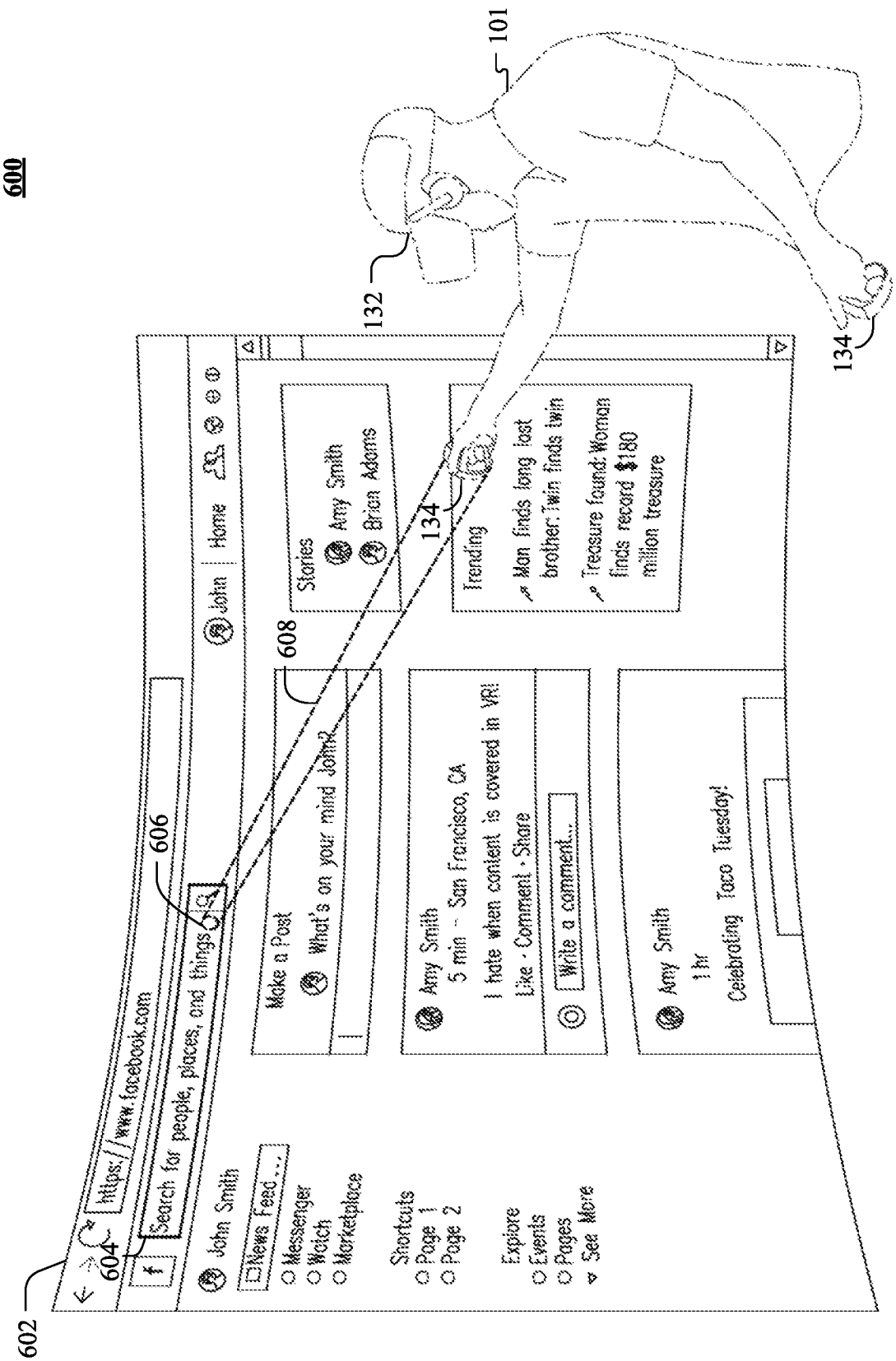
FIGS. 6A-6C illustrate an example of a user interacting with a user interface element of an application in a virtual reality environment.
Figure 6B:
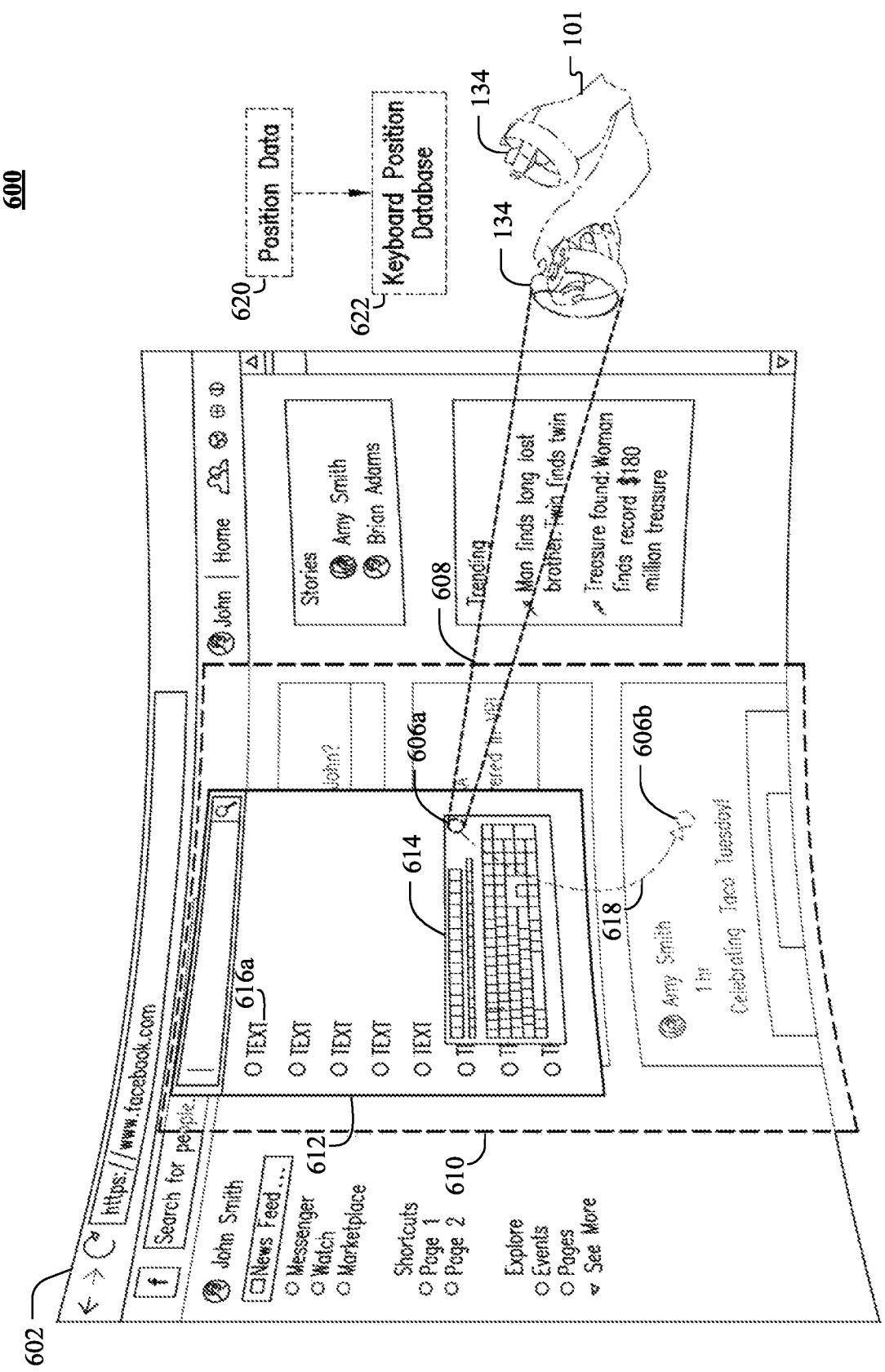
Figure 6C:
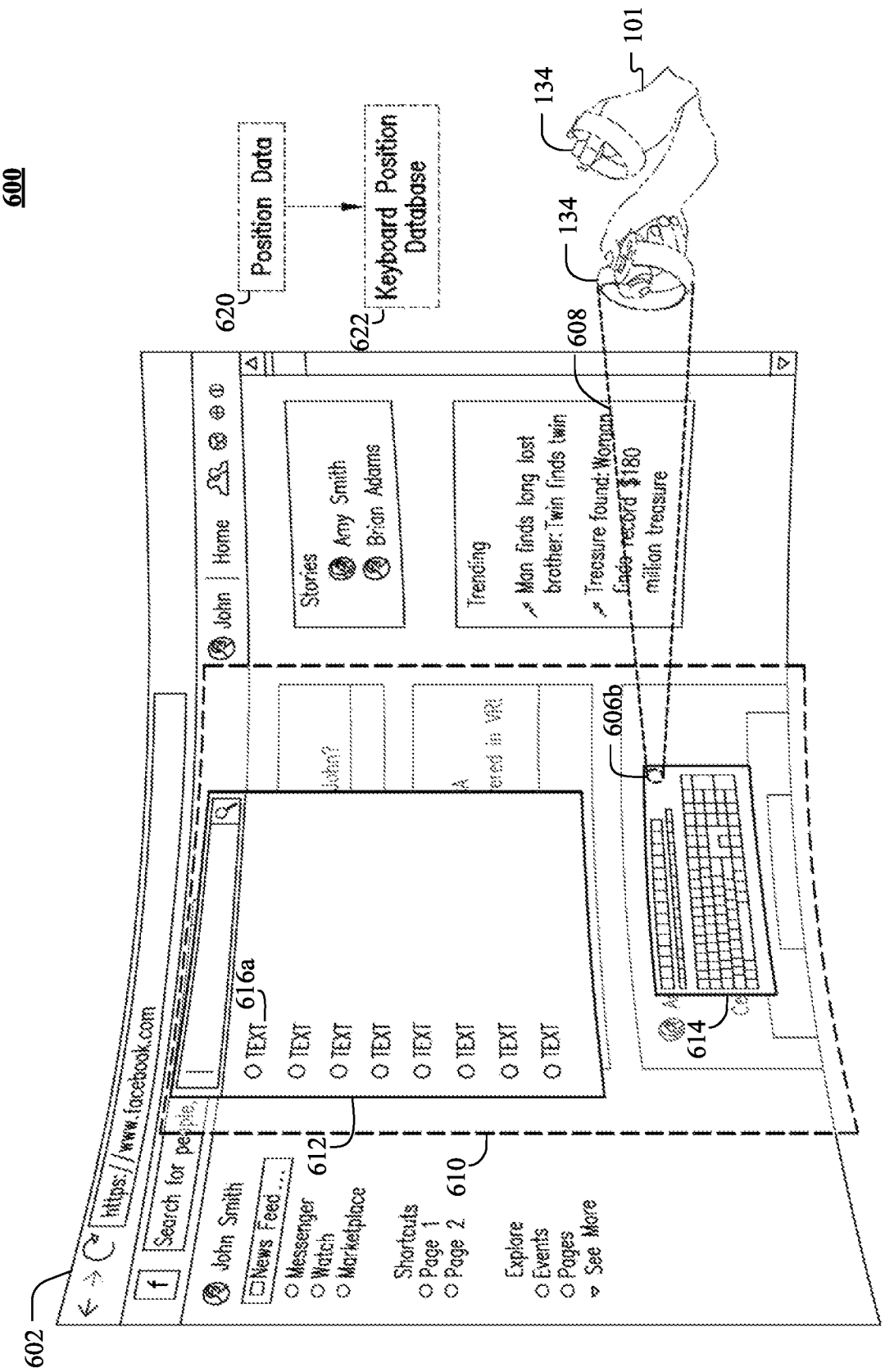

FIGS. 6A-6C illustrate an example process of maintaining a user interface position database while a user 101 engages a virtual reality environment 600. FIG. 6A illustrates a user 101 wearing a virtual reality headset 132 and using virtual reality input devices 134 to interact with a virtual reality environment 600. Similarly as in FIGS. 2A-2G, the client system 130 may use the virtual reality headset 132 to render the virtual reality environment including the virtual reality elements discussed above. Since current implementation of a user interface element (e.g., a keyboard) can occlude content when receiving input from the user, the user interface element's position needs to be positioned better to avoid occlusion of content and/or a portion of the display. This is because the content may be related or of interest to the user's input, such as the question that a user is answering on a form. Furthermore, many applications may provide functionality as the user is providing inputs on a user interface element. This functionality may be a predicted input, such as an autocomplete functionality of some kind. However, in current implementations of this function, the predicted inputs may be typically located under the input box. Generally, the user interface element may be located under the input box as well and would therefore occlude the predicted inputs. As such, the user interface element needs to be positioned better to allow the user to be able to see the content of the page and/or other content that may be displayed to the user.

In particular embodiments, the virtual reality environment 600 may include a panel 602 displaying an application that has been selected by the user 101. FIG. 6A illustrates the user 101 directing the virtual reality input device 134 towards an interactive field 604 (e.g., search box) of the application (e.g., Facebook) with a pointer 606 and pointer path 608. In particular embodiments, panel 602 may display any kind of application as described above. As illustrated in FIG. 6A, the user 101 may be able to "click" on the interactive field 604 of the application by pointing the pointer 606 at a desired location and inputting an input into the virtual reality input device 134 (e.g., clicking a button). This may be interpreted as a request to access a user interface element associated with the interactive field box 604.

FIG. 6B illustrates the result of selecting the interactive field 604, which may cause the generation of a dedicated plane 610 and display of a search field box 612 with a user interface element 614 (e.g., keyboard). In particular embodiments, the search field box 612 may include a plurality of predicted inputs 616. The predicted inputs 616 may be inputs to complete the search field box 612 that may be selected by the user 101. As an example and not by way of limitation, the predicted inputs 616 may be recent searches conducted in the search field box 612. In particular embodiments the predicted inputs 616 may be selected to perform a query. Although the dedicated plane 610 is portrayed to be separate from the panel 602, in particular embodiments, the dedicated plane 610 with its generated content (e.g., search field box 612 and user interface element 614) may be embedded into the panel 602 as content of the application of the panel 602. Upon generation and display of the user interface element 614, the user interface element may occlude a portion of the application displayed in panel 602. As an example and not by way of limitation, the user interface element 614 may occlude the predicted inputs 616. As illustrated in FIG. 6B, the user 101 may select the user interface element 614 at a pointer location 606a and move the user interface element 614 to a pointer location 606b along path 618. The virtual reality environment 600 may include position data 620 associated with the user interface element 614 and store the position data 620 in a keyboard position database 622. In particular embodiments, the position data 620 may be associated with other elements of the application of panel 602 (e.g., search field box 612) and the keyboard position database 622 may be a general database to store position data 620 associated with the other elements.

FIG. 6C illustrates the result of moving the user interface element 614 to the pointer location 606b. In particular embodiments, the client system 130 may store position data 620 associated with the position of the user interface element 614. The position data 620 may be associated with a particular application. As an example and not by way of limitation, an application (e.g., Facebook) may store position data 620 of any user interface elements 614 generated in the keyboard position database. The keyboard position database 622 may store position data 620 for any application. The database 622 may also associate the position data 620 with metadata, such as a user identifier that identifies the user whose action generated the position data 620, characteristics of the user (e.g., age, gender, height, etc.), the application's identifier or type (e.g., web browser), the context in which the application was being used (e.g., when predicted inputs 616 are being shown), the display size, position, and/or orientation of the application when the position data 620 was generated, etc. In particular embodiments, future requests to access the user interface element 614 for the particular application may query (e.g., based on information associated with the aforementioned metadata) the keyboard position database 622 to generate the user interface element in a position based on the position data 620 stored in the keyboard position database 622. For example, if a particular user 101 is interacting with a particular application in a particular context (e.g., when the application's panel size is reduced and positioned towards the bottom of the user's 101 field of view), such information may be used to query the database 622 to find relevant position data 620 that may be used to automatically position a virtual keyboard, for example, to minimize the likelihood of it occluding any content of interest.

The position data 620 may be indicative of a position that the user interface element 614 does not occlude any content of the application of panel 602. Since content of the application may be helpful or crucial in determining an input into the user interface element 614, the client system 130 may identify ways to prevent occlusion of content of the application. As an example and not by way of limitation, reasons why occlusion of content may impede user 101 from interfacing the application of panel 602 may include the content provides information to complete a field box (e.g., question to be answered by the field box), content may provide a predicted input 616, and other reasons. The generation of the user interface element 614 at a particular position may prevent occlusion of the content of the application. The position data 620 may indicate areas that user 101 favors to move the user interface element 614 to interact with the application. In particular embodiments, the position data 620 may include the position data associated with the other elements as described above and be used to generate the other elements in a position that would not occlude content with the user interface element 614. As an example and not by way of limitation, the position data 620 of a search field box 612 may be stored and used to determine a position to generate the search field box 612 to prevent occlusion of content, such as the predicted inputs 616 by a user interface element 614. In particular embodiments, the position data 620 of the other elements may be used to generate and display the user interface element 614 at a position that avoids occlusion of content of the application. In particular embodiments, position data 620 may be compiled for multiple users 101 (e.g., a community of users of a virtual reality or social networking platform) for a particular application to compile the position data 620 of the keyboard position database 622. The compilation of the position data 620 may indicate trends of where users 101 would most rather have the user interface element 614 to be displayed. Areas avoided by the user interface element 614 as provided by the position data 620 may indicate areas containing content and areas to be avoided. Although the disclosure discusses moving a user interface element 614 generally within a plane parallel to the panel 602, the user 101 may move the user interface element 614 anywhere within the virtual reality environment 600. As an example and not by way of limitation, the user 101 may move the user interface element with three degrees of freedom within the virtual reality environment 600.

Figure 7A:
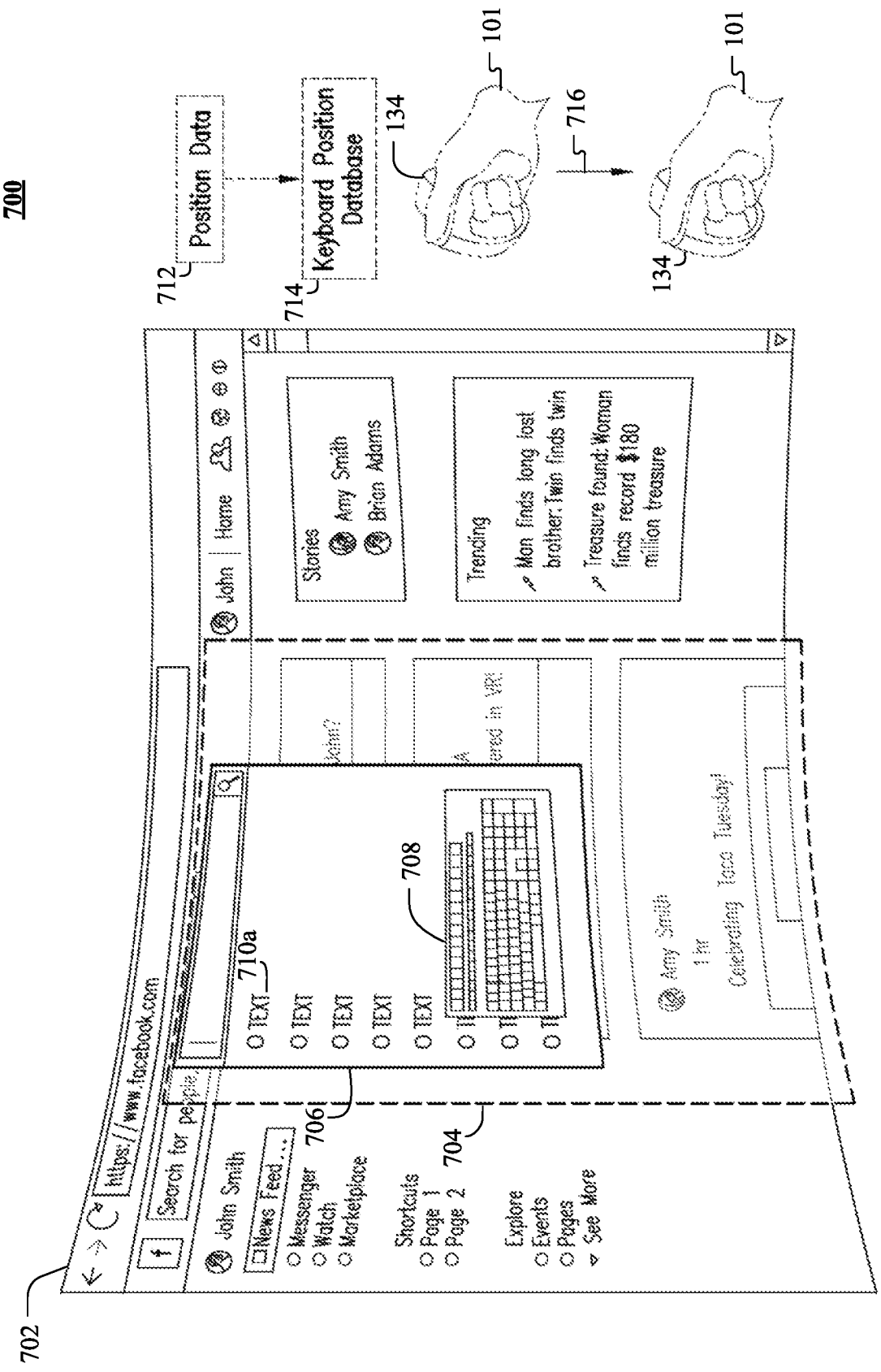
FIGS. 7A-7B illustrate another example of a user interacting with a user interface element of an application in a virtual reality environment.
Figure 7B:
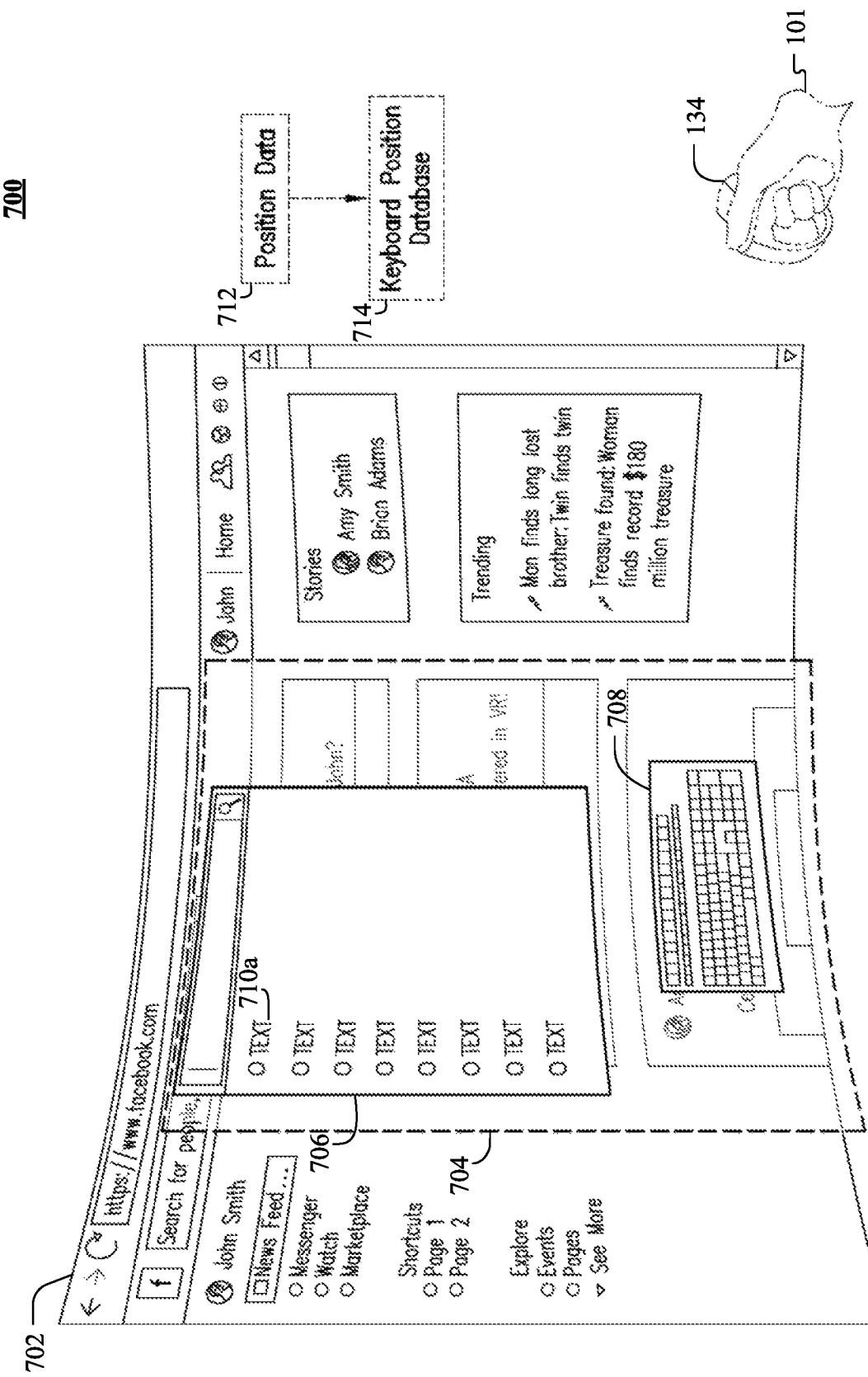

FIGS. 7A-7B illustrate another example process of maintaining a user interface position database while a user 101 engages a virtual reality environment 700. FIG. 7A illustrates a user 101 interfacing an application of a panel 702. Similarly to FIG. 6B, the user 101 may have selected to interact with an interactive field and a dedicated plane 704 may be generated including a search field box 706 and a user interface element 708. The search field box 706 may include a plurality of predicted inputs 710. The client system 130 may also store position data 712 in a keyboard position database 714. As illustrated in FIG. 7A, the user 101 may perform a gesture 716 with virtual reality input device 134 indicative of a direction to move the user interface element 708. In particular embodiments, the user 101 may need to input an input into the virtual reality input device 134 (e.g., clicking a button) to initiate the process of performing a gesture. In particular embodiments, the user 101 may need to hover a pointer (not shown) over the user interface element 708 and perform the gesture 716.

FIG. 7B illustrates the result of performing a gesture 716, which may cause the user interface element 708 to be moved by a predetermined amount in a direction specified by the gesture 716. Similarly to FIG. 6 as described above, the client system 130 may store the position data 712 in the keyboard position database related to the user interface element 708 and use the position data 712 in a similar manner. In particular embodiments, the client system 130 may store the position data 712 of other elements of the application. The position data 712 may be used to determine a position of the user interface element 708 that does not occlude content of the application of 702. In particular embodiments, the user 101 may "push" the user interface element 708 (e.g., into the screen) using a gesture with the virtual reality input device(s) 134. In particular embodiments, the user interface element 708 may be attached to one virtual reality input device 134 in the virtual reality environment 700 and the other virtual reality input device 134 may be used to interact with the user interface element 708. In particular embodiments, the virtual reality input device(s) 134 may include a touchpad that may activate a radial menu for one or more quick options. The touchpad may be a virtual touchpad to be selected within the virtual reality environment 700. Alternatively, the touchpad may be a physical component of the virtual reality input device(s) 134. The one or more quick options may include a plurality of options to be activated to perform various functions, such as returning to a home virtual reality environment, powering off the virtual reality environment, etc.

Figure 8:
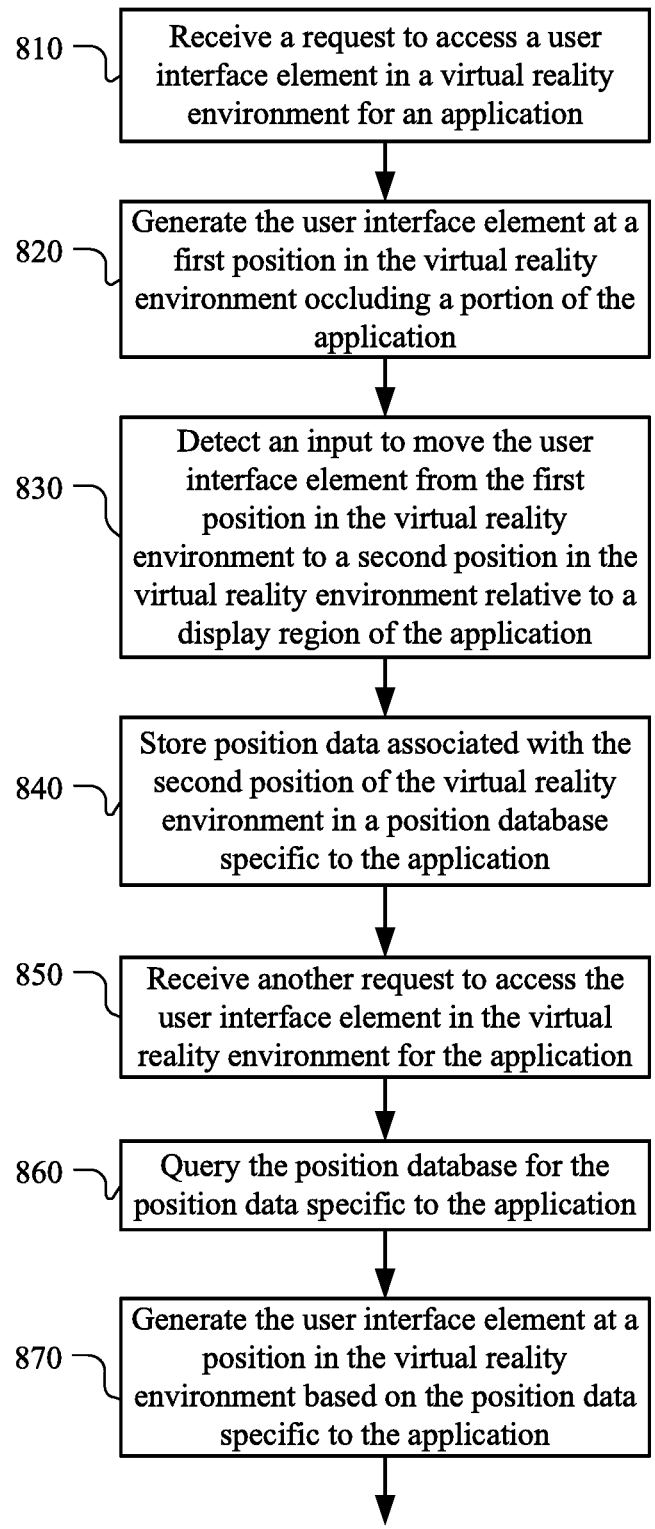
FIG. 8 illustrates an example method for generating a user interface element that avoids occluding a portion of an application in a virtual reality environment.

FIG. 8 illustrates an example method 800 for generating a user interface element within a virtual reality environment. The method may begin at step 810, where a client system (e.g., virtual reality system) may receive a request to access a user interface element (e.g., a keyboard generated by an application) in a virtual reality environment for an application. At step 820, the client system may generate the user interface element at a first position in the virtual reality environment occluding a portion of the application. For example, a keyboard may be generated for the user to interface, which may be covering content of the application (e.g., text related to a question the user is answering with the keyboard). At step 830, the client system may detect an input to move the user interface element from the first position in the virtual reality environment to a second position in the virtual reality environment relative to a display region of the application. For example, the user may perform a click and hold on a keyboard to drag the keyboard to another position in the virtual reality environment. In another example, the user may perform a swipe gesture that moves the keyboard from one position to another position. At step 840, the client system may store the position data associated with the second position of the virtual reality environment in a position database specific to the application. For example, a client system may store the position data of a keyboard for a particular application, such as Facebook. At step 850, the client system may receive another request to access the user interface element in the virtual reality environment for the application. At step 860, the client system may query the position database for the position data specific to the application. At step 870, the client system may generate the user interface element at a position in the virtual reality environment based on the position data specific to the application.

For example, the client system may determine a position that does not occlude content of the application in the virtual reality environment and display the user interface element at that position. Particular embodiments may repeat one or more steps of the method of FIG. 8, where appropriate. Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates an example method for generating a user interface element within a virtual reality environment, including the particular steps of the method of FIG. 8, this disclosure contemplates any suitable method of generating a user interface element within a virtual reality environment, including any suitable steps, which may include all, some, or none of the steps of the method of FIG. 8, where appropriate. Furthermore, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

Figure 9A:
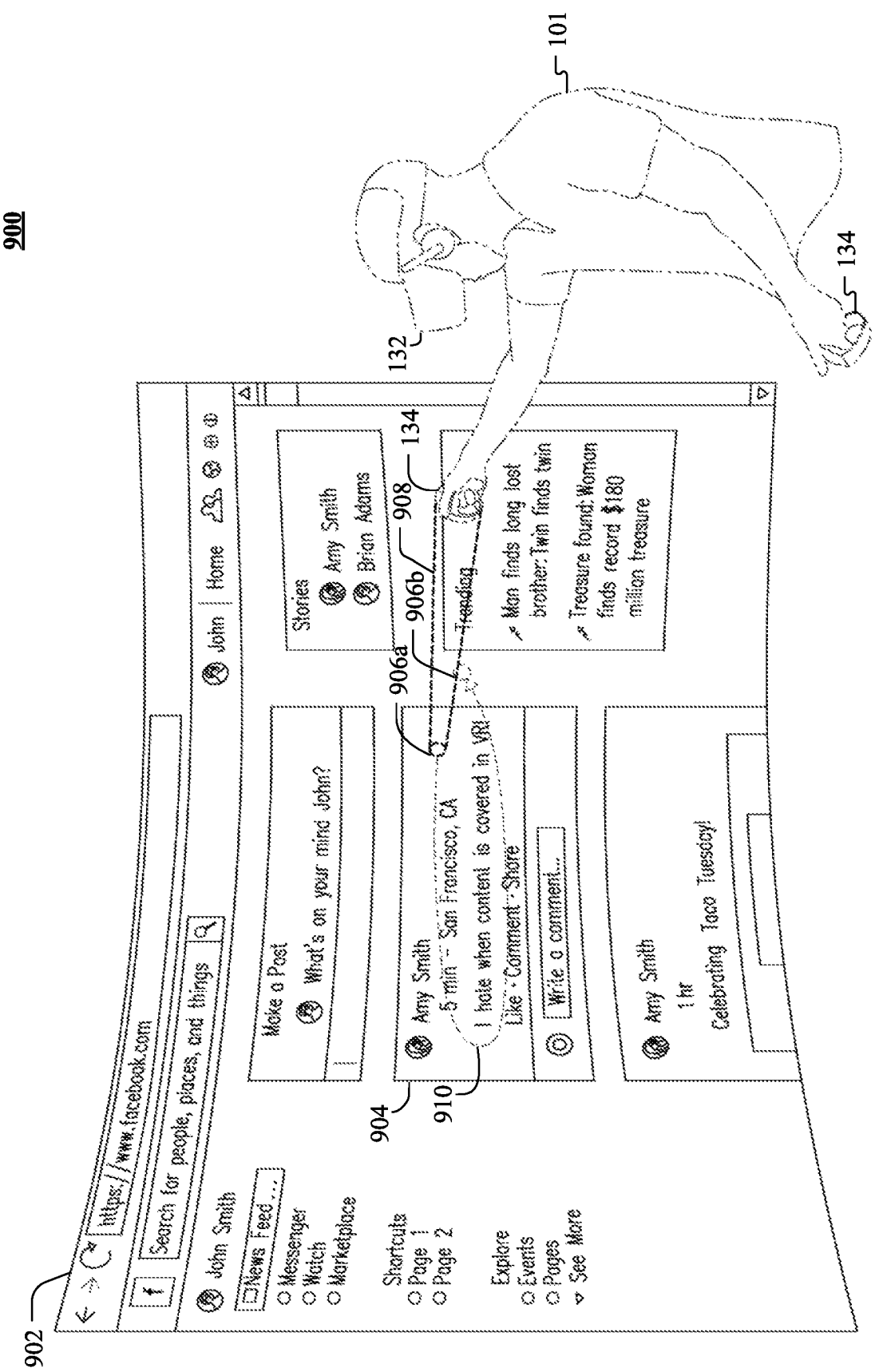
FIGS. 9A-9H illustrate an example of a user copying and pasting content within a virtual reality environment.

FIGS. 9A-9H illustrate an example process of copying and pasting content within a virtual reality environment 900. FIG. 9A illustrates a user 101 wearing a virtual reality headset 132 and using virtual reality input device(s) 134 to interact with a virtual reality environment 600. Similarly as in FIGS. 2A-2G, the client system 130 may use the virtual reality headset 132 to render the virtual reality environment including the virtual reality elements discussed above. In particular embodiments, the virtual reality environment 900 may include a panel 902 displaying an application that has been selected by the user 101. The application (e.g., Facebook) displayed in the panel 902 may include a plurality of posts 904. The posts 904 may contain text, images, links to websites, and other content typically found on posts of online social networks. FIG. 9A illustrates the user 101 may direct the virtual reality input device 134 towards the post 904 of the application with a pointer 906 and pointer path 908. As illustrated in FIG. 9A, the user 101 may follow path 910 from a first pointer position 906a to a second pointer position 906b to enclose content of the post 904. In particular embodiments, the client system 130 may continuously store the positional data of the virtual reality input device(s) 134 and determine when a gesture is made within a predetermined amount of time. As an example and not by way of limitation, the client system 130 may monitor the position of the pointer 906 on the panel 902 and determine when a gesture is made that encloses content (e.g., a loop, a circle, etc.) within a short time frame (e.g., 3 seconds). In particular embodiments, the user 101 may need to input an input into the virtual reality input device(s) 134 (e.g., click a button) to initiate the gesture.

Figure 9B:
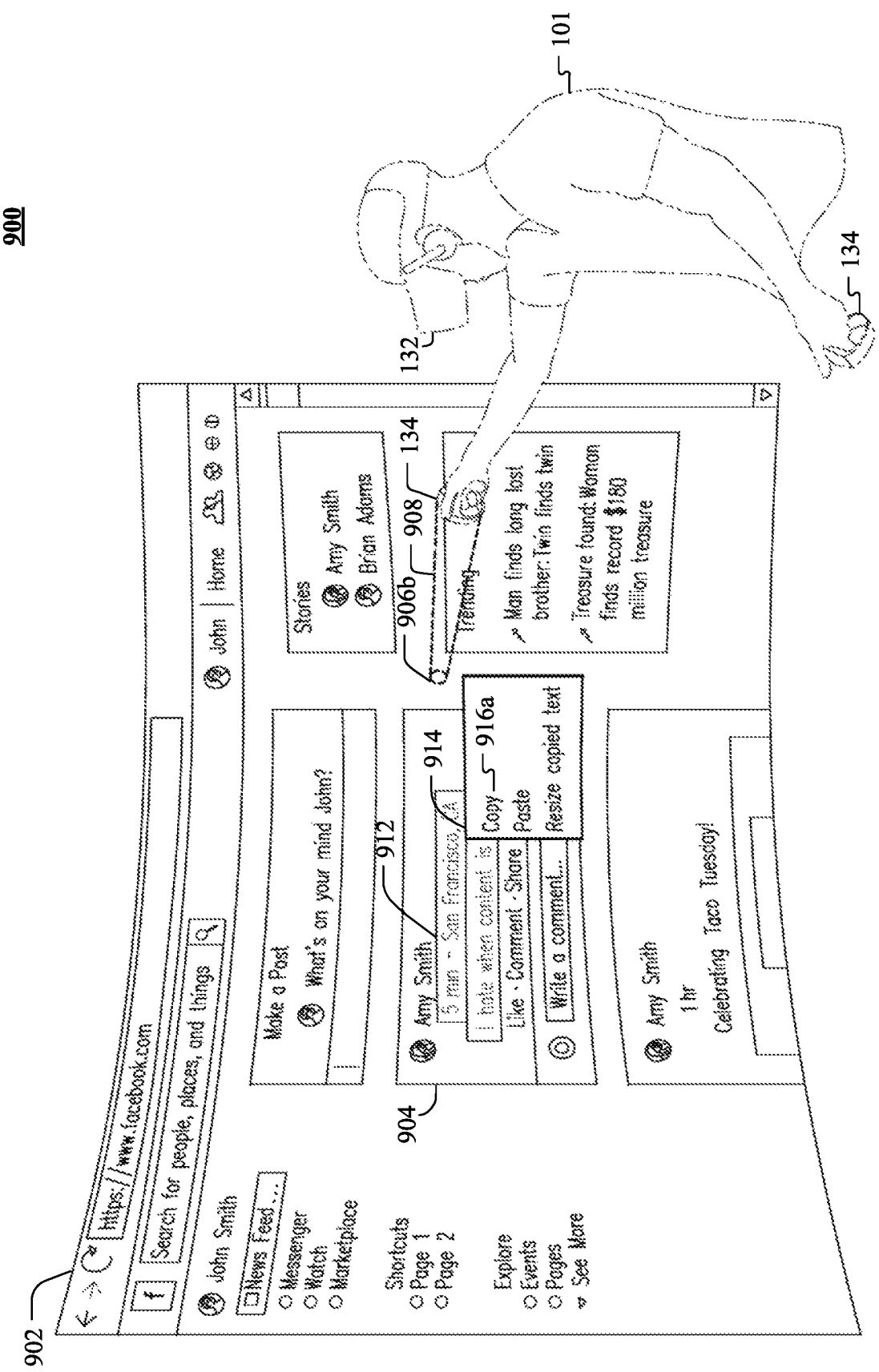

FIG. 9B illustrates the result of performing the gesture and following the path 910, which may cause content of the post 904 enclosed by the path 910 to be highlighted in a text box 912 and an option box 914 appear. The option box 914 may include a plurality of options 916, such as "copy" 916a, "paste" 916b, and "resize copied text" 916c. In particular embodiments, the option box 914 may include other options 916 and remove some options 916. Alternatively, in particular embodiments, a radial menu may be generated containing the options 916 located on the virtual reality input device(s) 314 within the virtual reality environment 900. The content shown that may include in the text box 912 the text enclosed by the path 910. Heuristics may be used to determine what content is enclosed by a gesture. In particular embodiments, if a word is partially enclosed, the word may be included in the text box 912. While the disclosure describes content as text, the disclosure contemplates pictures and other content of an application. As an example and not by way of limitation, the path 910 may enclose at least partially an image and the image may be selected to be copied to a temporary storage of content.

Figure 9C:
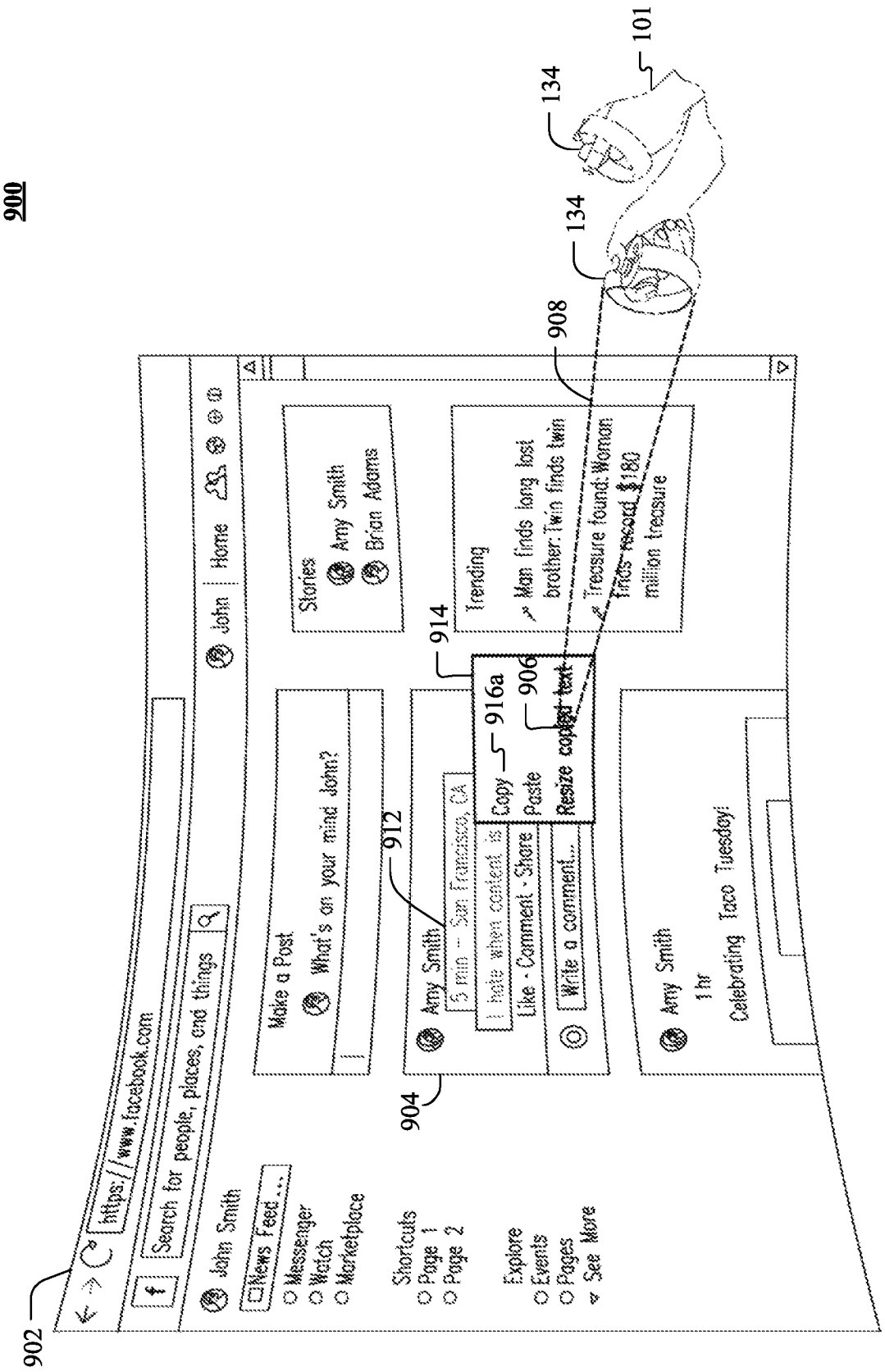
Figure 9D:
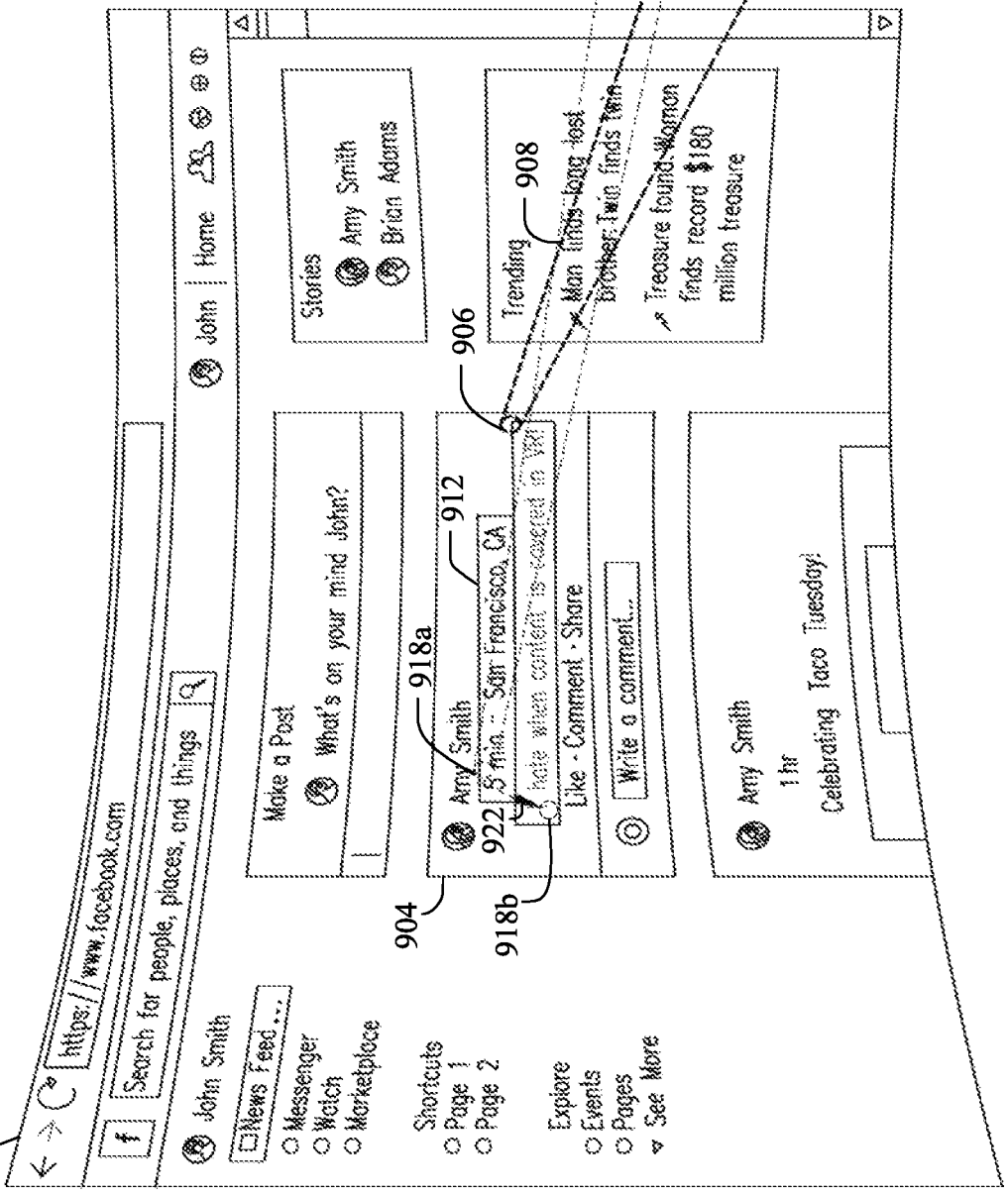
Figure 9E:
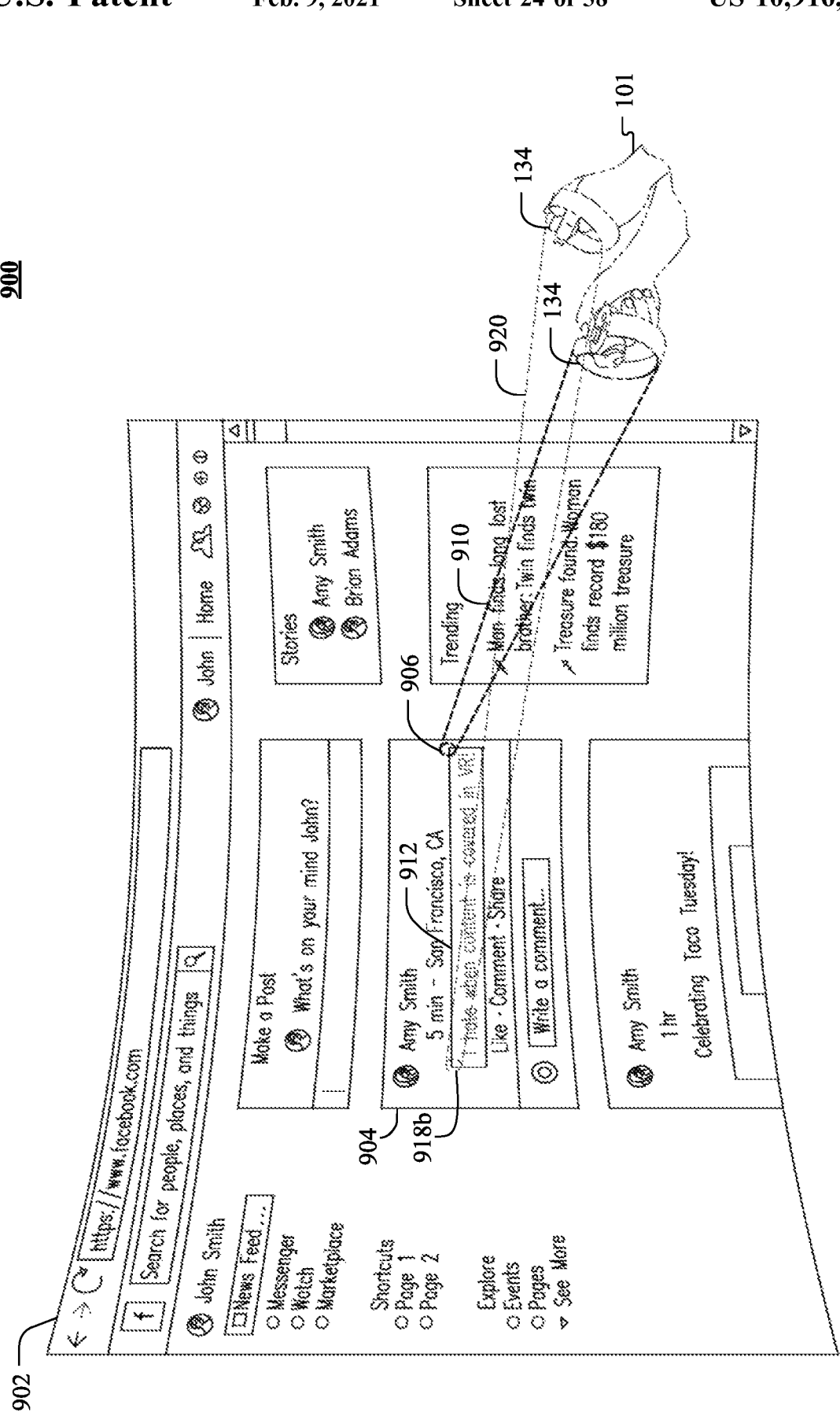

FIG. 9C illustrates the user 101 may be able to select a "resize copied text" option 916c by pointing the pointer 906 at a desired location and inputting an input into the virtual reality input device 134 (e.g., clicking a button). In particular embodiments, the selection of the "resize copied text" option 916c may execute instructions to initiate a resizing process for the text box 912. FIG. 9D illustrates the result of selecting the option 916c, which may allow the user 101 to input one or more inputs to determine the left side and the right side of the text box 912. As illustrated in FIG. 9D, the user 101 may select the corner of the text box 912 with a pointer 918 with a pointer path 920 at a pointer position 918a and move the pointer 918 to a second pointer position 918b by following the path 922. Although FIG. 9D illustrates a particular method of resizing the text box 912, in particular embodiments, the user 101 may simply select the location for both sides of the text box 912. In particular embodiments, the user 101 may be required to maintain an input into the virtual reality input device(s) 134 (e.g., holding a button) while resizing the text box 912. FIG. 9E illustrates the result of moving the pointer 918 from the pointer position 918a to pointer position 918b, which may resize the text box 912. In particular embodiments, the virtual reality input device(s) 134 may be set to a resizing mode and movement of an analog stick or input in a directional pad may cause the resizing of the text box 912 one character at a time. The longer the user 101 holds on either the analog stick or a specific direction of a directional pad may increase the speed of the resizing of the text box 912 (e.g., 2 characters at a time for each second).

Figure 9F:
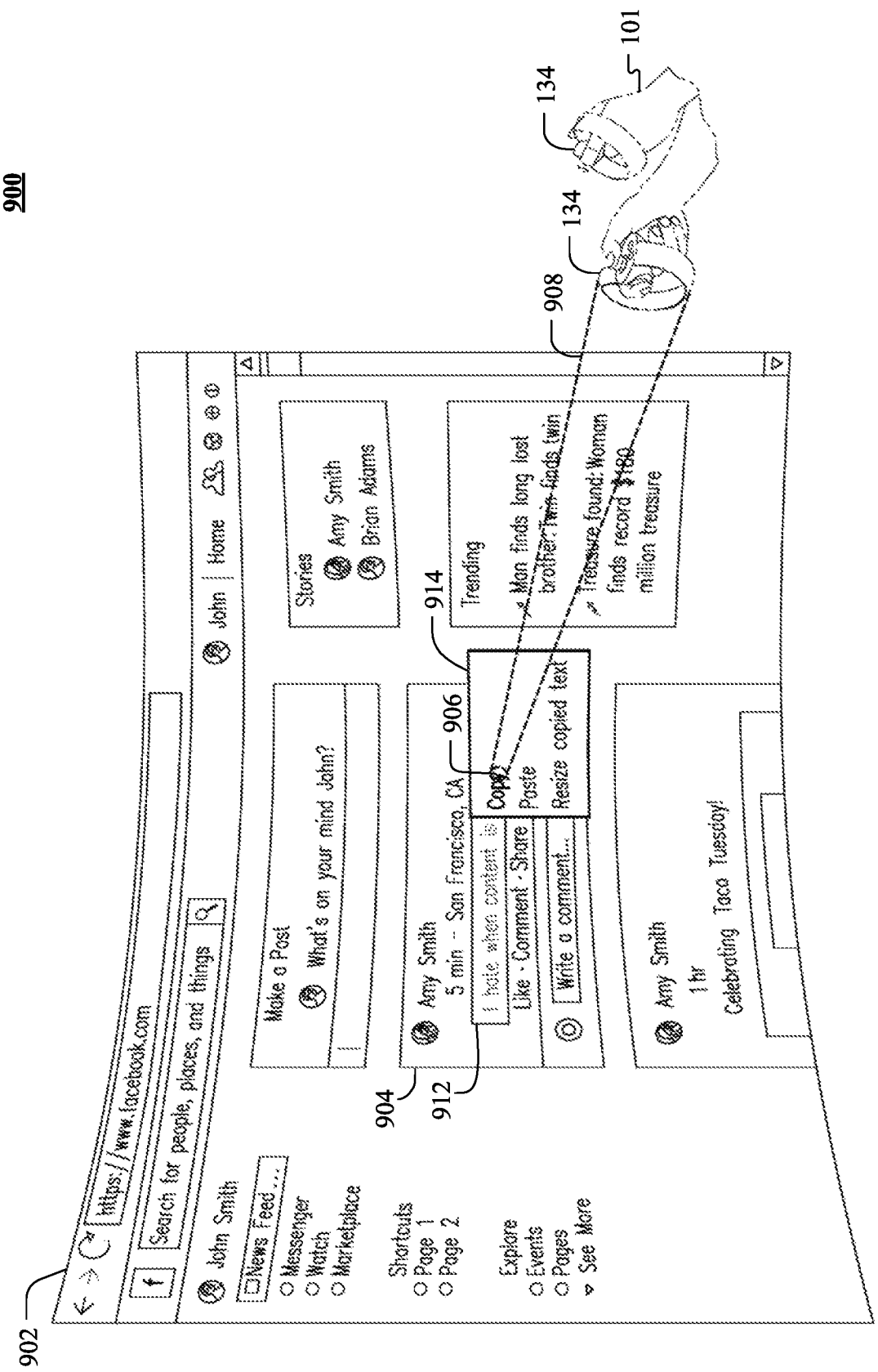

FIG. 9F illustrates the result of resizing the text box 912, which may redisplay the option box 914. In particular embodiments, the end of the resizing process may occur when the user 101 releases an input on the virtual reality input device(s) 134 (e.g., releasing a button). In particular embodiments, the end of the resizing process may occur when the user 101 inputs an input into the virtual reality input device(s) 134 (e.g., clicking a button) to end the resizing process. As illustrated in FIG. 9F, the user 101 may select option 916a to perform a copy instruction. The copy instruction may store the contents of the text box 912 in a temporary storage. In particular embodiments, the copy instruction may be performed on an image as well.

Figure 9G:
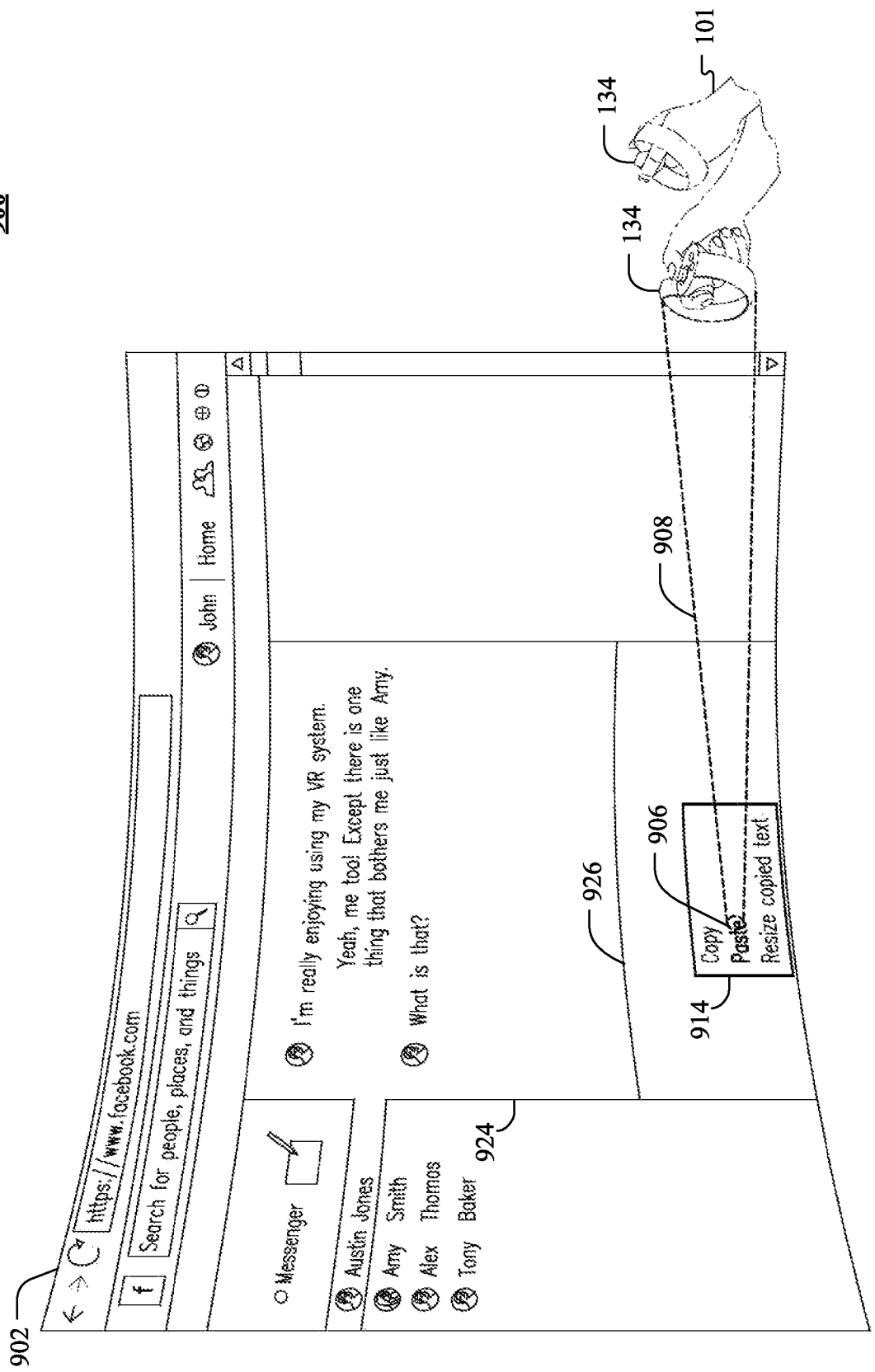
Figure 9H:
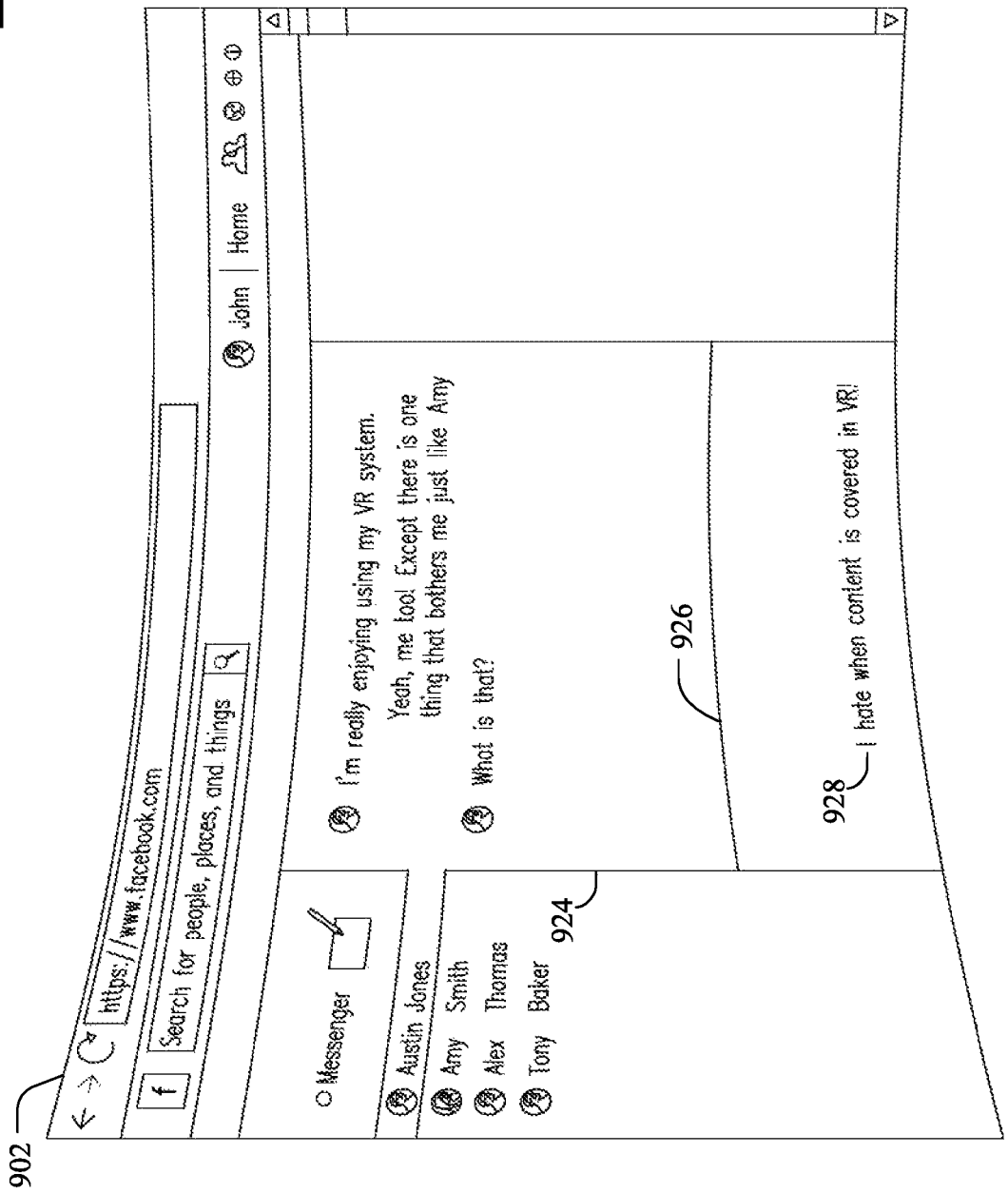

FIG. 9G illustrates a user 101 interfacing a message thread 924 within the application of the panel 902. The message thread 924 may include content of a previous conversation between the user 101 and another user 101 of an online social network. The message thread 924 may include a response box 926 for the user 101 to input text to be entered into the message thread 924. As illustrated in FIG. 9G an option box 914 is displayed with options 916. The option box 914 may be displayed in response to receiving an input from the virtual reality input device(s) 134 to display the option box 914. As illustrated in FIG. 9G, the user 101 may select a "paste" option 916b, which would execute a paste instruction, by pointing the pointer 906 at a desired location and inputting an input into the virtual reality input device 134 (e.g., clicking a button). FIG. 9H illustrates the result of selecting the option 916b, which performs the paste function and inputs the copied contents 926 of the text box 912 that is retrieved from the temporary storage.

Figure 10:
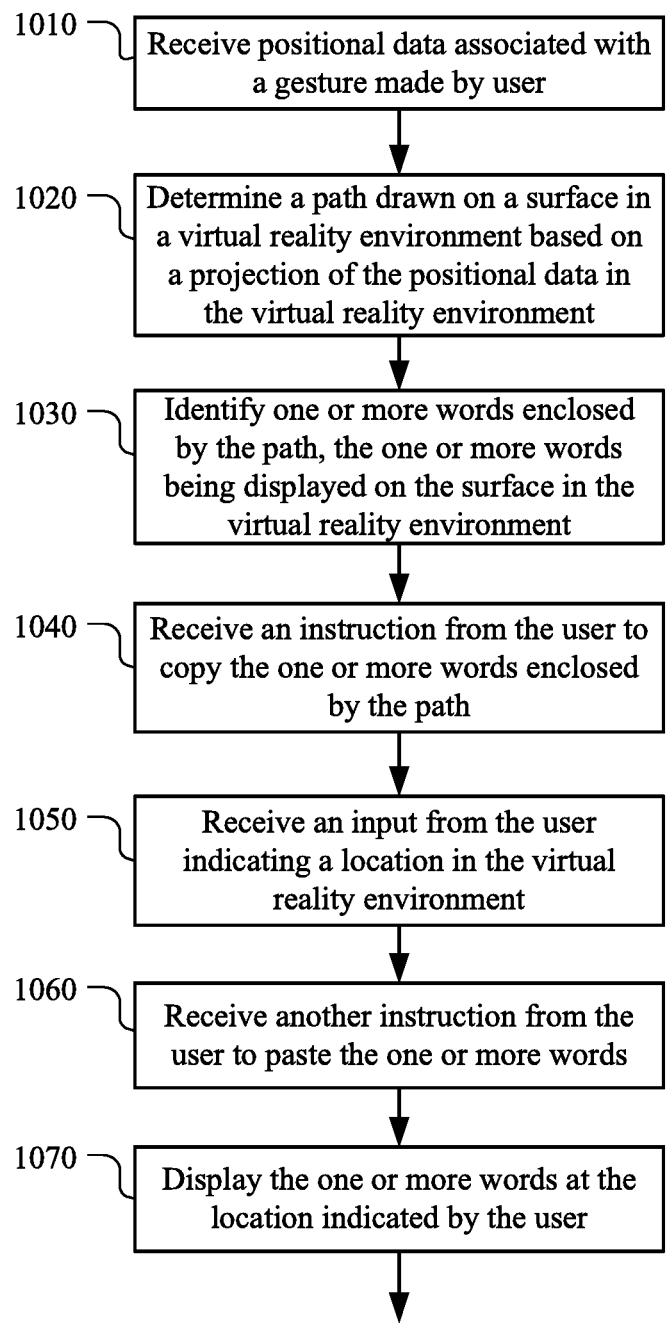
FIG. 10 illustrates an example method for copying and pasting content within a virtual reality environment.

FIG. 10 illustrates an example method 1000 for copying and pasting content within a virtual reality environment. The method may begin at step 1010, where a client system (e.g., virtual reality system) may receive positional data associated with a gesture made by a user. As an example and not by way of limitation, the positional data may be associated with the position of a pointer of a virtual reality input device that is projected onto a surface in the virtual reality environment. At step 1020, the client system may determine a path drawn on a surface in the virtual reality environment based on a projection of the positional data in the virtual reality environment. For example, the client system may determine the position of the pointer of the virtual reality input device for the past few seconds. At step 1030, the client system may identify one or more words enclosed by the path, the one or more words being displayed on the surface in the virtual reality environment. For example, the client system may identify a word is enclosed by the path based on the position data of the path in relation to the position data of the words. At step 1040, the client system may receive an instruction from the user to copy the one or more words enclosed by the path. At step 1050, the client system may receive an input from the user indicating a location in the virtual reality environment. For example, a user may point to a comment box of a post on an online social network. At step 1060, the client system may receive another instruction from the user to paste the one or more words. At step 1070, the client system may display the one or more words that have been copied at the location indicated by the user. Particular embodiments may repeat one or more steps of the method of FIG. 10, where appropriate. Although this disclosure describes and illustrates particular steps of the method of FIG. 10 as occurring in a particular order, this disclosure contemplates any suitable steps of the method of FIG. 10 occurring in any suitable order. Moreover, although this disclosure describes and illustrates an example method for copying and pasting content within a virtual reality environment, including the particular steps of the method of FIG. 10, this disclosure contemplates any suitable method of copying and pasting content within a virtual reality environment, including any suitable steps, which may include all, some, or none of the steps of the method of FIG. 10, where appropriate. Furthermore, although this disclosure describes and illustrates particular components, devices, or systems carrying out particular steps of the method of FIG. 10, this disclosure contemplates any suitable combination of any suitable components, devices, or systems carrying out any suitable steps of the method of FIG. 10.

Figure 11A:
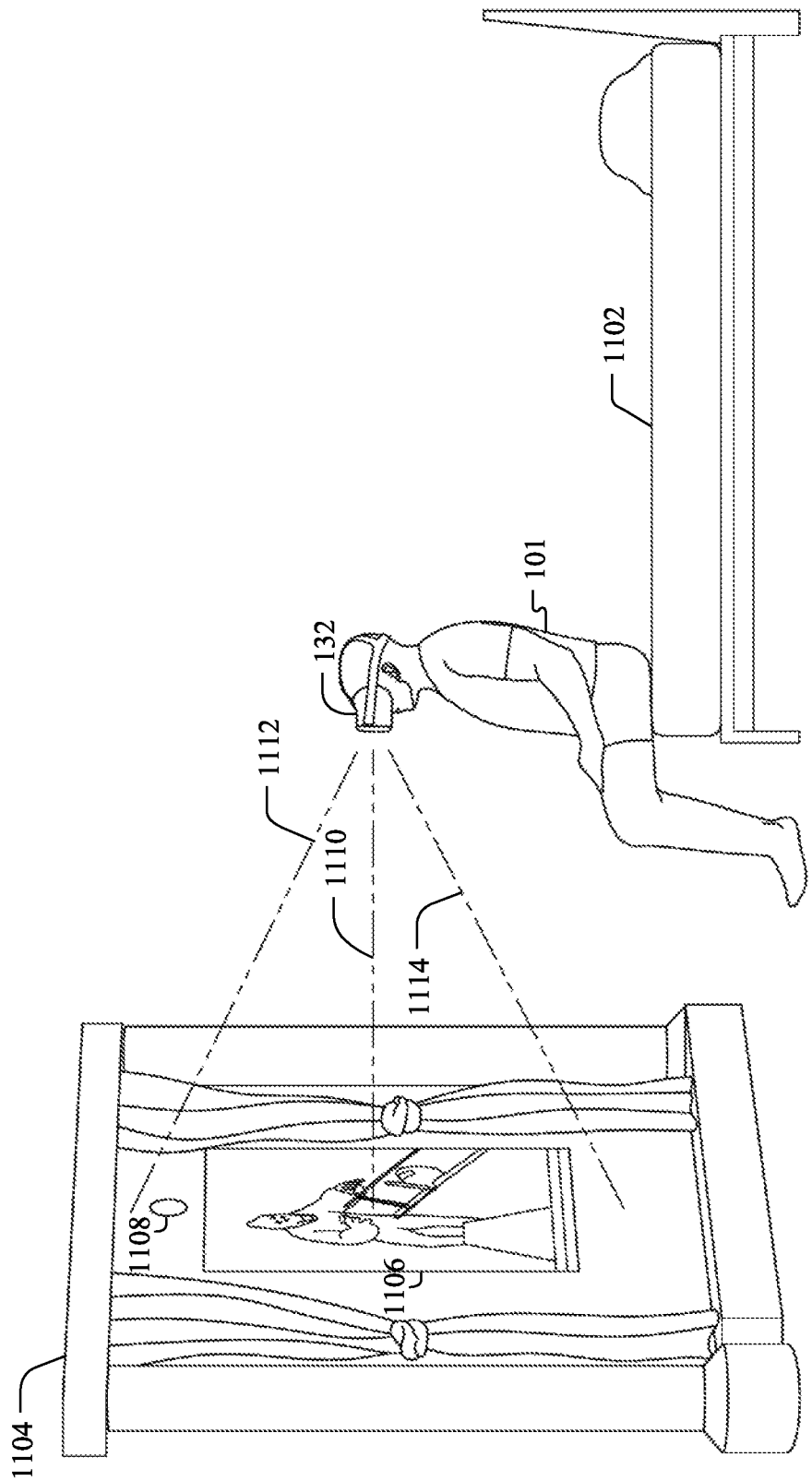
FIGS. 11A-11C illustrate an example of a user using a reorientation mode within a virtual reality environment.
Figure 11B:
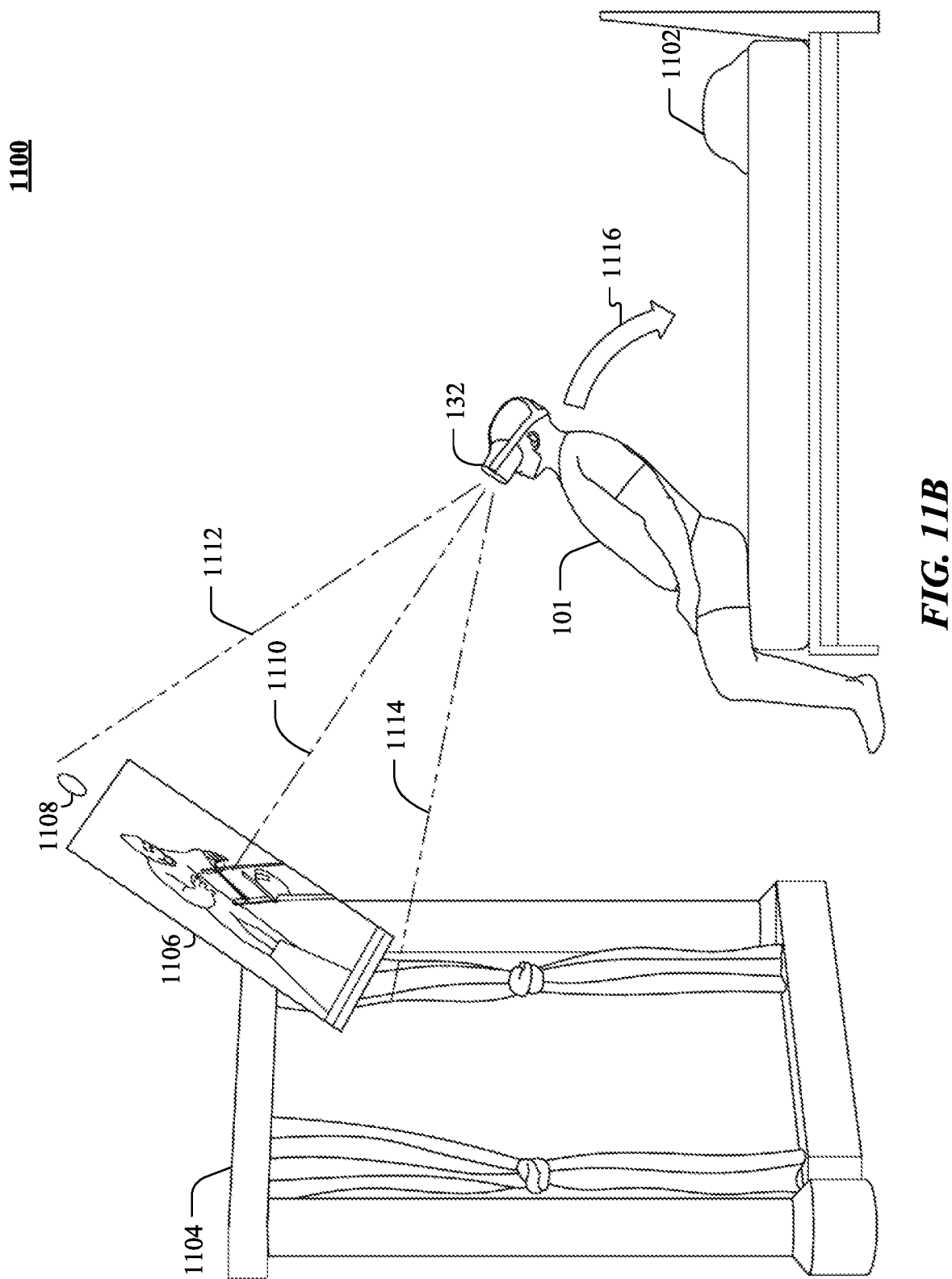
Figure 11C:
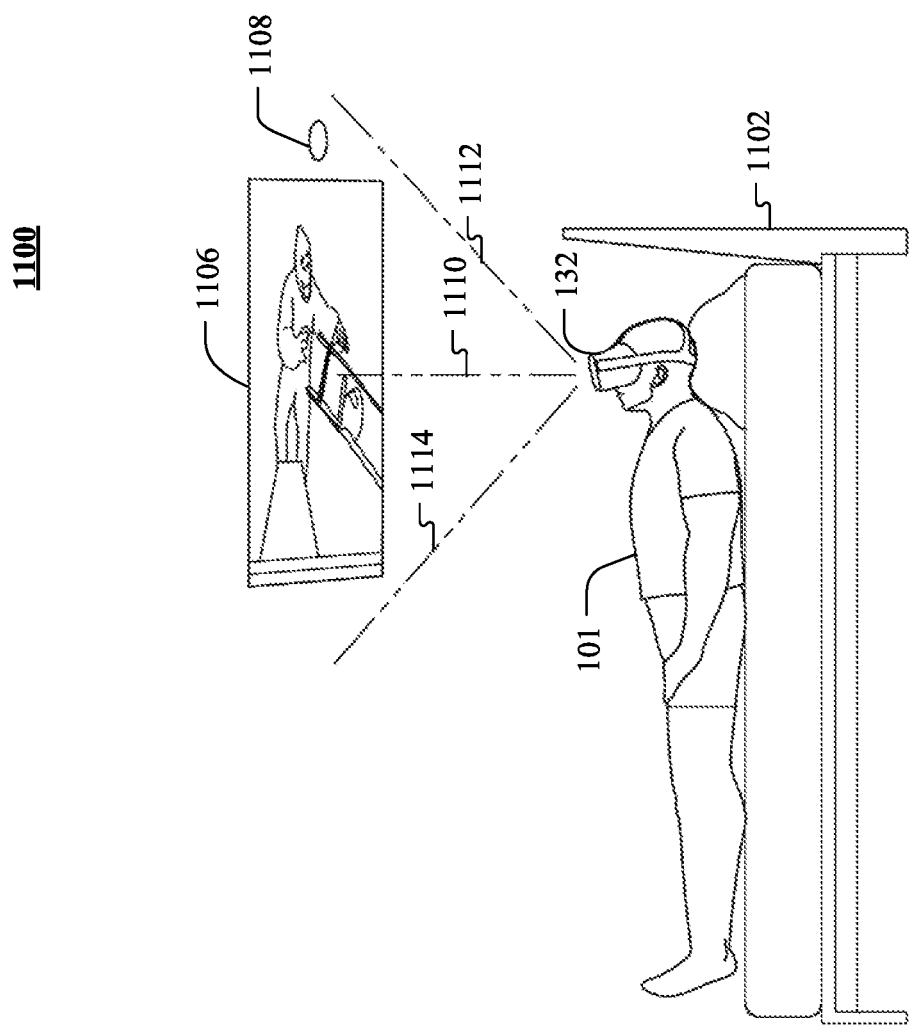
Figure 11C:
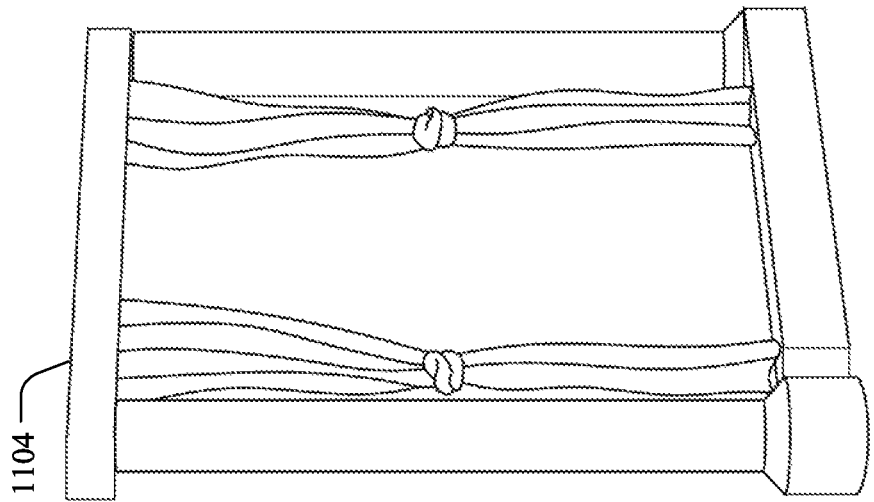

FIGS. 11A-11C illustrate an example process of utilizing a reorientation mode within a virtual reality environment 1100. FIG. 11A illustrates a user 101 wearing a virtual reality headset 132 in a bedroom setting. Similarly as in FIGS. 2A-2G, the client system 130 may use the virtual reality headset 132 to render the virtual reality environment including the virtual reality elements discussed above. In particular embodiments, the user 101 may be sitting on a bed 1102 while seeing a virtual reality environment 1100 that may include generated virtual reality elements 1104 (e.g., a theater stage) and a panel 1106 displaying content and/or an application (e.g. a video) that has been selected by the user 101. The panel 1106 may be fixed relative to a location in the virtual reality environment 1100. In particular embodiments, the panel 1106 may be coupled to an anchor point 1108 which is fixed relative to a location in the virtual reality environment 1100. As illustrated in FIG. 11A, a user 101 may have a center line 1110 of his field of view which may be centered in the middle of the panel 1106, a top line 1112 of his field of view creating an upper boundary as to what is the outer most content he can see, and a bottom line 1114 of his field of view creating a lower boundary as to what is the outer most content he can see. As an example and not by way of limitation, the user's 101 field of view may be limited within the virtual reality environment 1100 and the user 101 may only be able to see the panel 1106 and partially see the generated virtual reality elements 1104. In particular embodiments, the anchor point 1108 may be transparent and is only shown for reference in relation to the panel 1106.

While the panel 1106 is fixed in space (i.e., fixed relative to the virtual environment 1100), when the user turns his head, the virtual reality device may adjust what is displayed to the user accordingly as one would expect. For example, as the user's field of view shifts to the left, the virtual reality device would render a corresponding portion of the virtual environment 1100 that is to the left (from the user's reference point) of the panel 1106, potentially resulting in the right side of the panel 1106 to be out of the user's field of view. Thus, unless the user is looking forward at the panel 1106, the user may not be able to see the whole panel 1106. If, instead, the virtual environment 1100 is fixed relative to the user's headset, the user may be able to see the entire panel 1106 regardless of his viewing orientation. However, doing so would also result in other virtual reality elements, such as the theater stage 1104, rows of seats in the virtual theater, other virtual movie-goers, etc., to also track the user's headset and lose an element of physical realism of being in a virtual environment. For example, no matter how the user turns his head, what is shown would remain the same (e.g., the user would continue to see the panel 1106 directly in front of him).

In particular embodiments, the user 101 may enable a reorientation mode of the panel 1106 to accommodate the user's physical viewing orientation (e.g., reclined) without affecting the rest of the user's virtual-reality experience. As an example and not by way of limitation, the user 101 may enable the reorientation mode by pressing a button on the virtual reality input device(s) 134 (not shown). As another example and not by way of limitation, the user 101 may press a virtual reality button to enable a reorientation mode by moving a pointer of a virtual reality input device 134 towards the button and inputting an input into the virtual reality input device 134 (e.g., clicking a button). For example, the anchor point 1108 may be a button to enable a reorientation mode.

FIG. 11B illustrates the result of enabling a reorientation mode of the panel 1106, which may allow the user 101 to change position and the panel 1106 follows the user's center line 1110 of his field of view. In particular embodiments, the generated virtual reality elements 1104 may stay in the same location within the virtual reality environment 1100, but the panel 1106 may follow the user's head motion. The client system 130 may receive sensor data indicative of a change in viewpoint of the user 101 and reorient the panel 1106 according to the sensor data. The sensor data may be received from the virtual reality headset 132. In particular embodiments, the sensor data may include sensor data generated by any number of accelerometers, gyroscopes, magnetometers, and eye tracking sensors. As illustrated in FIG. 11B, the user 101 may continue the path 1116 to lie down on his bed 1102.

FIG. 11C illustrates the result of the user 101 continuing to move along the path 1116, which may cause the panel 1106 to reorient itself in front of the user 101 above the bed 1102. In particular embodiments, the user 101 may disable the reorientation mode similarly as to how the user 101 enables the reorientation mode. The disablement of the reorientation mode may fix the panel 1106 relative to this new location in the virtual reality environment 1100. In particular embodiments, the disablement of the reorientation mode may be a result of releasing a button on the virtual reality input device(s) 134 (e.g., in an instance that reorientation mode requires a user to press and hold a button). In particular embodiments, the anchor point 1108 is fixed relative to the new location in the virtual reality environment 1100. As illustrated in FIG. 11C, the user 101 may not be able to see the generated virtual reality elements 1104 (e.g., theater stage) as a result of reorienting himself onto the bed, which is the realistic, expected result when looking up. In a similar fashion, the user may use the reorientation mode to adjust a content display panel to be affixed to the virtual reality environment in any desired position/orientation to accommodate any desired physical viewing orientation of the user (e.g., lying down, reclined, etc.), all the while preserving the realism of the virtual reality experience once the panel is set. Although only one panel 1106 is shown, the disclosure contemplates having multiple panels coupled to the anchor point which may be reoriented similarly as panel 1106. In particular embodiments, with the use of multiple panels, the user 101 may selectively reorient a particular panel within the virtual reality environment 1100.

Figure 12A:
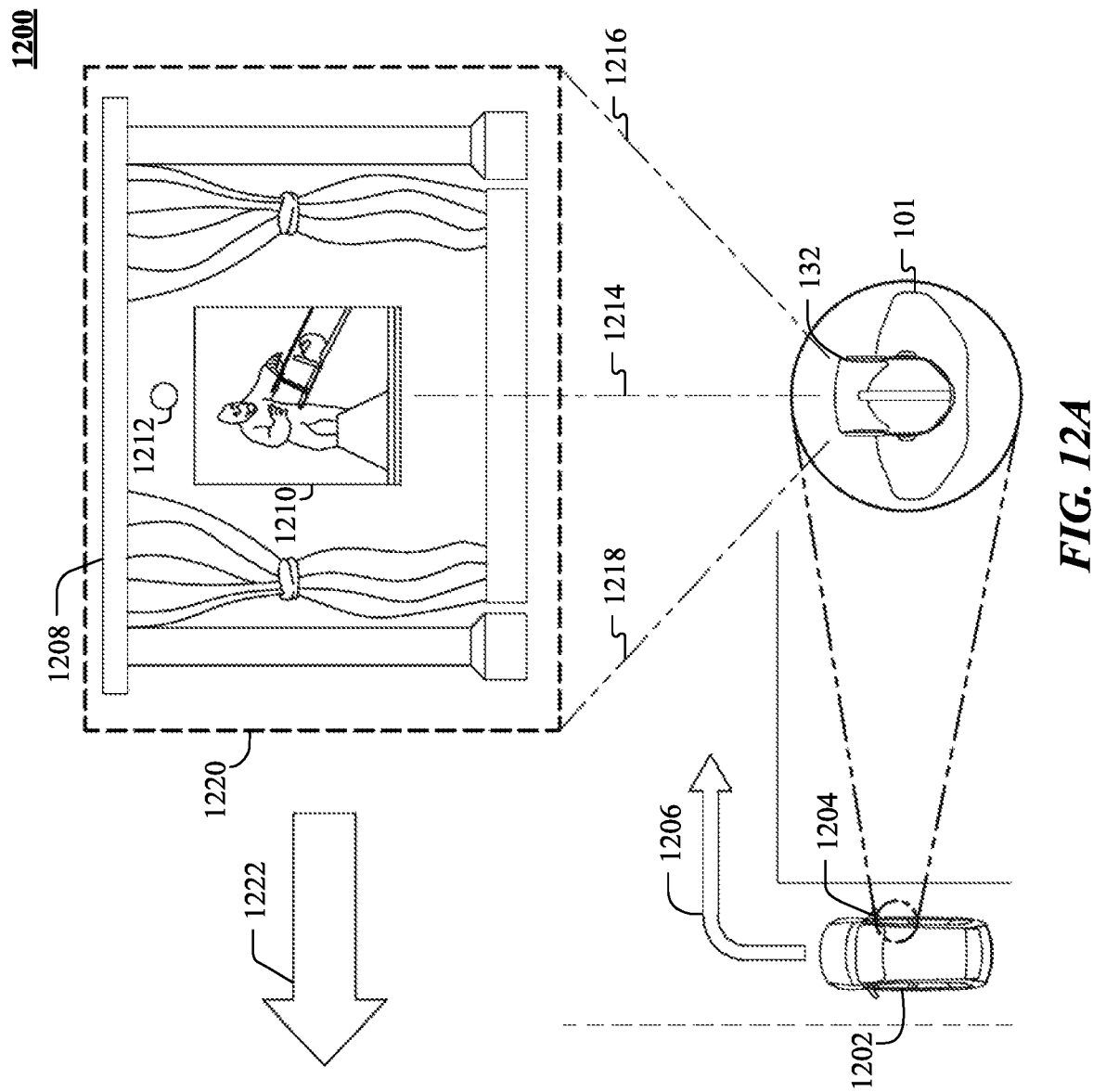
FIGS. 12A-12E illustrate an example of a user using a traveling reorientation mode within a virtual reality environment.

FIGS. 12A-12E illustrate an example process of utilizing a reorientation mode within a virtual reality environment 1200 that is generated inside a moving vehicle 1202. FIG. 12A illustrates a user 101 inside a vehicle 1202 on the passenger side 1204 within a virtual reality environment 1200. That is, the user 101 is using a virtual reality headset 132 within the vehicle 1202. Similarly as in FIGS. 2A-2G, the client system 130 may use the virtual reality headset 132 to render the virtual reality environment including the virtual reality elements discussed above. The vehicle 1202 may be traveling and preparing to perform a turn by following the path 1206. In particular embodiments, the virtual reality environment 1200 may include generated virtual reality elements 1208 (e.g., a theater stage) and a panel 1210 content and/or an application (e.g. a video) that has been selected by the user 101. The panel 1210 may be fixed relative to a location in the virtual reality environment 1200. An initial position 1212 may be shown as a reference to an initial orientation of the user 101 within the virtual reality environment 1200. As illustrated in FIG. 12A, the user 101 may have a center line 1214 of his field of view which may be centered in the middle of the panel 1210, a right line 1216 of his field of view creating a right boundary as to what is the outer most content he can see, and a left line 1218 of his field of view creating a left boundary as to what is the outer most content he can see. The three different lines 1214, 1216, 1218 may create the user's 101 field of view 1220.

One issue with using a virtual reality device within a moving vehicle is that the movement of the vehicle (e.g., acceleration, turns, vibrations, etc.) may affect what the virtual reality application determines should be displayed to the user. For example, when a vehicle is making a turn, the virtual reality device's sensors (e.g., inertial measurement unit, gyroscope, accelerometer, etc.) may detect that a turn has been made and in response shift the virtual point of view of the user, even though the user did not move relative to the vehicle. Thus, even though the user may expect to see the same scene, the scene may drift due to the vehicle's movements. This effect may degrade the user's experience and even render some application to be practically unusable in a moving vehicle.

In particular embodiments, the user 101 may enable a reorientation mode for traveling with a virtual reality headset 132. The "travel mode" may dynamically adjust and reorient the virtual reality environment 1200 in response to detected movement to realign the generated virtual reality elements 1208 and the panel 1210 back to an initial orientation as indicated by the initial position 1212. In particular embodiments, the enablement of the reorientation mode for traveling may capture an initial orientation of the generated virtual reality elements 1208 and the panel 1210. The user 101 may enable the reorientation mode for traveling similarly to enablement of the reorientation mode for the virtual reality panel 1106 as described above.

FIGS. 12A-12E illustrate an example process of utilizing a reorientation mode within a virtual reality environment 1200 that is generated inside a moving vehicle 1202. As illustrated in FIG. 12A, the generated virtual reality elements 1208 and the panel 1210 may follow a path 1222 when the vehicle 1202 travels around the corner following the path 1206.

Figure 12B:
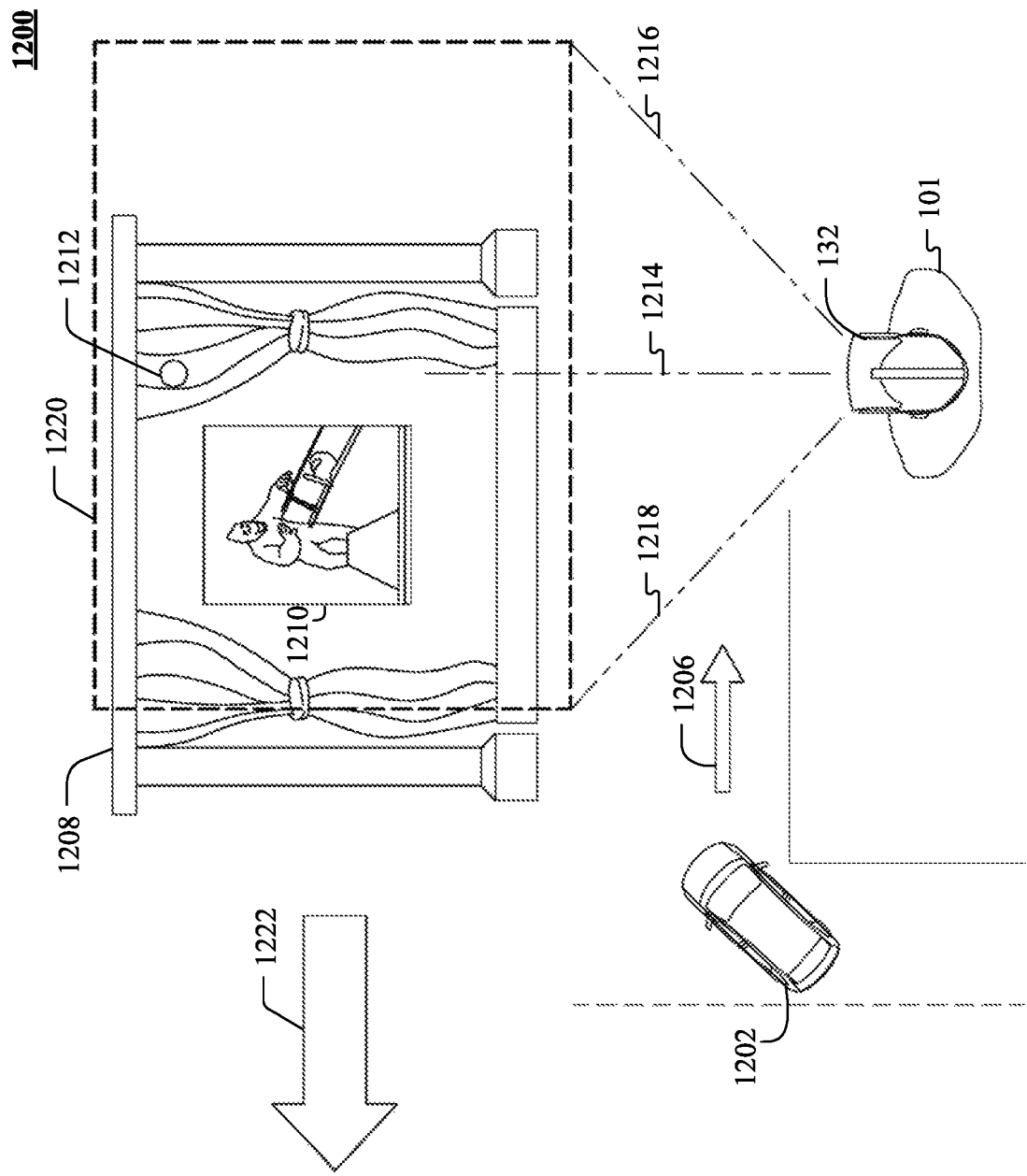

FIG. 12B illustrates the result of the vehicle 1202 following the path 1206. The movement of the vehicle may cause parts of the generated virtual reality elements 1208 to be reoriented outside the field of view of the user 1220 (since the virtual reality device may think that the user's head is turning). This may be the result of the inertial movement or acceleration experienced by the client system 130 due to the vehicle 1202 performing the turn along the path 1206. The client system 130 may be receiving sensor data continuously indicative of a change in orientation, and the client system 130 may incorrectly determine the sensor data to be the user's 101 change in position and reorient the virtual reality environment 1200 as a result. The initial position 1212 may stay in the same position to show the virtual reality environment 1200 reorienting due to the sensor data. As illustrated in FIG. 12B, the vehicle 1202 may continue along path 1206 to complete the turn and similarly the generated virtual reality elements 1208 may continue to be reoriented outside the user's field of view 1220.

Figure 12C:
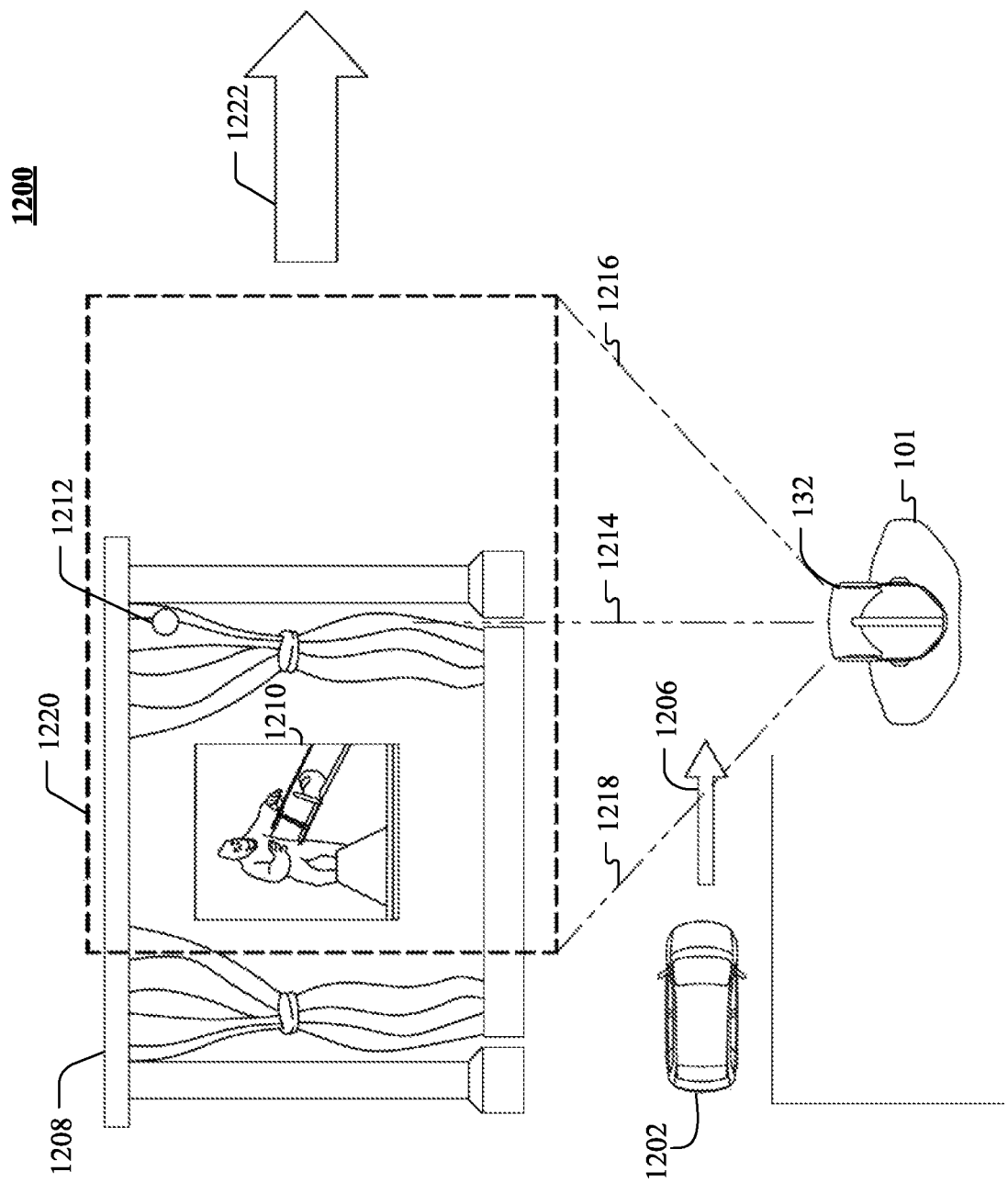

FIG. 12C illustrates the result of the vehicle 1202 completing the turn by following path 1206, which further moves the generated virtual reality elements 1208 and the 1210 further to the border of the user's 101 left line 1218 of view. The generated virtual reality elements 1208 may be pushed more outside of the user's 101 field of view 1220. As illustrated in FIG. 12C, the vehicle 1202 may continue along path 1206, which is not straight and the generated virtual reality elements 1208 and the panel 1210 may reorient themselves along the initial position 1212 to return to the initial orientation.

Figure 12D:
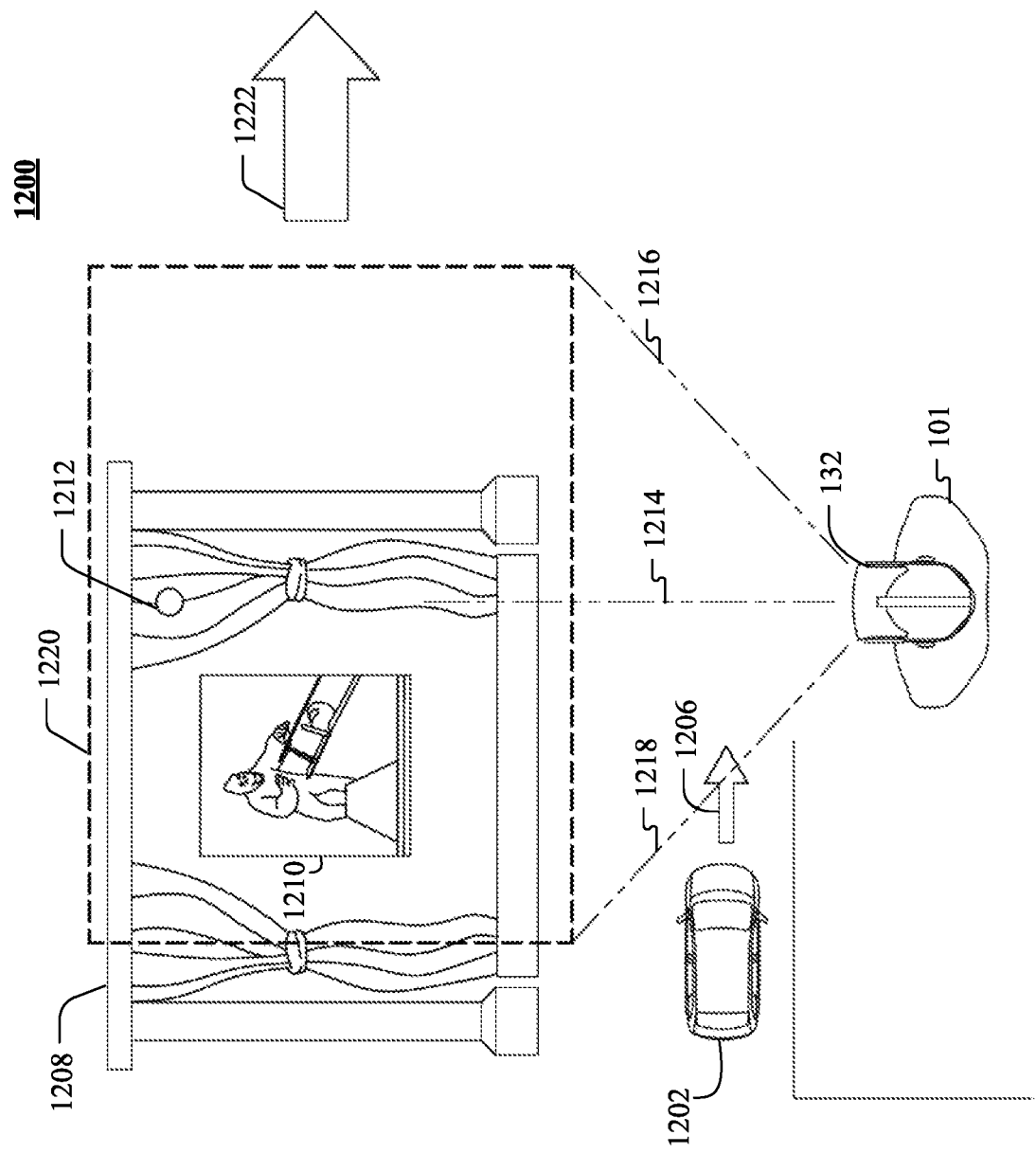

FIG. 12D illustrates the result of the vehicle 1202 following path 1206, where the generated virtual reality elements 1208 and panel 1210 begin to realign with the initial position 1212 to return to the initial orientation. The generated virtual reality elements 1208 may begin to return into the user's 101 field of view 1220 as a result of realigning with the initial position 1212. As illustrated in FIG. 12D, the vehicle 1202 may continue along the path 1206 and the generated virtual reality elements 1208 and panel 1210 may continue to realign with the initial position 1212.

Figure 12E:
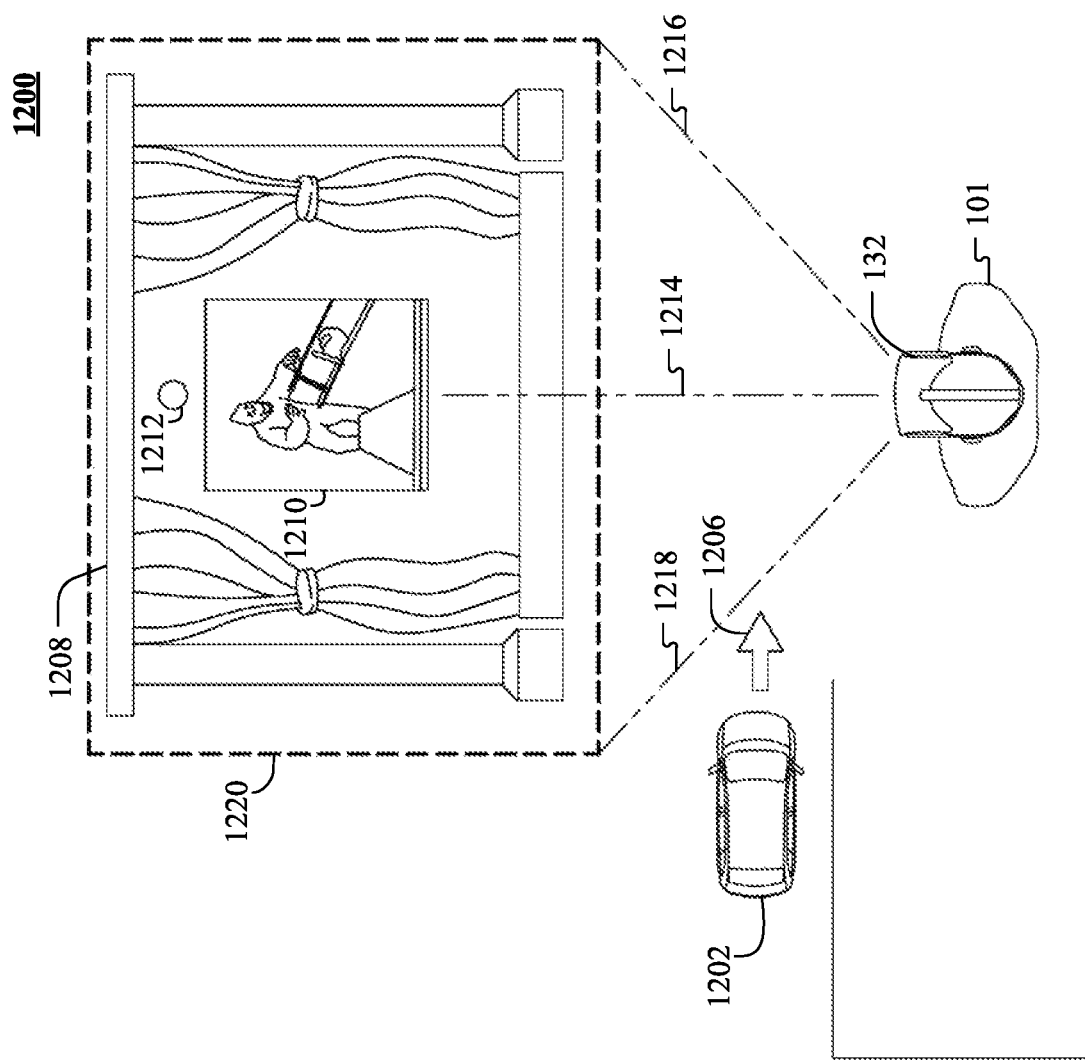

FIG. 12E illustrates the result of the vehicle 1202 following the path 1206, where the generated virtual reality elements 1208 and the panel 1210 realign with the initial position 1212 and return to the initial orientation. In particular embodiments, the client system 130 may determine that a change in orientation is due to the motion of the vehicle 1202 and perform the readjustment in response to determining the change in orientation is due to the motion of the vehicle 1202. As an example and not by way of limitation, the client system 130 may receive sensor data indicative of a change in orientation and may further determine that the change in orientation may be attributed to vehicular motion of the vehicle 1202 that the user 101 is occupying. To determine the change in orientation is attributed to vehicular motion rather than user motion, the client system 130 may receive information, such as a geographic location of the virtual reality headset 132 and the respective user 101. As an example and not by way of limitation, if the client system 130 determines there is a large change in geographic location within a predetermined amount of time, then the user 101 may be assumed to be within a moving vehicle 1202 and perform the readjustment of the orientation as described above. In particular embodiments, the client system 130 may receive information indicative of a turn speed of the client system 130. As another example and not by way of limitation, if the client system 130 determines that the turn speed falls below a threshold turn speed, then the user 101 may be assumed to be within a vehicle (e.g., a plane) and perform the readjustment of the orientation as described above. In particular embodiments, the client system 130 may receive information indicative of a Global Positioning System (GPS) signal of the client system 130 and information indicative of a travel route of the vehicle 1202 (e.g., navigation data). As an example and not by way of limitation, the client system 130 may determine when curves and turns may occur within a travel route and dynamically readjust the orientation of the virtual reality environment 1200 as described above by taking into account of the effect the curve and/or turn would influence the orientation of the virtual reality environment 1200. For example, by using the speed of a vehicle and the direction the vehicle is traveling, an adjustment due to the vehicle motion may be performed in conjunction with when they might occur on a travel route. In particular embodiments, motion sensory data (e.g., as detected by the inertial measuring unit) may be compared with the GPS data to assess a likelihood of the motion sensory data being attributable to the vehicle's motion. For example, if the motion sensory data indicates that a turn is being made and the GPS data also indicates a turn, then the system may conclude that the detected motion is due to a moving vehicle rather than the user. On the other hand, if the GPS data indicates that the user is stationary or is moving in a manner that is inconsistent with the motion sensor data (e.g., GPS data may indicate that the user is going in a straight line or turning in a direction different from the turn detected by the inertial measuring unit), the detected motion may be attributed to user movement and the device may respond accordingly. In particular embodiments, the readjustment of the field of view 1220 of the user 101back to the initial orientation may be done within a predetermined time interval (e.g., 3 seconds) so as to not have the virtual reality environment 1200 change too quick and cause motion sickness for the user 101 and/or change too slow and impose an inconvenience upon the user 101.

Figure 13:
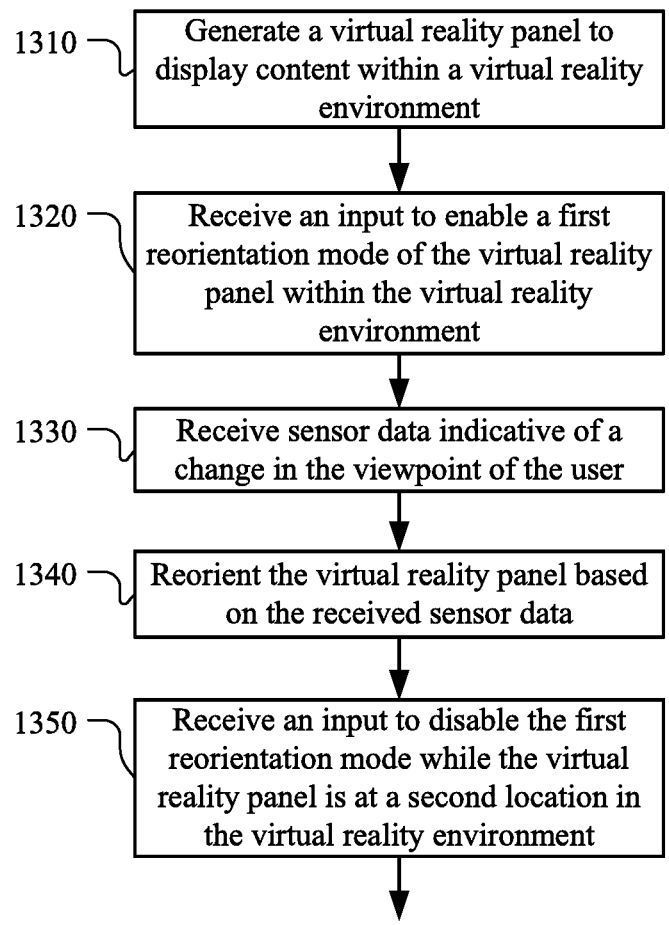
FIG. 13 illustrates an example method of utilizing a reorientation mode within a virtual reality environment.

FIG. 13 illustrates an example method 1300 for utilizing a reorientation mode within a virtual reality environment. The method may begin at step 1310, where a client system (e.g., virtual reality system) may generate a virtual reality panel to display content within a virtual reality environment. The virtual reality panel may be fixed relative to a location in the virtual reality environment. As an example and not by way of limitation, the client system may generate a display for a video or a display for a webpage in a center of a virtual reality movie theater. At step 1320, the client system may receive an input to enable a first reorientation mode of the virtual reality panel within the virtual reality environment. The first reorientation mode may allow the virtual reality panel to be reoriented relative to a viewpoint of a user. At step 1330, the client system may receive sensor data indicative of a change in the viewpoint of the user. For example, sensor data of accelerometers, gyroscopes, magnetometers, and eye tracking sensors may be collected by the client system and processed to determine whether there has been a change in viewpoint of the user. At step 1340, the client system may reorient the virtual reality panel based on the received sensor data. For example, the virtual reality panel may follow the viewpoint of the user. At step 1350, the client system may receive an input to disable the first reorientation mode while the virtual reality panel is at a new location in the virtual reality environment. The disablement of the first reorientation mode may fix the virtual reality panel relative to the new location in the virtual reality environment. Particular embodiments may repeat one or more steps of the method of FIG. 13, where appropriate. Although this disclosure describes and illustrates particular steps of the method of FIG. 13 as occurring in a particular order, this disclosure contemplates any suitable steps of the method of FIG. 13 occurring in any suitable order. Moreover, although this disclosure describes and illustrates an example method for utilizing a reorientation mode within a virtual reality environment, including the particular steps of the method of FIG. 13, this disclosure contemplates any suitable method of utilizing a reorientation mode within a virtual reality environment, including any suitable steps, which may include all, some, or none of the steps of the method of FIG. 13, where appropriate. Furthermore, although this disclosure describes and illustrates particular components, devices, or systems carrying out particular steps of the method of FIG. 13, this disclosure contemplates any suitable combination of any suitable components, devices, or systems carrying out any suitable steps of the method of FIG. 13.

Figure 14:
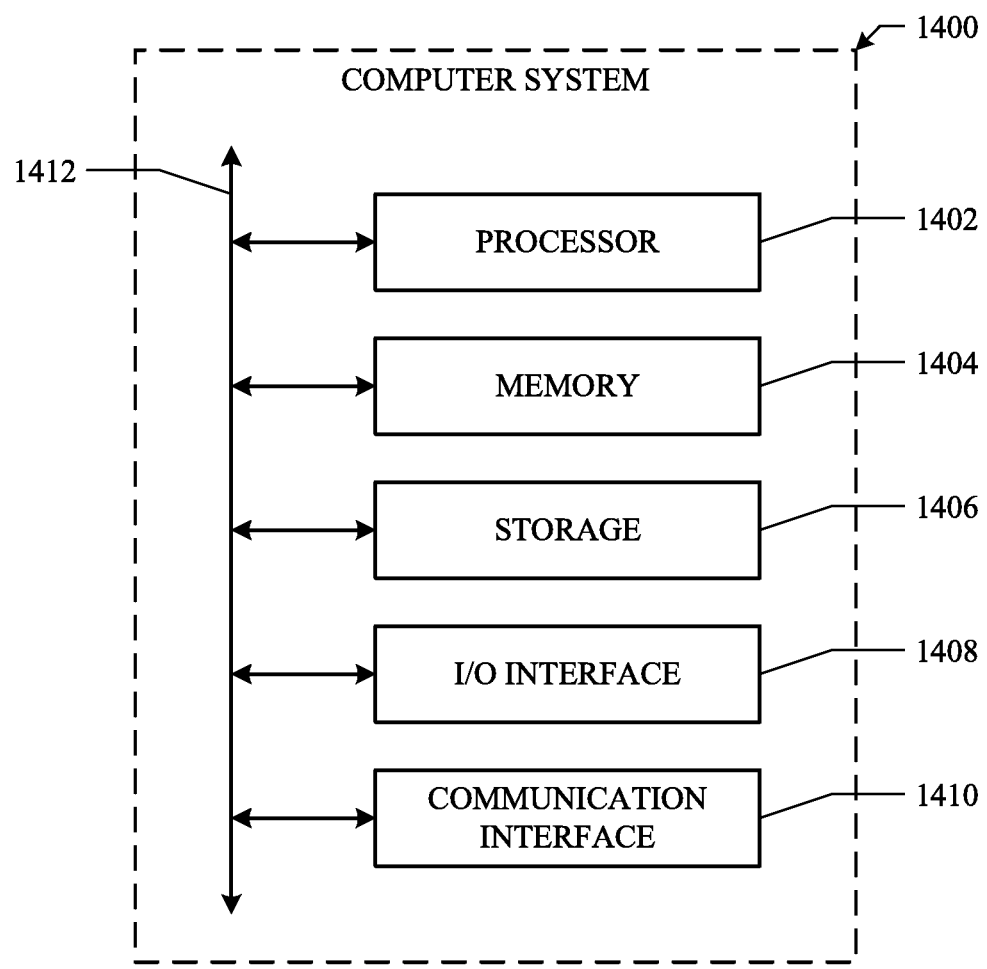
FIG. 14 illustrates an example computer system.

FIG. 14 illustrates an example computer system 1400. In particular embodiments, one or more computer systems 1400 perform one or more steps of one or more methods described or illustrated herein. In particular embodiments, one or more computer systems 1400 provide functionality described or illustrated herein. In particular embodiments, software running on one or more computer systems 1400 performs one or more steps of one or more methods described or illustrated herein or provides functionality described or illustrated herein. Particular embodiments include one or more portions of one or more computer systems 1400. Herein, reference to a computer system may encompass a computing device, and vice versa, where appropriate. Moreover, reference to a computer system may encompass one or more computer systems, where appropriate.

This disclosure contemplates any suitable number of computer systems 1400. This disclosure contemplates computer system 1400 taking any suitable physical form. As example and not by way of limitation, computer system 1400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1400 may include one or more computer systems 1400; be unitary or distributed; span multiple locations; span multiple machines; span multiple data centers; or reside in a cloud, which may include one or more cloud components in one or more networks. Where appropriate, one or more computer systems 1400 may perform without substantial spatial or temporal limitation one or more steps of one or more methods described or illustrated herein. As an example and not by way of limitation, one or more computer systems 1400 may perform in real time or in batch mode one or more steps of one or more methods described or illustrated herein. One or more computer systems 1400 may perform at different times or at different locations one or more steps of one or more methods described or illustrated herein, where appropriate.

In particular embodiments, computer system 1400 includes a processor 1402, memory 1404, storage 1406, an input/output (I/O) interface 1408, a communication interface 1410, and a bus 1412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1402 includes hardware for executing instructions, such as those making up a computer program. As an example and not by way of limitation, to execute instructions, processor 1402 may retrieve (or fetch) the instructions from an internal register, an internal cache, memory 1404, or storage 1406; decode and execute them; and then write one or more results to an internal register, an internal cache, memory 1404, or storage 1406. In particular embodiments, processor 1402 may include one or more internal caches for data, instructions, or addresses. This disclosure contemplates processor 1402 including any suitable number of any suitable internal caches, where appropriate. As an example and not by way of limitation, processor 1402 may include one or more instruction caches, one or more data caches, and one or more translation lookaside buffers (TLBs). Instructions in the instruction caches may be copies of instructions in memory 1404 or storage 1406, and the instruction caches may speed up retrieval of those instructions by processor 1402. Data in the data caches may be copies of data in memory 1404 or storage 1406 for instructions executing at processor 1402 to operate on; the results of previous instructions executed at processor 1402 for access by subsequent instructions executing at processor 1402 or for writing to memory 1404 or storage 1406; or other suitable data. The data caches may speed up read or write operations by processor 1402. The TLBs may speed up virtual-address translation for processor 1402. In particular embodiments, processor 1402 may include one or more internal registers for data, instructions, or addresses. This disclosure contemplates processor 1402 including any suitable number of any suitable internal registers, where appropriate. Where appropriate, processor 1402 may include one or more arithmetic logic units (ALUs); be a multi-core processor; or include one or more processors 1402. Although this disclosure describes and illustrates a particular processor, this disclosure contemplates any suitable processor.

In particular embodiments, memory 1404 includes main memory for storing instructions for processor 1402 to execute or data for processor 1402 to operate on. As an example and not by way of limitation, computer system 1400 may load instructions from storage 1406 or another source (such as, for example, another computer system 1400) to memory 1404. Processor 1402 may then load the instructions from memory 1404 to an internal register or internal cache. To execute the instructions, processor 1402 may retrieve the instructions from the internal register or internal cache and decode them. During or after execution of the instructions, processor 1402 may write one or more results (which may be intermediate or final results) to the internal register or internal cache. Processor 1402 may then write one or more of those results to memory 1404. In particular embodiments, processor 1402 executes only instructions in one or more internal registers or internal caches or in memory 1404 (as opposed to storage 1406 or elsewhere) and operates only on data in one or more internal registers or internal caches or in memory 1404 (as opposed to storage 1406 or elsewhere). One or more memory buses (which may each include an address bus and a data bus) may couple processor 1402 to memory 1404. Bus 1412 may include one or more memory buses, as described below. In particular embodiments, one or more memory management units (MMUs) reside between processor 1402 and memory 1404 and facilitate accesses to memory 1404 requested by processor 1402. In particular embodiments, memory 1404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1404 may include one or more memories 1404, where appropriate. Although this disclosure describes and illustrates particular memory, this disclosure contemplates any suitable memory.

In particular embodiments, storage 1406 includes mass storage for data or instructions. As an example and not by way of limitation, storage 1406 may include a hard disk drive (HDD), a floppy disk drive, flash memory, an optical disc, a magneto-optical disc, magnetic tape, or a Universal Serial Bus (USB) drive or a combination of two or more of these. Storage 1406 may include removable or non-removable (or fixed) media, where appropriate. Storage 1406 may be internal or external to computer system 1400, where appropriate. In particular embodiments, storage 1406 is non-volatile, solid-state memory. In particular embodiments, storage 1406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1406 taking any suitable physical form. Storage 1406 may include one or more storage control units facilitating communication between processor 1402 and storage 1406, where appropriate. Where appropriate, storage 1406 may include one or more storages 1406. Although this disclosure describes and illustrates particular storage, this disclosure contemplates any suitable storage.

In particular embodiments, I/O interface 1408 includes hardware, software, or both, providing one or more interfaces for communication between computer system 1400 and one or more I/O devices. Computer system 1400 may include one or more of these I/O devices, where appropriate. One or more of these I/O devices may enable communication between a person and computer system 1400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1408 for them. Where appropriate, I/O interface 1408 may include one or more device or software drivers enabling processor 1402 to drive one or more of these I/O devices. I/O interface 1408 may include one or more I/O interfaces 1408, where appropriate. Although this disclosure describes and illustrates a particular I/O interface, this disclosure contemplates any suitable I/O interface.

In particular embodiments, communication interface 1410 includes hardware, software, or both providing one or more interfaces for communication (such as, for example, packet-based communication) between computer system 1400 and one or more other computer systems 1400 or one or more networks. As an example and not by way of limitation, communication interface 1410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1410 for it. As an example and not by way of limitation, computer system 1400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1400 may include any suitable communication interface 1410 for any of these networks, where appropriate. Communication interface 1410 may include one or more communication interfaces 1410, where appropriate. Although this disclosure describes and illustrates a particular communication interface, this disclosure contemplates any suitable communication interface.

In particular embodiments, bus 1412 includes hardware, software, or both coupling components of computer system 1400 to each other. As an example and not by way of limitation, bus 1412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1412 may include one or more buses 1412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a client system:
receiving a first request to access a user interface element in a virtual reality environment for a first application;
generating the user interface element at a first position in the virtual reality environment, wherein the user interface element at the first position occludes a portion of the first application;
detecting an input to move the user interface element from the first position in the virtual reality environment to a last position in the virtual reality environment relative to a display region of the first application;
storing, based on the last position in the virtual reality environment, position data in a position database, wherein the stored position data (1) corresponds to a spatial relationship between the user interface element and the first application and (2) is associated with the first application out of a plurality of applications on the client system, wherein the storing of position data includes storing position data for each application of the plurality of applications;
receiving a second request to access the user interface element in the virtual reality environment;

determining that the user interface element requested by the second request is associated with the first application;

querying the position database to select the previously stored position data associated with the first application; and generating the user interface element at a position in the virtual reality environment based on the previously stored position data associated with the first application.

2. The method of claim 1, wherein the stored position data associated with the first application includes a plurality of inputs to move the user interface element from the first position in the virtual reality environment to the last position in the virtual reality environment relative to the display region of the first application from a plurality of users.

3. The method of claim 1, wherein the user interface element includes at least a keyboard.

4. The method of claim 1, wherein the portion of the first application occluded by the user interface element includes content of the first application.

5. The method of claim 4, wherein the content of the first application includes a predicted input that is generated in response to receiving the request to access the user interface element.

6. The method of claim 5, wherein the predicted input includes the most recent inputs into the user interface element.

7. The method of claim 4, wherein to move the user interface element includes moving the user interface element to a position that avoids occluding content of the first application.

8. The method of claim 4, further comprising repositioning the content of the first application with respect to the user interface element at the first position in the virtual reality environment to avoid occlusion of the content of the first application.

9. The method of claim 4, further comprising:
retrieving content data indicative of a location of the content with respect to the display region of the first application;
determining a position the user interface element avoids the content of the first application; and
generating the user interface element at the position that avoids the content of the first application.

10. The method of claim 1, wherein the input to move the user interface element includes a manual selection of the user interface element from the first position to the last position.

11. The method of claim 1, wherein the input to move the user interface element includes a swipe gesture in a direction, wherein the direction of the swipe gesture is from the first position to the last position, and wherein the user interface element moves a predetermined amount of space with respect to the display region of the first application.

12. The method of claim 1, wherein to move the user interface element includes moving the user interface element within a plane parallel to the display region of the first application.

13. The method of claim 1, wherein to move the user interface element includes moving the user interface element anywhere within the virtual reality environment.

14. The method of claim 1, further comprising:
receiving a request to access the user interface element in the virtual reality environment for a second application;
generating the user interface element at a third position in the virtual reality environment, wherein the user interface element at the third position occludes a portion of the second application;
detecting an input to move the user interface element from the third position in the virtual reality environment to a fourth position in the virtual reality environment relative to a display region of the first application;
storing position data associated with the fourth position of the virtual reality environment in the position database, wherein the stored position data associated with the fourth position is associated with the second application;
receiving another request to access the user interface element in the virtual reality environment for the second application;
querying the position database for the stored position data associated with the second application; and
generating the user interface element at a position in the virtual reality environment based on the stored position data associated with the second application.

15. The method of claim 1, wherein the querying of the position database for the stored position data associated with the first application includes querying for stored position data associated with the first application for a user.

16. One or more computer-readable non-transitory storage media embodying software that is operable when executed to:
receive a first request to access a user interface element in a virtual reality environment for a first application;
generate the user interface element at a first position in the virtual reality environment, wherein the user interface element at the first position occludes a portion of the first application;
detect an input to move the user interface element from the first position in the virtual reality environment to a last position of the user interface element in the virtual reality environment relative to a display region of the first application;
store, based on the last position of the user interface element in the virtual reality environment, position data in a position database, wherein the stored position data (1) corresponds to a spatial relationship between the user interface element and the first application and (2) is associated with the first application out of a plurality of applications on the client system, wherein the storing of position data includes storing position data for each application of the plurality of applications;
receive a second request to access the user interface element in the virtual reality environment;
determine that the user interface element requested by the second request is associated with the first application;
query the position database to select the previously stored position data associated with the first application; and
generate the user interface element at a position in the virtual reality environment based on the previously stored position data associated with the first application.

17. The media of claim 16, wherein the stored position data associated with the first application includes a plurality of inputs to move the user interface element from the first position in the virtual reality environment to the last position in the virtual reality environment relative to the display region of the first application from a plurality of users.

18. A system comprising: one or more processors; and a non-transitory memory coupled to the processors comprising instructions executable by the processors, the processors operable when executing the instructions to:

receive a first request to access a user interface element in a virtual reality environment for a first application;

generate the user interface element at a first position in the virtual reality environment, wherein the user interface element at the first position occludes a portion of the first application;

detect an input to move the user interface element from the first position in the virtual reality environment to a last position of the user interface element in the virtual reality environment relative to a display region of the first application;

store, based on the last position of the user interface element in the virtual reality environment, position data in a position database, wherein the stored position data (1) corresponds to a spatial relationship between the user interface element and the first application and (2) is associated with the first application out of a plurality of applications on the client system, wherein the storing of position data includes storing position data for each application of the plurality of applications;

receive a second request to access the user interface element in the virtual reality environment;

determine that the user interface element requested by the second request is associated with the first application;

query the position database to select the previously stored position data associated with the first application; and generate the user interface element at a position in the virtual reality environment based on the previously stored position data associated with the first application.

19. The system of claim 18, wherein the stored position data associated with the first application includes a plurality of inputs to move the user interface element from the first position in the virtual reality environment to the last position in the virtual reality environment relative to the display region of the first application from a plurality of users.

* * * * *